(12) United States Patent
Xie et al.

(10) Patent No.: US 12,534,582 B2
(45) Date of Patent: Jan. 27, 2026

(54) LINEAR LOW DENSITY POLYETHYLENE FOR FILM APPLICATIONS

(71) Applicant: ExxonMobil Chemical Patents Inc., Baytown, TX (US)

(72) Inventors: Ru Xie, Baytown, TX (US); Matthew W. Holtcamp, Huffman, TX (US); David M. Fiscus, Houston, TX (US); Dongming Li, Houston, TX (US); Laughlin G. McCullough, League City, TX (US); Matthew S. Bedoya, Humble, TX (US); Kevin A. Stevens, Houston, TX (US); Yan Jiang, Houston, TX (US); Joseph A. Moebus, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 549 days.

(21) Appl. No.: 17/997,113

(22) PCT Filed: Apr. 23, 2021

(86) PCT No.: PCT/US2021/028825
§ 371 (c)(1),
(2) Date: Oct. 25, 2022

(87) PCT Pub. No.: WO2021/222016
PCT Pub. Date: Nov. 4, 2021

(65) Prior Publication Data
US 2023/0167254 A1    Jun. 1, 2023

Related U.S. Application Data

(60) Provisional application No. 63/018,642, filed on May 1, 2020.

(51) Int. Cl.
C08F 210/14    (2006.01)
C08F 210/02    (2006.01)
(Continued)

(52) U.S. Cl.
CPC ............... *C08J 5/18* (2013.01); *C08F 210/02* (2013.01); *C08F 210/14* (2013.01); *C08F 210/16* (2013.01); *C08J 2323/08* (2013.01)

(58) Field of Classification Search
None
See application file for complete search history.

(56) References Cited

U.S. PATENT DOCUMENTS 5,041,584 A    8/1991    Crapo et al. .................. 556/179
5,153,157 A    10/1992    Hlatky et al. ................. 502/117
(Continued)

FOREIGN PATENT DOCUMENTS

EP    0573120    11/1998
EP    2003166    12/2008
(Continued)

OTHER PUBLICATIONS

Girolami, G. S. (1994) "A Simple "Back of the Envelope" Method for Estimating the Densities and Molecular Volumes of Liquids and Solids," *Jrnl. of Chem. Ed.*, v.71(11), pp. 962-964.
(Continued)

*Primary Examiner* — Richard A. Huhn
(74) *Attorney, Agent, or Firm* — C. Tumey Law Group PLLC

(57) ABSTRACT

The present disclosure generally relates to catalyst systems, polyethylene compositions, and uses of such compositions in, e.g., films. In an embodiment is provided a film that includes a polyethylene composition, comprising: ethylene and a $C_3$-$C_{40}$ olefin comonomer, the polyethylene composition having at least 65 wt % ethylene content and from 0
(Continued)

wt % to 35 wt % of a $C_3$-$C_{40}$ olefin comonomer content based upon the total weight of the composition, the film having: an average of MD and TD 1% secant modulus of 43,000 psi or greater, and a Dart Drop Impact Strength of greater than 500 g/mil. In another embodiment is provided a process for producing a polyethylene composition that includes introducing ethylene and a $C_3$-$C_{40}$ alpha-olefin to a catalyst system, the catalyst system comprising a first catalyst compound, a second catalyst compound, and an activator; and forming a polyethylene composition.

7 Claims, 7 Drawing Sheets

(51) Int. Cl.
  *C08F 210/16* (2006.01)
  *C08J 5/18* (2006.01)

(56) References Cited

U.S. PATENT DOCUMENTS

| | | | |
|---|---|---|---|
| 5,241,025 A | 8/1993 | Hlatky et al. | 526/129 |
| 5,447,895 A | 9/1995 | Marks et al. | 502/117 |
| 5,453,410 A | 9/1995 | Kolthammer et al. | 502/155 |
| 6,211,105 B1 | 4/2001 | Holtcamp | 502/103 |
| 8,404,880 B2 | 3/2013 | Kaji et al. | 556/179 |
| 8,658,556 B2 | 2/2014 | Stewart | 502/202 |
| 8,975,209 B2 | 3/2015 | Kaji et al. | 502/439 |
| 9,340,630 B2 | 5/2016 | Kaji et al. | |
| 2011/0223406 A1 | 9/2011 | Fantinel et al. | 428/220 |
| 2013/0085221 A1 | 4/2013 | Botros et al. | 524/504 |
| 2018/0237558 A1 | 8/2018 | McCullough | |
| 2019/0119413 A1* | 4/2019 | Holtcamp | C08F 210/16 |
| 2019/0144575 A1 | 5/2019 | Lue et al. | |
| 2019/0144576 A1 | 5/2019 | Lue et al. | |

FOREIGN PATENT DOCUMENTS

| | | |
|---|---|---|
| WO | WO1991/009882 | 7/1991 |
| WO | WO1993/014132 | 7/1993 |
| WO | WO1994/003506 | 2/1994 |
| WO | WO1994/007928 | 4/1994 |
| WO | WO1995/007941 | 3/1995 |
| WO | WO1995/014044 | 5/1995 |
| WO | WO2004/022646 | 3/2004 |
| WO | WO2004/026921 | 4/2004 |
| WO | WO2004/046214 | 6/2004 |
| WO | WO2010/034461 | 4/2010 |
| WO | WO2015/123164 | 8/2015 |
| WO | WO2019/027605 | 2/2019 |
| WO | WO-2019027605 A1 * | 2/2019 ............... C08J 5/18 |
| WO | WO2019/094131 | 5/2019 |
| WO | WO2019/094132 | 5/2019 |
| WO | WO2019/108327 | 6/2019 |
| WO | WO2019/246069 | 12/2019 |

OTHER PUBLICATIONS

Monrabal, B.; del Hierro, P. (2011) "Characterization of polypropylene-polyethylene blends by temperature rising elution and crystallization analysis fractionation," Anal. Bioanal. Chem., v.399(4), pp. 1557-1561.

Sun, T et al. (2001) "Effect of Short Chain Branching on the Coil Dimensions of Polyolefins in Dilute Solution," *Macromolecules*, v.34, pp. 6812-6820.

J. H. Lippincott, et al—Blue Book 2001, Materials, Compounding Ingredients, Machinery And Services for Rubber 189-247.

Malcolm B. Huglin, "Recent Trends in Classical Light Scattering From Polymer Solutions", Pure & Appl. Chem., V. 49, pp. 929-940.

* cited by examiner

LINEAR LOW DENSITY POLYETHYLENE FOR FILM APPLICATIONS

CROSS REFERENCE TO RELATED APPLICATIONS

This application is a national stage filing of Patent Cooperation Treaty Application No. PCT/US2021/028825 filed Apr. 23, 2021, which claims the benefit of and priority to U.S. Provisional Application No. 63/018,642 filed May 1, 2020, the disclosure of U.S. Provisional Application No. 63/018,642 is incorporated herein by reference.

FIELD

The present disclosure generally relates to catalyst systems, polyethylene compositions, and uses of such compositions in, e.g., films.

BACKGROUND

Olefin polymerization catalysts are of great use in industry to produce polyolefin compositions suitable for, e.g., film applications. Despite efforts in developing olefin polymerization catalysts for the production of polethylene compositions, such as linear low density polyethylene (LLDPE), the production of polethylene compositions and films having improved performance properties such as processability, stiffness, and toughness remains elusive. Achieving such performance properties is challenging because a trade-off exists among such properties. For example, improving a LLDPE composition's stiffness and processability often reduces its toughness.

Therefore, there remains a need for new and improved catalyst systems and polymerization processes useful to produce LLDPE compositions having improved processability, stiffness, and toughness, each of which is important for film and other applications.

References for citing in an Information Disclosure Statement (37 C.F.R. 1.97(h)): US Pat. Pub. No. 2011/0223406, US Pat. Pub. No. 2019/0144576, European Pat. Pub. No. EP 2003166, PCT Application No. WO 2019/094132, and PCT Application No. WO 2019/108327.

SUMMARY

The present disclosure generally relates to catalyst systems, polyethylene compositions, and uses of such compositions in, e.g., films.

In an embodiment, the present disclosure provides a film that includes a polyethylene composition, comprising: ethylene and a $C_3$-$C_{40}$ olefin comonomer, the polyethylene composition having at least 65 wt % ethylene content and from 0 wt % to 35 wt % of a $C_3$-$C_{40}$ olefin comonomer content based upon the total weight of the composition as determined by GPC-IR5-LS-VIS, the film having: an average of MD and TD 1% secant modulus of 43,000 psi or greater as determined by ASTM D882, and a Dart Drop Impact Strength of greater than 500 g/mil, as determined by ASTM D1709.

A film comprising: a polyethylene composition, comprising: ethylene and a $C_3$-$C_{40}$ olefin comonomer, the polyethylene composition having at least 65 wt % ethylene content and from 0 wt % to 35 wt % of a $C_3$-$C_{40}$ olefin comonomer content based upon the total weight of the composition as determined by GPC-IR5-LS-VIS, the film having: an average of MD and TD 1% secant modulus of 43,000 psi to 68,000 psi as determined by ASTM D882, a Dart Drop Impact Strength of greater than 500 g/mil, as determined by ASTM D1709, a 1% Secant Modulus in the Machine Direction (MD) of from 38,000 psi to 58,000 psi, as determined by ASTM D882 (25.4 mm width strip), and a 1% Secant Modulus in the Transverse Direction (TD) of from 50,000 psi to 80,000 psi, as determined by ASTM D882 (25.4 mm width strip).

In another embodiment, the present disclosure provides a process for producing a polyethylene composition that includes introducing ethylene and a $C_3$-$C_{40}$ alpha-olefin to a catalyst system, the catalyst system comprising a first catalyst compound, a second catalyst compound, and an activator; and forming a polyethylene composition, the first catalyst compound being represented by Formula (I)

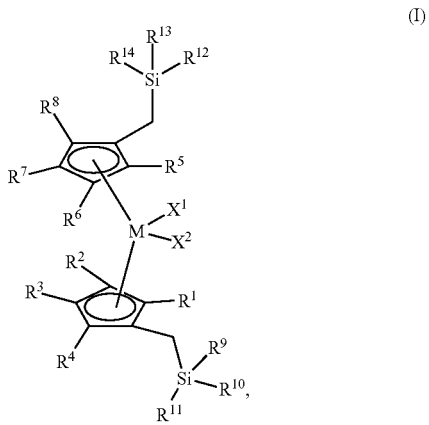

wherein:
  M is Ti, Hf, or Zr;
  each of $X^1$ and $X^2$ is independently $C_1$ to $C_{20}$ hydrocarbyl radical, a functional group comprising elements from Groups 13 to 17 of the periodic table of the elements, or $X^1$ and $X^2$ join together to form a $C_4$ to $C_{62}$ cyclic or polycyclic ring structure;
  each of $R^1$, $R^2$, $R^3$, $R^4$, $R^5$, $R^6$, $R^7$, and $R^8$ is independently selected from hydrogen, halogen, $C_1$-$C_{40}$ hydrocarbyl, substituted $C_1$-$C_{40}$ hydrocarbyl, a functional group comprising elements from Groups 13 to 17 of the periodic table of the elements or one or more of $R^1$ and $R^2$, $R^2$ and $R^3$, $R^3$ and $R^4$, $R^5$ and $R^6$, $R^6$ and $R^7$, $R^7$ and $R^8$ are joined to form a saturated ring, unsaturated ring, substituted saturated ring, or substituted unsaturated ring, such as a substituted or unsubstituted $C_4$ to $C_{62}$ cyclic or polycyclic ring; and
  each of $R^9$, $R^{10}$, $R^{10}$, $R^{11}$, $R^{12}$, and $R^{13}$ is independently selected from hydrogen, $C_1$-$C_{40}$ hydrocarbyl, or substituted $C_1$-$C_{40}$ hydrocarbyl; and
  the second catalyst compound being represented by Formula (IIa) or Formula (IIb):

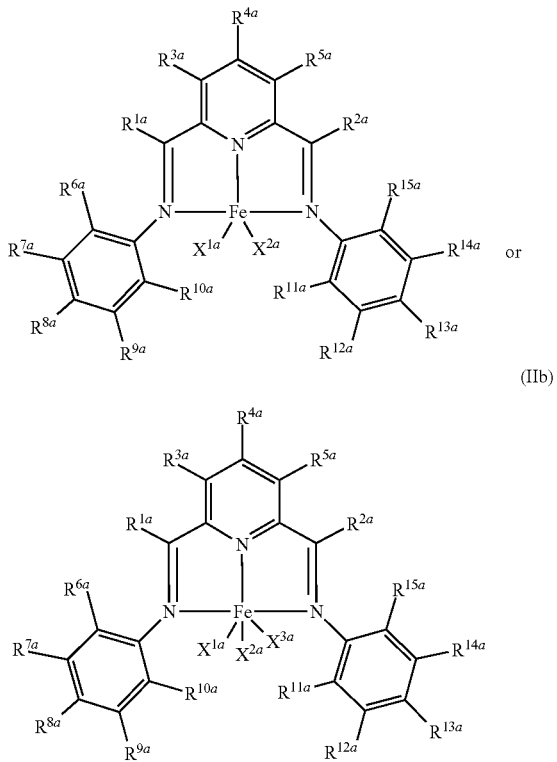

wherein:
- each of $R^{6a}$, $R^{10a}$, $R^{11a}$, and $R^{15a}$ are independently halogen, —$CF_3$, or $C_1$-$C_{22}$-alkyl, or —OR';
- each of $R^{1a}$ and $R^{2a}$ is independently hydrogen, $C_1$-$C_{22}$-alkyl, $C_2$-$C_{22}$-alkenyl, $C_6$-$C_{22}$-aryl, arylalkyl wherein alkyl has from 1 to 10 carbon atoms and aryl has from 6 to 20 carbon atoms, or five-, six- or seven-membered heterocyclyl comprising at least one atom selected from N, P, O and S, wherein each of $R^{1a}$ and $R^{2a}$ is optionally substituted by halogen, —NR'$_2$, —OR' or —SiR"$_3$, wherein $R^{1a}$ optionally bonds with $R^{1a}$, and $R^{2a}$ optionally bonds with $R^{5a}$, in each case to independently form a five-, six- or seven-membered ring;
- each of $R^{3a}$, $R^{4a}$, $R^{5a}$, $R^{7a}$, $R^{8a}$, $R^{9a}$, $R^{12a}$, $R^{13a}$, and $R^{14a}$ is independently hydrogen, $C_1$-$C_{22}$-alkyl, $C_2$-$C_{22}$-alkenyl, $C_6$-$C_{22}$-aryl, arylalkyl wherein alkyl has from 1 to 10 carbon atoms and aryl has from 6 to 20 carbon atoms, halogen, —NR'$_2$, —OR', —SiR"$_3$ or five-, six- or seven-membered heterocyclyl comprising at least one atom selected from N, P, O and S; and
- each of $X^{1a}$, $X^{2a}$, and $X^{3a}$ is independently hydrogen, halogen, $C_1$-$C_{20}$-alkyl, $C_2$-$C_{10}$-alkenyl, $C_6$-$C_{20}$-aryl, arylalkyl wherein alkyl has from 1 to 10 carbon atoms and aryl has from 6 to 20 carbon atoms, —NR'$_2$, —OR', —SR', —SO$_3$R', —OC(O)R', —CN, —SCN, β-diketonate, —CO, —BF$_4^-$, —PF$_6^-$ or bulky non-coordinating anion, or $X^{1a}$ and $X^{2a}$ optionally bond to form a five- or six-membered ring.

DETAILED DESCRIPTION

Figure 1A:
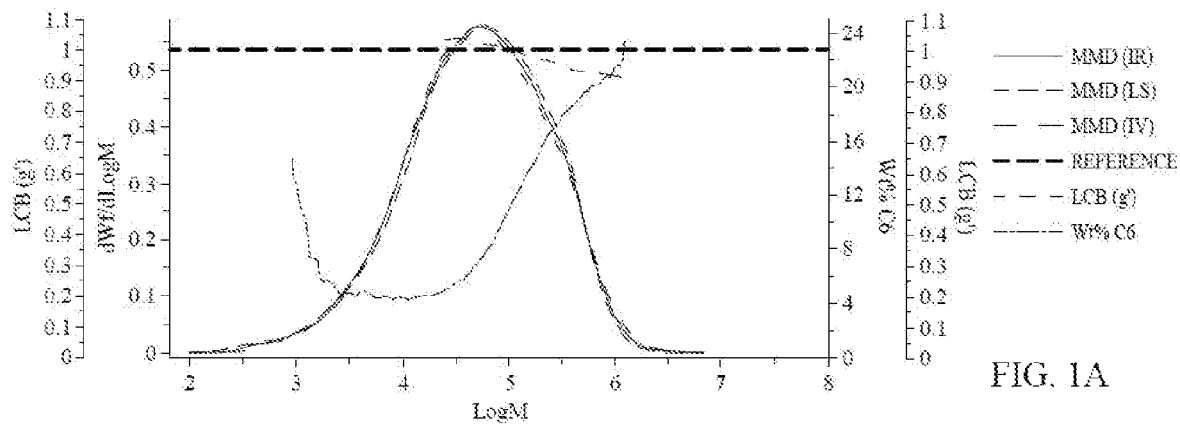
FIGS. 1A-1C are gel permeation chromatography (GPC-IR5-LS-VIS) spectra of comparative polymers and an example ethylene hexene copolymer and according to at least one embodiment of the present disclosure.

The present disclosure generally relates to catalyst systems and polyethylene compositions having an improved balance of one or more of, e.g., stiffness, toughness, or processability. The present disclosure further provides polyethylene compositions for use in films or other useful. Films of the present disclosure can have a combination of high stiffness (e.g., about 40,000 psi) and excellent Dart (e.g., about 640 g/mil). Catalyst systems and processes of the present disclosure include a mixed catalyst system of a metallocene catalyst, such as a Group 4 cyclopentadienyl metallocene catalyst, and a 2,6-bis(imino)pyridyl iron complex. Polyethylene compositions can be obtained from such catalyst systems and can have a melt index ($I_2$) of, e.g., about 1.3, and a melt index ratio ($I_{21}/I_2$) of, e.g., about 23.5. Polyethylene compositions having a unique of combination stiffness, toughness, processability, and other properties, are further described below.

For the purposes of this present disclosure, and unless otherwise specified, all numerical values within the detailed description and the claims herein are modified by "about" or "approximately" the indicated value, and consider experimental error and variations that would be expected by a person having ordinary skill in the art.

As used herein, a "composition" can include component(s) of the composition and/or reaction product(s) of two or more components of the composition. Compositions of the present disclosure can be prepared by any suitable mixing process.

For the purposes of this present disclosure, and unless otherwise specified, the term "olefin," alternatively termed "alkene," refers to an unsaturated hydrocarbon compound having a hydrocarbon chain containing at least one carbon-to-carbon double bond in the structure thereof, wherein the carbon-to-carbon double bond does not constitute a part of an aromatic ring. The olefin may be linear, branched, or cyclic. For purposes of this specification and the claims appended thereto, when a polymer or copolymer is referred to as comprising an olefin, including, but not limited to ethylene, propylene, and butene, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Thus, an "olefin" is intended to embrace all structural isomeric forms of olefins, unless it is specified to mean a single isomer or the context clearly indicates otherwise. An oligomer is a polymer having a low molecular weight, such as an Mn of 21,000 g/mol or less (such as 10,000 g/mol or less), and/or a low number of mer units, such as 100 mer units or less (such as 75 mer units or less).

For the purposes of this present disclosure, and unless otherwise specified, the term "alpha-olefin" refers to an olefin having a terminal carbon-to-carbon double bond in the structure thereof ((R'R")—C=CH$_2$, where R' and R" is independently hydrogen or any hydrocarbyl group; such as R' is hydrogen and R" is an alkyl group). A "linear alpha-olefin" is an alpha-olefin defined in this paragraph wherein R' is hydrogen, and R" is hydrogen or a linear alkyl group. Non-limiting examples of alpha-olefins include ethylene, 1-butene, 1-pentene, 1-hexene, 1-heptene, 1-octene, 1-nonene, 1-decene, 1-undecene 1-dodecene, 1-tridecene, 1-tetradecene, 1-pentadecene, 1-hexadecene, 1-heptadecene, 1-octadecene, 1-nonadecene, 1-eicosene, 1-heneicosene, 1-docosene, 1-tricosene, 1-tetracosene, 1-pentacosene, 1-hexacosene, 1-heptacosene, 1-octacosene, 1-nonacosene, 1-triacontene, 4-methyl-1-pentene, 3-methyl-1-pentene, 5-methyl-1-nonene, 3,5,5-trimethyl-1-hexene, vinylcyclohexane, and vinylnorbornane. Non-limiting examples of cyclic olefins and diolefins include cyclobutene, cyclopentene, cyclohexene, cycloheptene, cyclooctene, cyclononene, cyclodecene, norbornene, 4-methylnorbornene, 2-methylcyclopentene, 4-methylcyclopentene, vinylcyclohexane, norbornadiene, dicyclopentadiene, 5-ethylidene-2-norbornene, vinylcyclohexene, 5-vinyl-2-norbornene, 1,3-divinyl cycl ° pentane, 1,2-divinylcyclohexane, 1,3-divinyl cycl ° hexane, 1,4-divinylcyclohexane, 1,5-divinylcyclooctane, 1-allyl-4-vinylcyclohexane, 1,4-diallylcyclohexane, 1-allyl-5-vinylcyclooctane, and 1,5-diallylcyclooctane.

As used herein, and unless otherwise specified, the term "C$_n$" means hydrocarbon(s) having n carbon atom(s) per molecule, wherein n is a positive integer. The term "hydrocarbon" means a class of compounds containing hydrogen bound to carbon, and encompasses (i) saturated hydrocarbon compounds, (ii) unsaturated hydrocarbon compounds, and (iii) mixtures of hydrocarbon compounds (saturated and/or unsaturated), including mixtures of hydrocarbon compounds having different values of n. Likewise, a "C$_m$-C$_y$" group or compound refers to a group or compound comprising carbon atoms at a total number thereof in the range from m to y. Thus, a C$_1$-C$_{50}$ alkyl group refers to an alkyl group comprising carbon atoms at a total number thereof in the range from 1 to 50.

For the purposes of this present disclosure, and unless otherwise specified, the terms "group," "radical," and "substituent" may be used interchangeably.

For the purposes of this present disclosure, and unless otherwise specified, the term "alkyl" or "alkyl group" interchangeably refers to a hydrocarbyl group consisting of carbon and hydrogen atoms. An alkyl group can be substituted or unsubstituted and can be linear, branched, or cyclic.

For the purposes of this present disclosure, and unless otherwise specified, the term "cycloalkyl" or "cycloalkyl group" interchangeably refers to a hydrocarbyl group wherein the carbon atoms form one or more ring structures.

For the purposes of this present disclosure, and unless otherwise specified, the term "alkenyl" or "alkenyl group" interchangeably refers to a linear unsaturated hydrocarbyl group comprising a C=C bond therein.

For the purposes of this present disclosure, and unless otherwise specified, the term "aryl" or "aryl group" interchangeably refers to a hydrocarbyl group comprising an aromatic ring structure therein.

For the purposes of this present disclosure, and unless otherwise specified, a substituted group refers to a group in which at least one atom is replaced by a different atom or a group. Thus, a substituted alkyl group is an alkyl group in which at least one hydrogen atom is replaced by a hydrocarbyl group, a halogen, any other non-hydrogen group, and/or at least one carbon atom and hydrogen atoms bonded thereto is replaced by a different group. As a non-limiting example, a substituted group is a radical in which at least one hydrogen atom has been substituted with a heteroatom or heteroatom containing group, such as with at least one functional group, such as halogen (Cl, Br, I, F), NR*$_2$, OR*, SeR*, TeR*, PR*$_2$, AsR*$_2$, SbR*$_2$, SR*, BR*$_2$, SiR*$_3$, GeR*$_3$, SnR*$_3$, PbR*$_3$, and the like or where at least one heteroatom has been inserted within the hydrocarbyl radical, such as halogen (Cl, Br, I, F), O, S, Se, Te, NR*, PR*, AsR*, SbR*, BR*, SiR*$_2$, GeR*$_2$, SnR*$_2$, PbR*$_2$, and the like, where R* is, independently, hydrogen or a hydrocarbyl.

For the purposes of this present disclosure, and unless otherwise specified, the terms "hydrocarbyl radical," "hydrocarbyl group," or "hydrocarbyl" interchangeably refer to a group consisting of hydrogen and carbon atoms only. A hydrocarbyl group can be saturated or unsaturated, linear or branched, cyclic or acyclic, aromatic, or non-aromatic. Examples of such radicals include, but are not limited to, alkyl groups such as methyl, ethyl, n-propyl, isopropyl, n-butyl, isobutyl, sec-butyl, tert-butyl, pentyl, iso-amyl, hexyl, octyl, cyclopropyl, cyclobutyl, cyclopentyl, cyclohexyl, cyclooctyl, and aryl groups, such as phenyl, benzyl, naphthyl.

For the purposes of this present disclosure, and unless otherwise specified, substituted hydrocarbyl radicals are radicals in which at least one hydrogen atom has been substituted with a heteroatom or heteroatom containing group, such as with at least one functional group, such as halogen (Cl, Br, I, F), NR*$_2$, OR*, SeR*, TeR*, PR*$_2$, AsR*$_2$, SbR*$_2$, SR*, BR*$_2$, SiR*$_3$, GeR*$_3$, SnR*$_3$, PbR*$_3$, and the like or where at least one heteroatom has been inserted within the hydrocarbyl radical, such as halogen (Cl, Br, I, F), O, S, Se, Te, NR*, PR*, AsR*, SbR*, BR*, SiR*$_2$, GeR*$_2$, SnR*$_2$, PbR*$_2$, and the like, where R* is, independently, hydrogen or a hydrocarbyl.

In some embodiments, the hydrocarbyl radical is defined to be C$_1$-C$_{100}$ alkyls that may be linear, branched, or cyclic. Non-limiting examples of such radicals can include methyl, ethyl, ethenyl and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, heneicosenyl, docosenyl, tricosenyl, tetracosenyl, pentacosenyl, hexacosenyl, heptacosenyl, octacosenyl, nonacosenyl, triacontenyl, propynyl, butynyl, pentynyl, hexynyl, heptynyl, octynyl, nonynyl, decynyl, undecynyl, dodecynyl, tridecynyl, tetradecynyl, pentadecynyl, hexadecynyl, heptadecynyl, octadecynyl, nonadecynyl, eicosynyl, heneicosynyl, docosynyl, tricosynyl, tetracosynyl, pentacosynyl, hexacosynyl, heptacosynyl, octacosynyl, nonacosynyl, and triacontynyl. Also included are isomers of saturated, partially unsaturated and aromatic cyclic structures wherein the radical may additionally be subjected to the types of substitutions described above. Examples include phenyl, methylphenyl, benzyl, methylbenzyl, naphthyl, cyclopropyl, cyclobutyl, cyclopentyl, cyclohexyl, cyclohexenyl, methylcyclohexyl, cyclooctyl, and the like. For this present disclosure, when a radical is listed, it indicates that radical type and all other radicals formed when that radical type is subjected to the substitutions defined above. Alkyl, alkenyl, and alkynyl radicals listed include all isomers including where appropriate cyclic isomers, for example, butyl includes n-butyl, 2-methylpropyl, 1-methylpropyl, tert-butyl, and cyclobutyl (and analogous substituted cyclopropyls); pentyl includes n-pentyl, cyclopentyl, 1-methylbutyl, 2-methylbutyl, 3-methylbutyl, 1-ethylpropyl, and neopentyl (and analogous substituted cyclobutyls and cyclopropyls); butenyl includes E and Z forms of 1-butenyl, 2-butenyl, 3-butenyl, 1-methyl-1-propenyl, 1-methyl-2-propenyl, 2-methyl-1-propenyl, and 2-methyl-2-propenyl (and cyclobutenyls and cyclopropenyls). Cyclic compound having substitutions include all isomer forms, for example, methylphenyl would include ortho-methylphenyl, meta-methylphenyl and para-methylphenyl; dimethylphenyl would include 2,3-dimethylphenyl, 2,4-dimethylphenyl, 2,5-dimethylphenyl, 2,6-diphenylmethyl, 3,4-dimethylphenyl, and 3,5-dimethylphenyl.

For the purposes of this present disclosure, and unless otherwise specified, the terms "alkoxy" and "alkoxide" refer to an alkyl or aryl group bound to an oxygen atom, such as an alkyl ether or aryl ether group/radical connected to an oxygen atom and can include those where the alkyl/aryl group is a $C_1$-$C_{10}$ hydrocarbyl. The alkyl group may be straight chain, branched, or cyclic. The alkyl group may be saturated or unsaturated. Examples of suitable alkoxy radicals can include methoxy, ethoxy, n-propoxy, iso-propoxy, n-butoxy, iso-butoxy, sec-butoxy, tert-butoxy, phenoxyl.

For the purposes of this present disclosure, and unless otherwise specified, the term "substituted hydrocarbyl" refers to a hydrocarbyl radical in which at least one hydrogen atom of the hydrocarbyl radical has been substituted with at least one heteroatom (such as halogen, e.g., Br, Cl, F or I) or heteroatom-containing group (such as a functional group, e.g., —NR*$_2$, —OR*, —SeR*, —TeR*, —PR*$_2$, —AsR*$_2$, —SbR*$_2$, —SR*, —BR*$_2$, —SiR*$_3$, —GeR*$_3$, —SnR*$_3$, —PbR*$_3$, —(CH$_2$)q-SiR*$_3$, and the like, where q is 1 to 10 and each R* is independently hydrogen, a hydrocarbyl or halocarbyl radical, and two or more R* may join together to form a substituted or unsubstituted completely saturated, partially unsaturated, or aromatic cyclic or polycyclic ring structure), or where at least one heteroatom has been inserted within a hydrocarbyl ring.

For the purposes of this present disclosure, and unless otherwise specified, the term "ring atom" refers to an atom that is part of a cyclic ring structure. By this definition, a benzyl group has six ring atoms and tetrahydrofuran has 5 ring atoms.

For the purposes of this present disclosure, and unless otherwise specified, the term "aryl" or "aryl group" refers to an aromatic ring such as phenyl, naphthyl, xylyl, etc. Likewise, heteroaryl refers to an aryl group where a ring carbon atom (or two or three ring carbon atoms) has been replaced with a heteroatom, such as N, O, or S. As used herein, the term "aromatic" also refers to pseudoaromatic heterocycles which are heterocyclic substituents that have similar properties and structures (nearly planar) to aromatic heterocyclic ligands, but are not by definition aromatic.

For the purposes of this present disclosure, and unless otherwise specified, a heterocyclic ring is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom substituted ring.

Where isomers of a named alkyl, alkenyl, alkoxide, or aryl group exist (e.g., n-butyl, iso-butyl, sec-butyl, and tert-butyl) reference to one member of the group (e.g., n-butyl) shall expressly disclose the remaining isomers (e.g., iso-butyl, sec-butyl, and tert-butyl) in the family. Likewise, reference to an alkyl, alkenyl, alkoxide, or aryl group without specifying a particular isomer (e.g., butyl) expressly discloses all isomers (e.g., n-butyl, iso-butyl, sec-butyl, and tert-butyl).

As used herein, Mn is number average molecular weight, Mw is weight average molecular weight, and Mz is z average molecular weight, wt % is weight percent, and mol % is mole percent. Molecular weight distribution (MWD), also referred to as polydispersity index (PDI), is defined to be Mw divided by Mn. Unless otherwise noted, all molecular weight units (e.g., Mw, Mn, Mz) are g/mol (g mol$^{-1}$).

A "catalyst system" is a combination of at least one catalyst compound, at least one activator, an optional co-activator, and an optional support material. When "catalyst system" is used to describe such a pair before activation, it means the unactivated catalyst complex (precatalyst) together with an activator and, optionally, a co-activator. When it is used to describe such a pair after activation, it means the activated complex and the activator or other charge-balancing moiety. The transition metal compound may be neutral as in a precatalyst, or a charged species with a counter ion as in an activated catalyst system. For the purposes of this present disclosure and the claims thereto, when catalyst systems are described as comprising neutral stable forms of the components, it is well understood by one of ordinary skill in the art, that the ionic form of the component is the form that reacts with the monomers to produce polymers. A polymerization catalyst system is a catalyst system that can polymerize monomers to polymer. Furthermore, catalyst compounds and activators represented by formulae herein embrace both neutral and ionic forms of the catalyst compounds and activators.

For the purposes of this present disclosure, and unless otherwise specified, the terms "catalyst" and "catalyst compound" are defined to mean a compound capable of initiating catalysis and/or of facilitating a chemical reaction with little or no poisoning/consumption. In the description herein, the catalyst may be described as a catalyst precursor, a pre-catalyst compound, or a transition metal compound, and these terms are used interchangeably. A catalyst compound may be used by itself to initiate catalysis or may be used in combination with an activator to initiate catalysis. When the catalyst compound is combined with an activator to initiate catalysis, the catalyst compound is often referred to as a pre-catalyst or catalyst precursor.

For the purposes of this present disclosure, and unless otherwise specified, a scavenger is a compound typically added to facilitate oligomerization/polymerization by scavenging impurities. Some scavengers may also act as activators and may be referred to as co-activators. A co-activator, that is not a scavenger, may be used in conjunction with an activator in order to form an active catalyst. In some embodiments, a co-activator can be pre-mixed with the catalyst compound to form an alkylated catalyst compound.

For the purposes of this present disclosure, ethylene shall be considered an α-olefin.

In at least one embodiment, the catalyst compound for the polymerization with at least one activator to promote polymerization of the ethylene to form the LLDPE.

Catalyst Precursors and Activators

In at least one embodiment of the present disclosure, the catalyst system can include a metallocene catalyst (a first catalyst compound), an iron catalyst (a second catalyst compound), and an activator.

Metallocene Catalyst

In aspects of the present disclosure the metallocene catalyst can be represented by Formula (I):

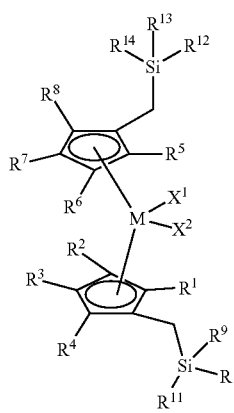

In at least one embodiment, M is a Group 4 metal such as titanium (Ti), hafnium (Hf) or zirconium (Zr), such as hafnium.

In at least one embodiment, each of $X^1$ and $X^2$ is independently a univalent anionic ligand, a diene ligand, an alkylidene ligand, or $X^1$ and $X^2$ are joined to form a metallocyclic ring. Each of $X^1$ and $X^2$ can be independently a halide, a hydride, an alkyl group, an alkenyl group or an arylalkyl group. In at least one embodiment, each of $X^1$ and $X^2$ is independently $C_1$ to $C_{20}$ hydrocarbyl radical, a functional group comprising elements from Groups 13 to 17 of the periodic table of the elements, or $X^1$ and $X^2$ join together to form a $C_4$ to $C_{62}$ cyclic or polycyclic ring structure. In at least one embodiment, each of $X^1$ and $X^2$ is independently selected from hydrocarbyl radicals having from 1 to 20 carbon atoms, aryls, hydrides, amides, alkoxides, sulfides, phosphides, halides, dienes, amines, phosphines, ethers, and a combination thereof, (each of $X^1$ and $X^2$ may form a part of a fused ring or a ring system), such as $X^1$ and $X^2$ is independently selected from halides, aryls, and $C_1$ to $C_5$ alkyl groups, such as phenyl, methyl, ethyl, propyl, butyl, pentyl, or chloride group. In at least one embodiment, each of $X^1$ and $X^2$ are chloride.

In at least one embodiment, each of $R^1$, $R^2$, $R^3$, $R^4$, $R^5$, $R^6$, $R^7$, and $R^8$ is independently selected from hydrogen, halogen, $C_1$-$C_{40}$ hydrocarbyl, substituted $C_1$-$C_{40}$ hydrocarbyl, a functional group comprising elements from Groups 13 to 17 of the periodic table of the elements (such as —NR'2, —SR', —OR', —OSiR'$_3$, or —PR'$_2$, wherein each R' is independently hydrogen, halogen, $C_1$-$C_{10}$ alkyl, or $C_6$-$C_{10}$ aryl) or one or more of $R^1$ and $R^2$, $R^2$ and $R^3$, $R^3$ and $R^4$, $R^5$ and $R^6$, $R^6$ and $R^7$, $R^7$ and $R^8$ are joined to form a saturated ring, unsaturated ring, substituted saturated ring, or substituted unsaturated ring, such as a substituted or unsubstituted $C_4$ to $C_{62}$ cyclic or polycyclic ring.

In at least one embodiment, each of $R^9$, $R^{10}$, $R^{10}$, $R^{11}$, $R^{12}$, and $R^{13}$ is independently selected from hydrogen, $C_1$-$C_{40}$ hydrocarbyl (such as $C_{1-20}$ hydrocarbyl, such as $C_1$-$C_{12}$ hydrocarbyl), or substituted $C_1$-$C_{40}$ hydrocarbyl (such as substituted $C_{1-20}$ hydrocarbyl, such as substituted $C_1$-$C_{12}$ hydrocarbyl), alkoxide, or amide.

In at least one embodiment, each of $R^1$, $R^2$, $R^3$, $R^4$, $R^5$, $R^6$, $R^7$, and $R^8$ is independently is independently hydrogen, halide, alkoxide or $C_1$ to $C_{40}$ substituted or unsubstituted hydrocarbyl (such as $C_1$ to $C_{12}$ substituted or unsubstituted hydrocarbyl), or —R"—SiR'$_3$ or —R"—CR'$_3$ where R" is $C_1$ to $C_4$ hydrocarbyl (such as —CH$_2$—; —CH$_2$CH$_2$—; -(Me)CHCH$_2$—; or -(Me)CH—, and each R' is independently $C_1$ to $C_{20}$ substituted or unsubstituted hydrocarbyl and at least one R' is $C_1$ to $C_{20}$ substituted or unsubstituted hydrocarbyl. In at least one embodiment, each R' is independently selected from methyl, ethyl, propyl, butyl, pentyl, hexyl, phenyl, biphenyl, or an isomer thereof, R' is a $C_1$ to $C_{20}$ alkyl or aryl, such as methyl, methyl phenyl, phenyl, biphenyl, pentamethylphenyl, tetramethylphenyl, or di-t-butylphenyl, provided that at least one R' is not H, alternatively 2 R' are not H, alternatively 3 R' are not H.

In at least one embodiment, $C_1$-$C_{40}$ hydrocarbyl, $C_{1-20}$ hydrocarbyl, or $C_1$-$C_{12}$ hydrocarbyl is selected from methyl, ethyl, n-propyl, isopropyl, n-butyl, isobutyl, sec-butyl, n-pentyl, isopentyl, sec-pentyl, n-hexyl, isohexyl, sec-hexyl, n-heptyl, isoheptyl, sec-heptyl, n-octyl, isooctyl, sec-octyl, n-nonyl, isononyl, sec-nonyl, n-decyl, isodecyl, or sec-decyl.

In at least one embodiment, each of $R^1$, $R^2$, $R^3$, $R^4$, $R^5$, $R^6$, $R^7$, and $R^8$ is independently hydrogen, —CH$_2$—SiMe$_3$, —CH$_2$—SiEt$_3$, —CH$_2$—SiPr$_3$, —CH$_2$—SiBu$_3$, —CH$_2$—SiCy$_3$, —CH$_2$—C(CH$_3$)$_3$, —CH$_2$—CH(CH$_3$)$_2$, —CH$_2$CPh$_3$, —CH$_2$(C$_6$Me$_5$), —CH$_2$—C(CH$_3$)$_2$Ph, —CH$_2$—C(Cy)Ph$_2$, —CH$_2$—SiPh$_3$, —CH$_2$—Si(CH$_3$)$_2$Ph, —CH$_2$—Si(CH$_3$)$_2$Ph, —CH$_2$—Si(CH$_3$)Ph$_2$, —CH$_2$—Si(Et)$_2$Ph, —CH$_2$—Si(Et)Ph$_2$, —CH$_2$—Si(Cy)Ph$_2$, or —CH$_2$—Si(Cy)$_2$Ph.

A catalyst represented by Formula (I) can be an asymmetric catalyst. Useful asymmetric catalysts can be such that a mirror plane cannot be drawn through the metal center and the cyclopentadienyl moieties bridged to the metal center are structurally different.

In at least one embodiment, the metallocene catalyst represented by Formula (I) is one or more of:
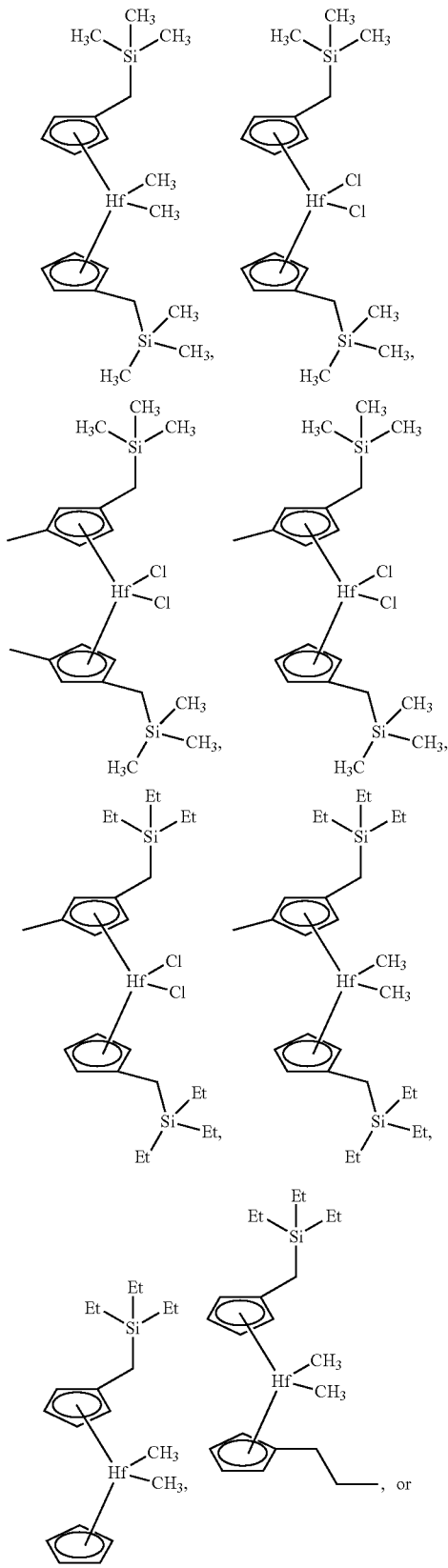
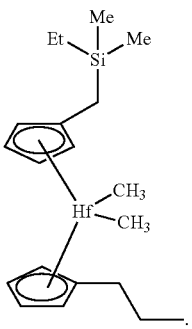
In at least one embodiment, the metallocene catalyst represented by Formula (I) is:
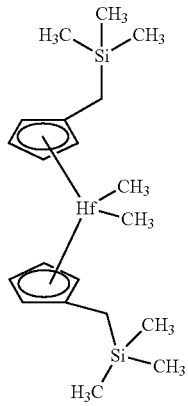
Iron Catalyst
In at least one embodiment, the second catalyst may be an iron complex represented by Formula (IIa) and/or Formula (IIb):
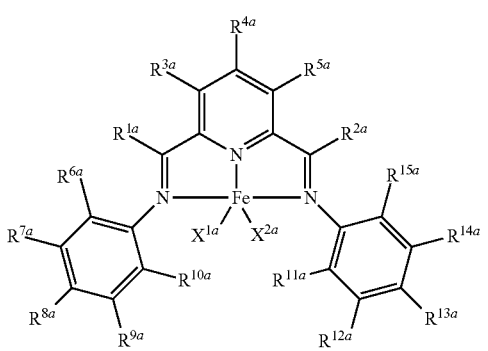

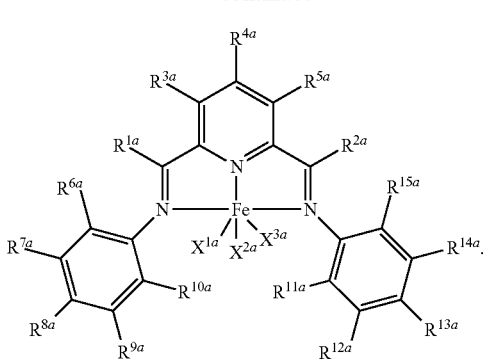

(IIb)

Formula (II), as used herein, refers to one or more of Formula (IIa) and/or Formula (IIb).

In at least one embodiment, each of $R^{6a}$, $R^{10a}$, $R^{11a}$, and $R^{15a}$ are independently halogen, —$CF_3$, or $C_1$-$C_{22}$-alkyl, $C_2$-$C_{22}$-alkenyl, $C_6$-$C_{22}$-aryl, arylalkyl (wherein alkyl has from 1 to 10 carbon atoms and aryl has from 6 to 20 carbon atoms), NR'$_2$, —OR', —SiR"$_3$ or five-, six- or seven-membered heterocyclyl comprising at least one atom selected from N, P, O and S. In at least one embodiment, each of $R^{6a}$, $R^{10a}$, $R^{11a}$, and $R^{15a}$ are independently fluorine, chlorine, bromine, or iodine. In at least one embodiment, each of $R^{6a}$, $R^{10a}$, $R^{11a}$ and $R^{15a}$ is independently optionally substituted by halogen, —NR'$_2$, —OR', or —SiR"$_3$.

In at least one embodiment, each of $R^{1a}$ and $R^{2a}$ is independently hydrogen, $C_1$-$C_{22}$-alkyl, $C_2$-$C_{22}$-alkenyl, $C_6$-$C_{22}$-aryl, arylalkyl wherein alkyl has from 1 to 10 carbon atoms and aryl has from 6 to 20 carbon atoms, or five-, six- or seven-membered heterocyclyl comprising at least one atom selected from N, P, O and S, wherein each of $R^{1a}$ and $R^{2a}$ is optionally substituted by halogen, —NR'$_2$, —OR' or —SiR"$_3$, wherein $R^{1a}$ optionally bonds with $R^{1a}$, and $R^{2a}$ optionally bonds with $R^{5a}$, in each case to independently form a five-, six- or seven-membered ring. In at least one embodiment, $R^{1a}$ and $R^{2a}$ are independently $C_1$-$C_{22}$-alkyl, substituted $C_1$-$C_{22}$-alkyl, unsubstituted phenyl, or substituted phenyl. In at least one embodiment, each of $R^{1a}$ and $R^{2a}$ is independently selected from methyl, ethyl, n-propyl, isopropyl, n-butyl, isobutyl, sec-butyl, tert-butyl, n-pentyl, isopentyl, sec-pentyl, tert-pentyl, n-hexyl, isohexyl, sec-hexyl, tert-hexyl, n-heptyl, isoheptyl, sec-heptyl, tert-heptyl, n-octyl, isooctyl, sec-octyl, tert-octyl, n-nonyl, isononyl, sec-nonyl, tert-nonyl, n-decyl, isodecyl, sec-decyl, and tert-decyl.

In at least one embodiment, each of $R^{3a}$, $R^{4a}$, $R^{5a}$, $R^{7a}$, $R^{8a}$, $R^{9a}$, $R^{12a}$, $R^{13a}$, and $R^{14a}$ is independently hydrogen, $C_1$-$C_{22}$-alkyl, $C_2$-$C_{22}$-alkenyl, $C_6$-$C_{22}$-aryl, arylalkyl wherein alkyl has from 1 to 10 carbon atoms and aryl has from 6 to 20 carbon atoms, halogen, —NR'$_2$, —OR', —SiR"$_3$ or five-, six- or seven-membered heterocyclyl comprising at least one atom selected from N, P, O and S. Each of $R^{3a}$, $R^{4a}$, $R^{5a}$, $R^{7a}$, $R^{8a}$, $R^{9a}$, $R^{12a}$, $R^{13a}$, and $R^{14a}$ is independently optionally substituted by halogen, —NR'$_2$, —OR', or —SiR"$_3$.

In at least one embodiment, each of $R^{8a}$ and $R^{13a}$ is independently selected from $C_1$-$C_{22}$-alkyl, wherein each of $R^{7a}$ and $R^{13a}$ is independently optionally substituted by halogen, —NR'$_2$, —OR', or —SiR"$_3$. In at least one embodiment, $R^{7a}$, $R^{9a}$, $R^{12a}$, and $R^{14a}$ is hydrogen. In at least one embodiment, each of $R^{1a}$, $R^{4a}$, and $R^{5a}$ is hydrogen.

In at least one embodiment, each of $X^{1a}$, $X^{2a}$, and $X^{3a}$ is independently halogen, hydrogen, $C_1$-$C_{20}$-alkyl, $C_2$-$C_{10}$-alkenyl, $C_6$-$C_{20}$-aryl, arylalkyl wherein alkyl has from 1 to 10 carbon atoms and aryl has from 6 to 20 carbon atoms, —NR'2, —OR', —SR', —SO$_3$R', —OC(O)R', —CN, —SCN, β-diketonate, —CO, —BF$_4^-$, —PF$_6$ or bulky non-coordinating anion, or $X^{1a}$ and $X^{2}$a optionally bond to form a five- or six-membered ring. Each R' is independently hydrogen, $C_1$-$C_{22}$-alkyl, $C_2$-$C_{22}$-alkenyl, $C_6$-$C_{22}$-aryl, arylalkyl wherein alkyl has from 1 to 10 carbon atoms and aryl has from 6 to 20 carbon atoms, or —SiR"$_3$, wherein R' is optionally substituted by halogen or nitrogen- or oxygen-containing groups, or two R' radicals optionally bond to form a five- or six-membered ring. Each R" is independently hydrogen, $C_1$-$C_{22}$-alkyl, $C_2$-$C_{22}$-alkenyl, $C_6$-$C_{22}$-aryl, arylalkyl wherein alkyl has from 1 to 10 carbon atoms and aryl has from 6 to 20 carbon atoms, wherein each R" is optionally substituted by halogen or nitrogen- or oxygen-containing groups, or two R" radicals optionally bond to form a five- or six-membered ring. In at least one embodiment, $X^{1a}$ and $X^{2a}$ are chlorine.

In at least one embodiment, each of $R^{6a}$, $R^{10a}$, $R^{11a}$, and $R^{15a}$ is chlorine; each of $R^{1a}$ and $R^{2a}$ is $C_1$-$C_{20}$ hydrocarbyl; each of $R^{1a}$, $R^{4a}$, and $R^{5a}$ is hydrogen; each of $R^{8a}$ and $R^{13a}$ is $C_1$-$C_{20}$ hydrocarbyl; each of $R^{7a}$, $R^{9a}$, $R^{12a}$ and $R^{14a}$, is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, halogen, —NR'2, —OR', —SiR"$_3$ or five-, six- or seven-membered heterocyclyl comprising at least one atom selected from the group consisting of N, P, O and S; $R^{1a}$, $R^{2a}$, $R^{3a}$, $R^{4a}$, $R^{5a}$, $R^{7a}$, $R^{8a}$, $R^{9a}$, $R^{12a}$, and $R^{13a}$ are optionally substituted by halogen, —NR'$_2$, —OR' or —SiR"3; each R' is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or —SiR"$_3$, wherein R' is optionally substituted by halogen, or two R' radicals optionally bond to form a five- or six-membered ring; each R" is independently hydrogen, $C_1$-$C_{22}$-alkyl, $C_2$-$C_{22}$-alkenyl, $C_6$-$C_{22}$-aryl or arylalkyl where alkyl has from 1 to 10 carbon atoms and aryl has from 6 to 20 carbon atoms, or two R" radicals optionally bond to form a five- or six-membered ring.

In at least one embodiment, an iron catalyst represented by Formula (II), which refers to one or more of Formula (IIa) or Formula (IIb), is one or more of:

1

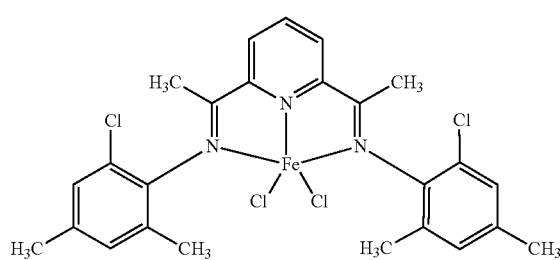

-continued
2
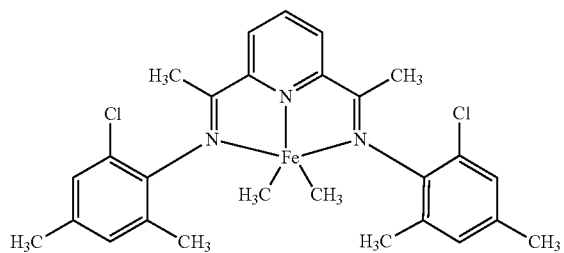
3
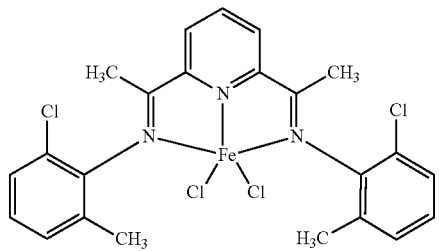
4
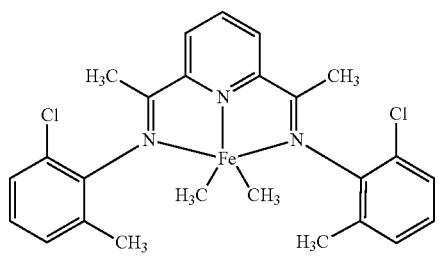
5
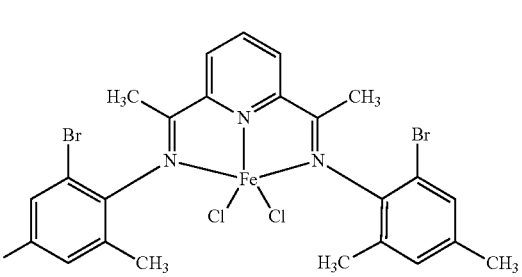
6
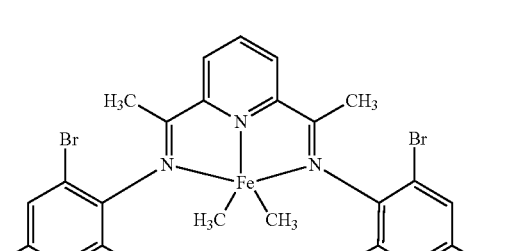
7
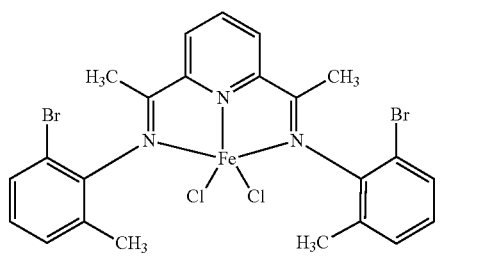
8
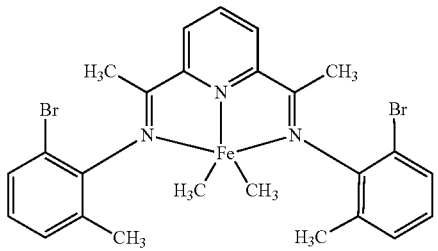
9
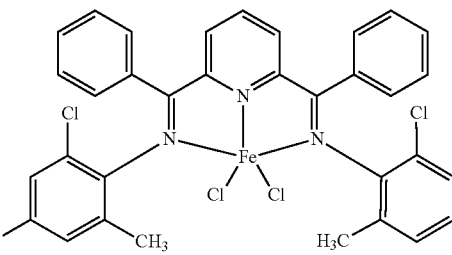
10
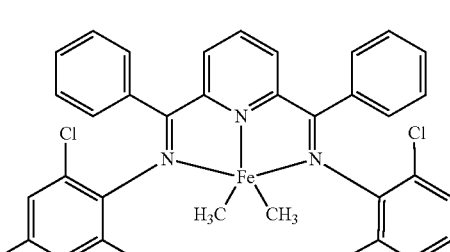
11
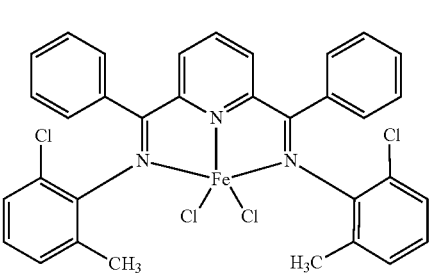
12
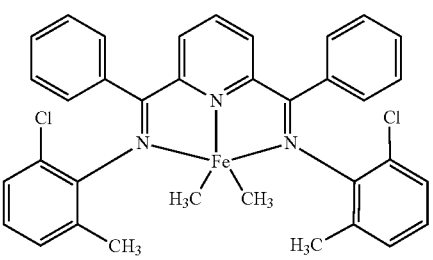
13
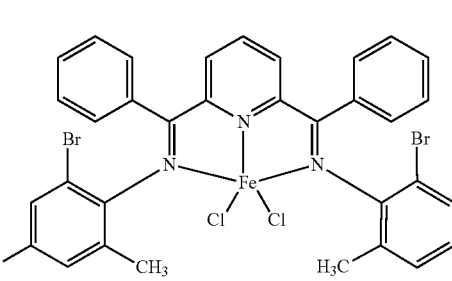

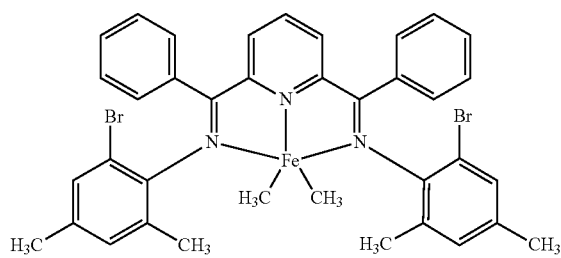

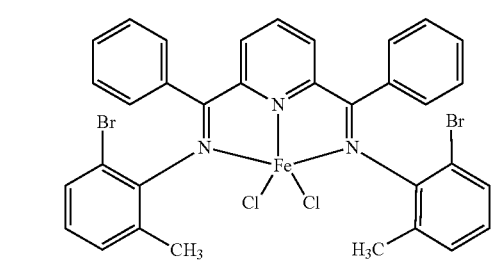

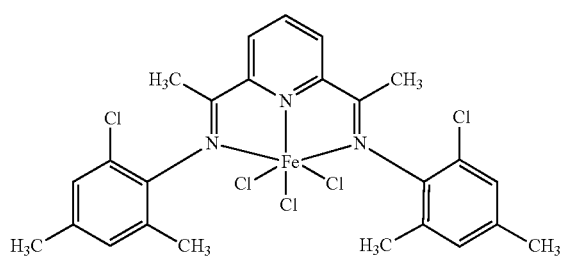

In at least one embodiment, an iron catalyst represented by Formula (II) is one or more of:

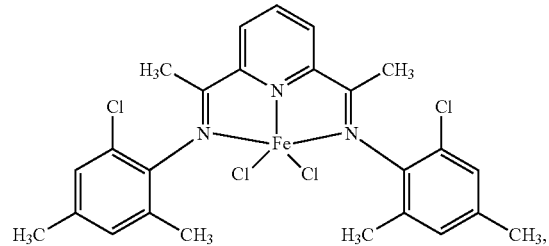

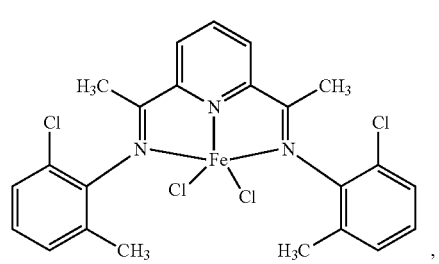

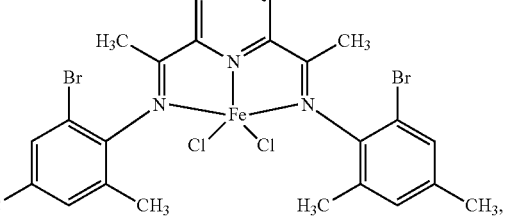

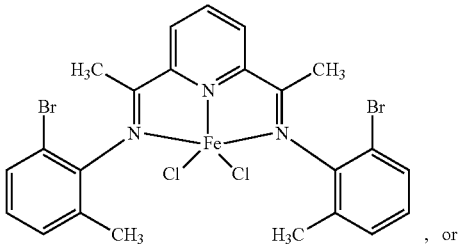

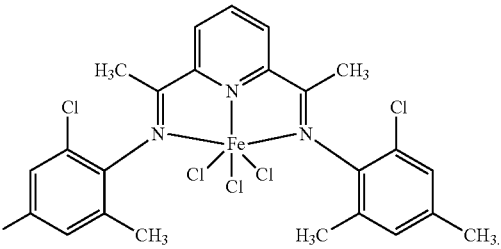

, or

In at least one embodiment, an iron catalyst represented by represented by Formula (II) is one or more of:

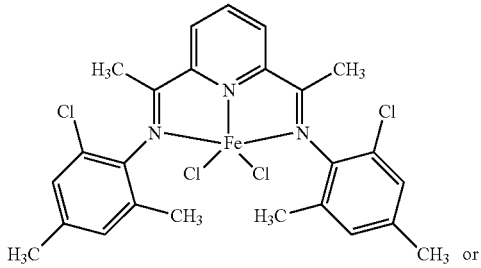

or

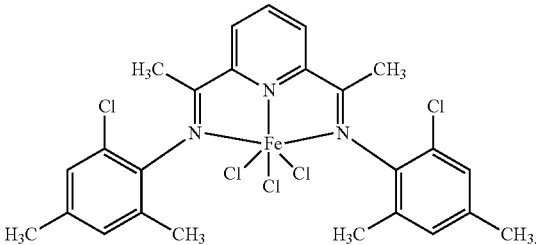

Support Material

In at least one embodiment of the present disclosure, the catalyst systems include the product of the combination of one or more support materials. In some embodiments, a support material is a porous support material, for example, talc, and inorganic oxides. Other support materials include zeolites, clays, organoclays, or any other organic or inorganic support material, or mixtures thereof. As used herein, "support" and "support material" are used interchangeably.

In at least one embodiment, a support material is an inorganic oxide in a finely divided form. Suitable inorganic oxide materials for use in the supported catalyst systems herein include Groups 2, 4, 13, and 14 metal oxides such as silica, alumina, and mixtures thereof. Other inorganic oxides that may be employed, either alone or in combination, with the silica or alumina are magnesia, titania, zirconia, and the like. Other suitable support materials, however, can be employed, for example, finely divided functionalized polyolefins such as finely divided polyethylene. Particularly useful supports include magnesia, titania, zirconia, montmorillonite, phyllosilicate, zeolites, talc, clays, and the like. Also, combinations of these support materials may be used, for example, silica-chromium, silica-alumina, silica-titania, and the like. Exemplary support materials include $Al_2O_3$, $ZrO_2$, $SiO_2$, and combinations thereof, such as, $SiO_2/Al_2O_3$, or $SiO_2/Al_2O_3$.

A support material, such as an inorganic oxide, can have a surface area in the range of from about 10 $m^2/g$ to about 700 $m^2/g$, a pore volume in the range of from about 0.1 cc/g to about 4.0 cc/g, and an average particle size in the range of from about 5 μm to about 500 μm. For example, the surface area of a support material can be in the range of from about 50 $m^2/g$ to about 500 $m^2/g$, the pore volume can be in the range of from about 0.5 cc/g to about 3.5 cc/g, and the average particle size can be in the range of from about 10 μm to about 200 μm. For example, the surface area of a support material can be in the range of from about 100 $m^2/g$ to about 400 $m^2/g$, pore volume can be in the range of from about 0.8 cc/g to about 3.0 cc/g, and the average particle size can be in the range of from about 5 μm to about 100 μm. The average pore size of a support material useful in at least one embodiment of the present disclosure is in the range of from about 10 Å to 1,000 Å, such as from about 50 Å to about 500 Å, such as from about 75 Å to about 350 Å. In at least one embodiment, a support material is a high surface area, amorphous silica (surface area≥300 $m^2$/gm, pore volume≥1.65 $cm^3$/gm), and is marketed under the tradenames of DAVISON 952 or DAVISON 955 by the Davison Chemical Division of W. R. Grace and Company, are particularly useful. In other embodiments, DAVIDSON 948 is used.

In at least one embodiment of the present disclosure, a support material may be dry, that is, free of absorbed water. Drying of the support material can be achieved by heating or calcining at about 100° C. to about 1,000° C., such as at least about 600° C. When a support material is silica, it is heated to at least 200° C., such as about 200° C. to about 850° C., such as at about 600° C.; and for a time of about 1 minute to about 100 hours, from about 12 hours to about 72 hours, or from about 24 hours to about 60 hours. The calcined support material can have at least some reactive hydroxyl (OH) groups.

In several classes of embodiments, the above two catalysts (represented by Formula (I) and Formula (II)) described herein are generally deposited on a support material at a loading level of about 10-100 micromoles of metal per gram of solid support; alternatively about 20-80 micromoles of metal per gram of solid support; or about 40-60 micromoles of metal per gram of support. But greater or lesser values may be used provided that the total amount of solid complex does not exceed the support's pore volume.

Activator

The terms "cocatalyst" and "activator" are used herein interchangeably. The catalyst systems described herein can typically include a catalyst complex as described above and an activator such as alumoxane or a non-coordinating anion and may be formed by combining the catalyst components described herein with activators in any manner known from the literature including combining them with supports, such as silica. The catalyst systems may also be added to or generated in solution polymerization or bulk polymerization (in the monomer). Catalyst systems of the present disclosure may have one or more activators and one, two or more catalyst components. Activators are defined to be any compound which can activate any one of the catalyst compounds described above by converting the neutral metal compound to a catalytically active metal compound cation. Non-limiting activators, for example, include alumoxanes, aluminum alkyls, ionizing activators, which may be neutral or ionic, and conventional-type cocatalysts. Suitable activators typically include alumoxane compounds, modified alumoxane compounds, and ionizing anion precursor compounds that abstract a reactive, σ-bound, metal ligand making the metal compound cationic and providing a charge-balancing non-coordinating or weakly coordinating anion, e.g. a non-coordinating anion.

Ionizing/Non Coordinating Anion Activators

The term "non-coordinating anion" (NCA) means an anion which either does not coordinate to a cation or which is only weakly coordinated to a cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with this present disclosure are those that are compatible, stabilize the transition metal cation in the sense of balancing its ionic charge at +1, and yet retain sufficient lability to permit displacement during polymerization. Ionizing activators useful herein typically comprise an NCA, particularly a compatible NCA. It is within the scope of this present disclosure to use an ionizing activator, neutral or ionic. It is also within the scope of this present disclosure to use neutral or ionic activators alone or in combination with alumoxane or modified alumoxane activators. For descriptions of useful activators please see U.S. Pat. Nos. 8,658,556 and 6,211,105.

Suitable activators can include N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, [Me$_3$NH$^+$][B(C$_6$F$_5$)$_4^-$]; 1-(4-(tris(pentafluorophenyl)borate)-2,3,5,6-tetrafluorophenyl)pyrrolidinium; and tetrakis(pentafluorophenyl)borate, 4-(tris(pentafluorophenyl)borate)-2,3,5,6-tetrafluoropyridine.

In at least one embodiment, the activator can include a triaryl carbenium (such as triphenylcarbenium tetraphenylborate, triphenylcarbenium tetrakis(pentafluorophenyl)borate, triphenylcarbenium tetrakis-(2,3,4,6-tetrafluorophenyl)borate, triphenylcarbenium tetrakis(perfluoronaphthyl)borate, triphenylcarbenium tetrakis(perfluorobiphenyl)borate, and triphenylcarbenium tetrakis(3,5-bis(trifluoromethyl)phenyl)borate).

In at least one embodiment, the activator comprises one or more of trialkylammonium tetrakis(pentafluorophenyl)borate, N,N-dialkylanilinium tetrakis(pentafluorophenyl)borate, dioctadecylmethylammonium tetrakis(pentafluorophenyl)borate, dioctadecylmethylammonium tetrakis(perfluoronaphthyl)borate, N,N-dimethyl-(2,4,6-trimethylanilinium) tetrakis(pentafluorophenyl)borate, tri alkyl ammonium tetrakis-(2,3,4,6-tetrafluorophenyl) borate, N,N-dialkylanilinium tetrakis-(2,3,4,6-tetrafluorophenyl) borate, trialkylammonium tetrakis(perfluoronaphthyl)borate, N,N-dialkylanilinium tetrakis(perfluoronaphthyl)borate, trialkylammonium tetrakis(perfluorobiphenyl)borate, N,N-dialkylanilinium tetrakis(perfluorobiphenyl)borate, trialkylammonium tetrakis(3,5-bis(trifluoromethyl)phenyl)borate, N,N-dialkyl anilinium tetrakis(3,5-bis(trifluoromethyl)phenyl)borate, N,N-dialkyl-(2,4,6-trimethylanilinium) tetrakis(3,5-bis(trifluoromethyl)phenyl)borate, and di-(i-propyl)ammonium tetrakis(pentafluorophenyl)borate, (where alkyl is methyl, ethyl, propyl, n-butyl, sec-butyl, or t-butyl).

In at least one embodiment, the activator can be represented by the formula:

$$(Z)_d^+(A^{d-})$$

wherein Z is (L-H) or a reducible Lewis Acid, L is an neutral Lewis base; H is hydrogen; (L-H)$^+$ is a Bronsted acid; A$^{d-}$ is a non-coordinating anion having the charge d−; and d is an integer from 1 to 3, such as Z is (Ar$_3$C$^+$), where Ar is aryl or aryl substituted with a heteroatom, a C$_1$ to C$_{40}$ hydrocarbyl, or a substituted C$_1$ to C$_{40}$ hydrocarbyl. The anion component A$^{d-}$ includes those having the formula [M$^{k+}$Q$_n$]$^{d-}$ wherein k is 1, 2, or 3; n is 1, 2, 3, 4, 5, or 6 (such as 1, 2, 3, or 4); n−k=d; M is an element selected from Group 13 of the Periodic Table of the Elements, such as boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms (optionally with the proviso that in not more than 1 occurrence is Q a halide). Each Q can be a fluorinated hydrocarbyl group having 1 to 20 carbon atoms, such as a fluorinated aryl group, such as a pentafluoryl aryl group or perfluoronaphthyl group. Examples of suitable A$^{d-}$ also include diboron compounds as disclosed in U.S. Pat. No. 5,447,895, which is fully incorporated herein by reference.

When Z$_d^+$ is the activating cation (L-H)$_d^+$, it can be a Bronsted acid, capable of donating a proton to the transition metal catalytic precursor resulting in a transition metal cation, including ammoniums, oxoniums, phosphoniums, silyliums, and mixtures thereof, such as ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, dioctadecylmethylamine, phosphoniums from triethylphosphine, triphenylphosphine, and diphenylphosphine, oxoniums from ethers such as dimethyl ether diethyl ether, tetrahydrofuran and dioxane, sulfoniums from thioethers, such as diethyl thioethers, tetrahydrothiophene, and mixtures thereof.

Bulky activators are also useful herein as NCAs. "Bulky activator" as used herein refers to anionic activators represented by the formula:

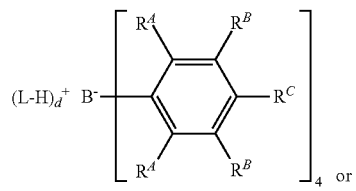

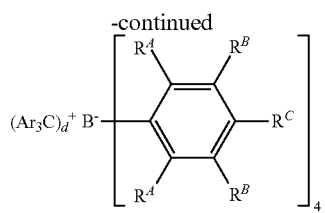

where:

each R$^A$ is independently a halide, such as a fluoride; Ar is substituted or unsubstituted aryl group (such as a substituted or unsubstituted phenyl), such as substituted with C$_1$ to C$_{40}$ hydrocarbyls, such as C$_1$ to C$_{20}$ alkyls or aromatics; each R$^B$ is independently a halide, a C$_6$ to C$_{20}$ substituted aromatic hydrocarbyl group or a siloxy group of the formula —O—Si—R$^D$, where R$^D$ is a C$_1$ to C$_{20}$ hydrocarbyl or hydrocarbylsilyl group (such as R$^B$ is a fluoride or a perfluorinated phenyl group); each R$^C$ is a halide, C$_6$ to C$_{20}$ substituted aromatic hydrocarbyl group or a siloxy group of the formula —O—Si—R$^D$, where R$^D$ is a C$_1$ to C$_{20}$ hydrocarbyl or hydrocarbylsilyl group (such as R$^D$ is a fluoride or a C$_6$ perfluorinated aromatic hydrocarbyl group); where R$^B$ and R$^C$ can form one or more saturated or unsaturated, substituted or unsubstituted rings (such as R$^B$ and R$^C$ form a perfluorinated phenyl ring);

L is a Lewis base; (L-H)$^+$ is a Bronsted acid; d is 1, 2, or 3;

where the anion has a molecular weight of greater than about 1,020 g/mol; and where at least three of the substituents on the B atom each have a molecular volume of greater than about 250 cubic Å, alternatively greater than about 300 cubic Å, or alternatively greater than about 500 cubic Å. The anion can have a molecular weight of greater than about 700 g/mol, and at least three of the substituents on the boron atom each have a molecular volume of greater than about 180 cubic Å.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple "Back of the Envelope" Method for Estimating the Densities and Molecular Volumes of Liquids and Solids," *Journal of Chemical Education*, v.71(11), November 1994, pp. 962-964. Molecular volume (MV), in units of cubic Å, is calculated using the formula: MV=8.3Vs, where Vs is the scaled volume. Vs is the sum of the relative volumes of the constituent atoms, and is calculated from the molecular formula of the substituent using the table below of relative volumes. For fused rings, the Vs is decreased by 7.5% per fused ring. The Calculated Total MV of the anion is the sum of the MV per substituent, for example, the MV of perfluorophenyl is 183 Å3, and the Calculated Total MV for tetrakis(perfluorophenyl)borate is four times 183 Å3, or 732 Å3.

| Element | Relative Volume |
| --- | --- |
| H | 1 |
| $1^{st}$ short period, Li to F | 2 |
| $2^{nd}$ short period, Na to Cl | 4 |
| $1^{st}$ long period, K to Br | 5 |
| $2^{nd}$ long period, Rb to I | 7.5 |
| $3^{rd}$ long period, Cs to Bi | 9 |

Suitable activator-to-catalyst ratio, e.g., all NCA activators-to-catalyst ratio can be about a 1:1 molar ratio. Alternatively, suitable ranges may include from about 0.1:1 to about 100:1, alternatively from about 0.5:1 to about 200:1, alternatively from about 1:1 to about 500:1 alternatively from about 1:1 to about 1000:1. For example, suitable range can be from about 0.5:1 to about 10:1, such as about 1:1 to about 5:1.

It is also within the scope of the present disclosure that the catalyst compounds can be combined with combinations of alumoxanes and NCA's (see for example, U.S. Pat. Nos. 5,153,157; 5,453,410; EP 0573120; WO 1994/007928; and WO 1995/014044 (the disclosures of which are incorporated herein by reference in their entirety) which discuss the use of an alumoxane in combination with an ionizing activator).

Particularly useful activators include dimethylaniliniumtetrakis (pentafluorophenyl) borate and dimethyl anilinium tetrakis(heptafluoro-2-naphthyl) borate. For a more detailed description of useful activators please see WO 2004/026921 page 72, paragraph [00119] to page 81 paragraph [00151]. A list of particularly useful activators that can be used in the practice of this present disclosure may be found at page 72, paragraph [00177] to page 74, paragraph [00178] of WO 2004/046214.

Alumoxane Activators

Alumoxane activators can be utilized as activators in the catalyst systems described herein. Alumoxanes are generally oligomeric compounds containing —Al($R^1$)—O— subunits, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. A visually clear methylalumoxane can be used. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under U.S. Pat. No. 5,041,584). Another useful alumoxane is solid polymethylalumoxane as described in U.S. Pat. Nos. 9,340,630; 8,404,880; and 8,975,209.

When the activator is an alumoxane (modified or unmodified), at least one embodiment selects the maximum amount of activator typically at up to about a 5,000-fold molar excess Al/M over the catalyst compound (per metal catalytic site). The minimum activator-to-catalyst-compound is about a 1:1 molar ratio. Alternative suitable ranges include from about 1:1 to about 500:1, alternatively from 1:1 to 200:1, alternatively from about 1:1 to about 100:1, or alternatively from about 1:1 to about 50:1. In an alternative embodiment, little or no alumoxane is used in the polymerization processes described herein. For example, alumoxane is present at about zero mole %, alternatively the alumoxane is present at a molar ratio of aluminum to catalyst compound transition metal less than about 500:1, such as less than about 300:1, such as less than about 100:1, such as less than about 1:1.

Optional Scavengers, Co-Activators, Chain Transfer Agents

In addition to the activators, scavengers, chain transfer agents or co-activators may be used. Aluminum alkyl or organoaluminum compounds which may be utilized as co-activators include, for example, trimethylaluminum, triethylaluminum, triisobutylaluminum, tri-n-hexylaluminum, tri-n-octylaluminum, diethyl zinc, tri-n-butyl aluminum, diisobutylaluminum hydride, or combinations thereof.

In at least one embodiment, the catalyst systems can additionally comprise one or more scavenging compounds. Here, the term "scavenger" means a compound that removes polar impurities from the reaction environment. These impurities adversely affect catalyst activity and stability. For example, the scavenging compound will be an organometallic compound such as the Group-13 organometallic compounds of U.S. Pat. Nos. 5,153,157; 5,241,025; and WO 1991/009882; WO 1994/003506; WO 1993/014132; and that of WO 1995/007941. Exemplary compounds include triethyl aluminum, triethyl borane, tri-iso-butyl aluminum, methyl alumoxane, iso-butyl alumoxane, and tri-n-octyl aluminum. Those scavenging compounds having bulky or $C_6$-$C_{20}$ linear hydrocarbyl substituents connected to the metal or metalloid center usually minimize adverse interaction with the active catalyst. Examples include triethyl aluminum, and bulky compounds such as tri-iso-butyl aluminum, tri-iso-prenyl aluminum, and long-chain linear alkyl-substituted aluminum compounds, such as tri-n-hexyl aluminum, tri-n-octyl aluminum, or tri-n-dodecyl aluminum. When alumoxane is used as the activator, any excess over that needed for activation will scavenge impurities and additional scavenging compounds may be unnecessary. Alumoxanes also may be added in scavenging quantities with other activators, e.g., methylalumoxane, [Me$_2$HNPh]$^+$[B(pfp)$_4$]$^-$ or B(pfp)$_3$ (perfluorophenyl=pfp=$C_6F_5$).

Exemplary aluminum scavengers can include those where there is oxygen present. That is, the material per se or the aluminum mixture used as a scavenger, includes an aluminum/oxygen species, such as an alumoxane or alkylaluminum oxides, e.g., dialkyaluminum oxides, such as bis(diisobutylaluminum) oxide. In at least one aspect, aluminum containing scavengers can be represented by the formula (($R_z$—Al—)$_y$O—)$_x$, wherein z is 1-2, y is 1-2, x is 1-100, and R is a $C_1$-$C_{12}$ hydrocarbyl group. In another aspect, the scavenger has an oxygen to aluminum (O/Al) molar ratio of from about 0.25 to about 1.5, more particularly from about 0.5 to about 1. Aluminum alkyl or organoaluminum compounds which may be utilized as scavengers or co-activators include, for example, trimethylaluminum, tri ethyl aluminum, triisobutylaluminum, tri-n-hexyl aluminum, tri-n-octylaluminum, and diethyl zinc.

Chain transfer agents may be used in the compositions and/or processes described herein. Useful chain transfer agents are typically alkylalumoxanes, a compound represented by the formula AlR$_3$, ZnR$_2$ (where each R is, independently, a $C_1$-$C_8$ aliphatic radical, such as methyl, ethyl, propyl, butyl, pentyl, hexyl, octyl or an isomer thereof) or a combination thereof, such as diethyl zinc, methylalumoxane, trimethylaluminum, triisobutylaluminum, trioctylaluminum, or a combination thereof Preparation of Mixed Catalyst Systems The above two catalyst types can be combined to form a mixed catalyst system. The two or more catalysts can be added together in a desired ratio when combined, contacted with an activator, or contacted with a support material or a supported activator. The catalyst compounds may be added to the mixture sequentially or simultaneously. The molar ratio of a catalyst represented by Formula (I) to a catalyst represented by Formula (II), can vary depending on the balance of processability versus physical characteristics of the desired polymer. For example, the molar ratio (I):(II) can range from about 20:1 to about 1:1 or from about 1:1 to about 20:1, such as from about 1:1 to about 5:1, such as from about 1:1 to about 3:1, or from about 0.6:0.4 to about 0.8:0.2, or from about 0.6:0.4 to about 0.9:0.2, or from about 0.7:0.2 to about 0.8:0.2.

Other procedures for combining the catalysts are possible, such as addition of a first catalyst compound to a slurry including a support or a supported activator mixture for a specified reaction time, followed by the addition of the second catalyst compound solution, mixed for another specified time, after which the mixture may be recovered for use in a polymerization reactor, such as by spray drying. Lastly, another additive, such as 1-hexene in about 10 vol % can be present in the mixture prior to the addition of the first catalyst compound.

The first catalyst compound may be supported via contact with a support material for a reaction time. The resulting supported catalyst composition may then be mixed with mineral oil to form a slurry, which may or may not include an activator. The slurry may then be admixed with a second catalyst compound prior to introduction of the resulting mixed catalyst system to a polymerization reactor. The second catalyst compound may be admixed at any point prior to introduction to the reactor, such as in a polymerization feed vessel or in-line in a catalyst delivery system.

The mixed catalyst system may be formed by combining a first catalyst compound (for example a catalyst compound useful for producing a first polymer attribute, such as a high molecular weight polymer fraction) with a support and activator, desirably in a first diluent such as an alkane or toluene, to produce a supported, activated catalyst compound. The mixed catalyst system thus produced may be a supported and activated first catalyst compound in a slurry, the slurry comprising mineral or silicon oil, with a second catalyst compound that is not supported and not combined with additional activator, where the second catalyst compound may or may not be partially or completely soluble in the slurry. In at least one embodiment, the diluent consists of mineral oil.

Mineral oil, or "high viscosity diluents," as used herein refers to petroleum hydrocarbons and mixtures of hydrocarbons that may include aliphatic, aromatic, and/or paraffinic components that are liquids at about 23° C. and above, and can have a molecular weight of at least 300 amu to 500 amu or more, and a viscosity at 40° C. of from about 40 cSt to about 300 cSt or greater, or from about 50 cSt to about 200 cSt in a particular embodiment. The term "mineral oil" includes synthetic oils or liquid polymers, polybutenes, refined naphthenic hydrocarbons, and refined paraffins, such as disclosed in *Blue Book* 2001, *Materials, Compounding Ingredients, Machinery And Services For Rubber* 189 247 (J. H. Lippincott, D. R. Smith, K. Kish & B. Gordon eds. Lippincott & Peto Inc. 2001). Exemplary mineral and silicon oils are those that exclude moieties that are reactive with metallocene catalysts, examples of which include hydroxyl and carboxyl groups. The diluent may comprise a blend of a mineral, silicon oil, and/or a hydrocarbon selected from the group consisting of $C_1$ to $C_{10}$ alkanes, $C_6$ to $C_{20}$ aromatic hydrocarbons, $C_7$ to $C_{21}$ alkyl-substituted hydrocarbons, and mixtures thereof. When the diluent is a blend comprising mineral oil, the diluent may comprise from about 5 wt % to about 99 wt % mineral oil. In at least one embodiment, the diluent may consist essentially of mineral oil.

In at least one embodiment, the first catalyst compound is combined with an activator and a first diluent to form a catalyst slurry that is then combined with a support material. Until such contact is made, the support particles might not be previously activated. The first catalyst compound can be in any desirable form such as a dry powder, suspension in a diluent, solution in a diluent, liquid, etc. The catalyst slurry and support particles are then mixed thoroughly, in at least one embodiment at an elevated temperature, so that both the first catalyst compound and the activator are deposited on the support particles to form a support slurry.

After the first catalyst compound and activator are deposited on the support, a second catalyst compound may then be combined with the supported first catalyst compound, wherein the second is combined with a diluent comprising mineral or silicon oil by any suitable means either before, simultaneous to, or after contacting the second catalyst compound with the supported first catalyst compound. In at least one embodiment, the first catalyst compound is isolated from the first diluent to a dry state before combining with the second catalyst compound. In at least one embodiment, the second catalyst compound is not activated, that is, not combined with any activator, before being combined with the supported first catalyst compound. The resulting solids slurry (including both the supported first and second catalyst compounds) is then mixed thoroughly at an elevated temperature.

A wide range of mixing temperatures may be used at various stages of making the mixed catalyst system. For example, in a specific embodiment, when the first catalyst compound and at least one activator, such as methylalumoxane, are combined with a first diluent to form a mixture, the mixture is heated to a first temperature of from about 25° C. to about 150° C., such as from about 50° C. to about 125° C., such as from about 75° C. to about 100° C., such as from about 80° C. to about 100° C. and stirred for a period of time from about 30 seconds to about 12 hours, such as from about 1 minute to about 6 hours, such as from about 10 minutes to about 4 hours, such as from about 30 minutes to about 3 hours.

Next, that mixture is combined with a support material to provide a resultant slurry. The support material can be heated, or dehydrated if desired, prior to combining. In at least one embodiment, the resultant slurry (or first support slurry) can be heated to a first temperature from about 25° C. to about 150° C., such as from about 50° C. to about 125° C., such as from about 75° C. to about 100° C., such as from about 80° C. to about 100° C. and stirred for a period of time from about 30 seconds to about 12 hours, such as from about 1 minute to about 6 hours, such as from about 10 minutes to about 4 hours, such as from about 30 minutes to about 3 hours. For example, the support slurry is mixed for a time sufficient to provide a collection of activated support particles that have the first catalyst compound deposited thereto. The first diluent can then be removed from the first support slurry to provide a dried supported first catalyst compound. For example, the first diluent can be removed under vacuum or by nitrogen purge.

Polymerization

The first diluent is an aromatic or alkane, such as hydrocarbon diluent having a boiling point of less than about 200° C. such as toluene, xylene, hexane, etc., may be removed from the supported first catalyst compound under vacuum or by nitrogen purge to provide a supported mixed catalyst system. Even after addition of the oil and/or the second (or other) catalyst compound, it may be desirable to treat the slurry to further remove any remaining solvents such as toluene. This can be accomplished by an N2 purge or vacuum, for example. Depending upon the level of mineral oil added, the resultant mixed catalyst system may still be a slurry or may be a free flowing powder that comprises an amount of mineral oil. Thus, the mixed catalyst system, while a slurry of solids in mineral oil in some embodiments, may take any physical form such as a free flowing solid. For example, the mixed catalyst system may range from about 1 wt % to about 99 wt % solids content by weight of the mixed catalyst system (mineral oil, support, all catalyst compounds and activator(s)) in at least one embodiment. The catalyst compound may be the first or second compound, such as the second compound.

In some embodiments herein, the present disclosure provides polymerization processes where monomer (such as ethylene), and, optionally, comonomer (such as hexene), are contacted with a catalyst system comprising a catalyst compound represented by Formula (I), a catalyst compound represented by Formula (II), an activator, and an optional support material as described above.

In at least one embodiment, alpha-olefins suitable for use as starting material in the preparation of the LLDPE can be one or more substituted or unsubstituted $C_2$ to $C_{40}$ alpha-olefins, such as $C_2$-$C_{32}$ alpha-olefins, such as $C_4$-$C_{32}$ alpha-olefins, such as $C_6$-$C_{30}$ alpha-olefins, such as $C_6$-$C_{24}$ alpha-olefins, such as $C_6$-$C_{18}$ alpha-olefins, $C_6$ to $C_{16}$ alpha-olefins, $C_6$-$C_{12}$ alpha-olefins, or a combination thereof. In at least one embodiment, the $C_2$ to $C_{40}$ alpha-olefins may be linear, branched, or cyclic. The $C_2$ to $C_{40}$ cyclic olefins may be strained or unstrained, monocyclic or polycyclic, and may, optionally, include heteroatoms and/or one or more functional groups. Non-limiting examples of alpha-olefins can include ethylene, propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, branched chain isomers such as 4-methyl-1-pentene, norbornene, norbornadiene, dicyclopentadiene, cyclopentene, cycloheptene, cyclooctene, cyclooctadiene, cyclododecene, 7-oxanorbornene, 7-oxanorbornadiene, 5-cyclooctadiene, 1-hydroxy-4-cyclooctene, 1-acetoxy-4-cyclooctene, 5-methylcyclopentene, dicyclopentadiene, substituted derivatives thereof, and isomers thereof, and a combination thereof.

Polyethylene compositions of the present disclosure can be made by any polymerization process such as those referred to as gas phase processes, slurry process, and/or solution processes, and any of these can be combined in serial reactor processes or parallel reactors. For example, a polymerization process is a solution polymerization process, and the process can take place in two reactors in series where the reactants, such as ethylene, the catalyst precursor, and activator are kept under solution polymerization conditions. For example, polymerizations can be carried out in one or more single-phase, liquid-filled, stirred tank reactors with continuous flow of feeds to the system and continuous withdrawal of products under steady state conditions. When more than one reactor is used, the reactors can be operated in a serial configuration. Advantageously, the reactors produce polymers with different properties, such as different molecular weights, or different monomer compositions, or different levels of long-chain branching, or any combinations thereof due to the use of different catalysts and/or other polymerization conditions in each reactor.

In at least one embodiment, one or more dienes are present in the polymer produced herein at up to about 10 wt %, such as at about 0.00001 to about 1.0 wt %, such as about 0.002 to about 0.5 wt %, such as about 0.003 to about 0.2 wt % based upon the total weight of the composition. In at least one embodiment, about 500 ppm or less of diene is added to the polymerization, such as about 400 ppm or less, such as or about 300 ppm or less. In other embodiments, at least about 50 ppm of diene is added to the polymerization, or about 100 ppm or more, or about 150 ppm or more.

In at least one embodiment, a diolefin monomer includes any hydrocarbon structure, such as $C_4$ to $C_{30}$, having at least two unsaturated bonds, wherein at least two of the unsaturated bonds are readily incorporated into a polymer by either a stereospecific or a non-stereospecific catalyst(s). It is further exemplary that the diolefin monomers be selected from alpha, omega-diene monomers (i.e., di-vinyl monomers). In at least one embodiment, the diolefin monomers are linear di-vinyl monomers, such as those containing from 4 to 30 carbon atoms. Examples of dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly exemplary dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Exemplary cyclic dienes include cyclopentadiene, vinylnorbornene, norbornadiene, ethylidene norbornene, divinylbenzene, dicyclopentadiene or higher ring containing diolefins with or without substituents at various ring positions.

In at least one embodiment, a "non-conjugated diene" is one in which only one of the double bonds is activated by a polymerization catalyst and is selected from cyclic and linear alkylenes, non-limiting examples of which include 1,5-cyclooctadiene, an unconjugated diene (and other structures where each double bond is two carbons away from the other), norbornadiene, and other strained bicyclic and unconjugated dienes, and dicyclopentadiene. For example, the non-conjugated diene can be selected from $C_7$ to $C_{30}$ cyclic non-conjugated dienes.

In at least one embodiment, dienes are absent from the polymerization process, that is, they are not purposefully combined with the ethylene, propylene, and catalyst components in any stage of the process.

In at least one embodiment, a process provides polymerization of ethylene and at least one comonomer having from 3 to 8 carbon atoms, such as 4 to 8 carbon atoms. Particularly, the comonomers can be propylene, 1-butene, 4-methyl-1-pentene, 3-methyl-1-pentene, 1-hexene and 1-octene, for example 1-hexene, 1-butene, 1-octene, and a combination thereof. In at least one embodiment, a process provides polymerization of one or more monomers selected from the group consisting of propylene, 1-butene, 1-pentene, 3-methyl-1-pentene, 4-methyl-1-pentene, 1-hexene, 1-octene, 1-decene, and a combination thereof.

Polymerizations can be performed in a system with a solvent comprising any one or more of $C_4$ to $C_{12}$ alkanes and/or the olefin monomers, using soluble (soluble in carrier solvent or in reactor solvent) metallocene catalysts or other single-site catalysts and discrete, non-coordinating borate anions as co-catalysts.

Suitable diluents/solvents for polymerization include non-coordinating, non-reactive liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™ fluids); perhalogenated hydrocarbons, such as perfluorinated $C_{4-10}$ alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In at least one embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In at least one embodiment, the solvent is not aromatic, such as aromatics are present in the solvent at less than about 1 wt %, such as less than about 0.5 wt %, such as less than about 0.1 wt % based upon the weight of the solvents. A homogeneous dilute solution of, for example, tri-n-octyl aluminum in a suitable solvent, may be used as a scavenger in concentrations appropriate to maintain reaction. Chain transfer agents, such as hydrogen, can be added to control molecular weight. Polymerizations can be at high temperatures and high conversions to maximize macromer re-insertions that create long chain branching, if so desired.

Suitable polymerizations can be run at any temperature and/or pressure suitable to obtain the desired ethylene polymers. Suitable temperatures and/or pressures may include a temperature in the range of from about 0° C. to about 300° C., such as about 20° C. to about 200° C., such as about 35° C. to about 150° C., such as from about 40° C. to about 120° C., such as from about 45° C. to about 80° C.; and/or a pressure in the range of from about 0.35 MPa to about 10 MPa, such as from about 0.45 MPa to about 6 MPa, such as from about 0.5 MPa to about 4 MPa. In at least one embodiment, the reactor temperature is greater than about 100° C., or about 105° C., or about 110° C., or within a range from about 100° C., or about 105° C., or about 110° C. to about 130° C., or about 140° C., or about 150° C., or about 160° C. This combination of a homogeneous, continuous, solution process helps to ensure that the polymer products have narrow composition and sequence distributions.

In at least one embodiment hydrogen is present in the polymerization reactor at a partial pressure of about 0.001 to about 50 psig (about 0.007 to about 345 kPa), such as from about 0.01 to about 25 psig (about 0.07 to about 172 kPa), such as about 0.1 to about 10 psig (about 0.7 to about 70 kPa). In at least one embodiment, little or no alumoxane is used in the process to produce the polymers. Alumoxane can be present at about zero mol %, alternatively the alumoxane can be present at a molar ratio of aluminum to transition metal less than about 500:1, such as less than about 300:1, such as less than about 100:1, such as less than about 1:1.

In at least one embodiment, little or no scavenger is used in the process to produce the ethylene polymer. For example, scavenger (such as trialkyl aluminum) can be present at zero mol %, alternatively the scavenger can be present at a molar ratio of scavenger metal to transition metal of less than about 100:1, such as less than about 50:1, such as less than about 15:1, such as less than about 10:1.

In at least one embodiment, the polymerization: 1) is conducted at temperatures of about 0 to about 300° C. (such as about 25 to about 150° C., such as about 40 to about 120° C., such as about 100° C. or greater); 2) is conducted at a pressure of about atmospheric pressure to about 10 MPa (such as about 0.35 to about 10 MPa, such as from about 0.45 to about 6 MPa, such as from about 0.5 to about 4 MPa); 3) is conducted in an aliphatic hydrocarbon solvent (such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof; such as where aromatics (such as toluene) can be present in the solvent at less than 1 wt %, such as less than 0.5 wt %, such as at 0 wt % based upon the weight of the solvents); 4) wherein the catalyst system includes a alumoxane activator; 5) the polymerization occurs in one reaction zone; and/or 6) optionally scavengers (such as trialkyl aluminum compounds) are absent (e.g., present at zero mol %, alternatively the scavenger is present at a molar ratio of scavenger metal to transition metal of less than about 100:1, such as less than about 50:1, such as less than about 15:1, such as less than about 10:1); and/or 7) optionally hydrogen is present in the polymerization reactor at a partial pressure of about 0.001 to about 50 psig (about 0.007 to about 345 kPa) (such as from about 0.01 to about 25 psig (about 0.07 to about 172 kPa), such as about 0.1 to about 10 psig (about 0.7 to about 70 kPa)).

In at least one embodiment, the catalyst system used in the polymerization comprises no more than one catalyst compound. A "reaction zone" also referred to as a "polymerization zone" is a vessel where polymerization takes place, for example a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In at least one embodiment, the polymerization occurs in one reaction zone. Room temperature is about 23° C. unless otherwise noted.

Other additives may also be used in the polymerization, as desired, such as one or more scavengers, promoters, modifiers, reducing agents, oxidizing agents, hydrogen, aluminum alkyls, silanes, or chain transfer agents (such as alkylalumoxanes, a compound represented by the formula $AlR_3$ or $ZnR_2$ (where each R is, independently, a $C_1$-$C_8$ aliphatic radical, such as methyl, ethyl, propyl, butyl, pentyl, hexyl octyl or an isomer thereof) or a combination thereof, such as diethyl zinc, methylalumoxane, trimethylaluminum, triisobutylaluminum, trioctylaluminum, or a combination thereof).

In at least one embodiment of a polymerization process, the catalyst precursor and activator can be combined under suitable conditions, with ethylene, and optionally other comonomers, to produce a LLDPE.

The reactor(s) can be maintained at a pressure in excess of the vapor pressure of the reactant mixture to keep the reactants in the liquid phase. In this manner the reactors can be operated liquid-full in a homogeneous single phase. Ethylene, as well as the optional $C_4$ to $C_{40}$ α-olefins and/or dienes, such as $C_3$ to $C_{12}$ α-olefins and/or dienes) can be combined into one stream and then mixed with a solvent stream. A solution of, e.g., a tri-n-octyl aluminum scavenger in any suitable solvent may be added to the combined solvent and monomer stream just before it entered the reactor to further reduce the concentration of any catalyst poisons. A mixture of the catalyst components (catalyst precursor and/or activator) in solvent may be pumped separately to the reactor and entered through a separate port. In at least one embodiment, cooled isothermal reactors can be used that do not require feed chilling.

A reaction mixture (catalyst system+monomer(s)) in a reactor may be stirred by any suitable means to provide thorough mixing over a broad range of solution viscosities. Flow rates can be set to maintain an average residence time in a reactor of from about 10 minutes to about 30 minutes, or from about 10 minutes to about 45 minutes. On exiting the reactor, the polymer mixture may be subjected to quenching, a series of concentration steps, heat and vacuum stripping and pelletization. Water or water/alcohol mixture is then supplied to quench the polymerization reaction, which might otherwise continue in the presence of surviving catalyst, unreacted monomer, and elevated temperature. Antioxidants can be also used to quench the polymerization reaction.

The LLDPE can be recovered from the effluent of either the second polymerization stage by separating the polymer from other constituents of the effluent using any suitable separation. For example, polymer can be recovered from either effluent by liquid-liquid separation or coagulation with a non-solvent, such as methanol, isopropyl alcohol, acetone, or n-butyl alcohol, or the polymer can be recovered by stripping the solvent or other media with heat or steam. After removal of solvent and monomer, pelletized polymer can be blended with polyolefin(s). If in situ blends are desired, the removal of solvent takes place after intimate mixing with the solution or slurry phase polyolefin.

The lean phase, e.g., the residual hexene and condensing agents such as isobutene and isopentance, and volatiles removed downstream of the liquid phase separation can be recycled to be part of the polymerization feed. In the process, a degree of separation and purification takes place to remove polar impurities or internally unsaturated olefins that might undermine the activity of the catalyst. Otherwise internally unsaturated olefins which are difficult to polymerize can gradually build up in the lean phase and recycle streams. Any adverse effects on the polymerization activity may be mitigated by removing these olefins from the recycle stream and/or encouraging their incorporation in the polymer, favored by high polymerization temperatures.

In at least one embodiment, a LLDPE can be produced in an industrial scale process. For example, the catalyst productivity can be about 20,000 kg polymer per kg of catalyst or more, such as about 40,000 kg polymer per kg of catalyst or more.

Polymerization Products

The present disclosure further provides for compositions that can be produced by the methods of the present disclosure. In at least one embodiment, a process described herein produces ethylene homopolymers or ethylene copolymers, such as ethylene-alpha-olefin (such as $C_3$ to $C_{40}$, such as a $C_3$-$C_{20}$ alpha-olefin, such as $C_3$ to $C_{12}$ alpha-olefin, such as propylene, butene, hexene, octene, decene, dodecene, such as propylene, butene, hexene, octene) copolymers (such as ethylene-butene copolymers, ethylene-hexene and/or ethylene-octene copolymers). In some embodiments, the alpha-olefin is a $C_4$ to $C_8$ alpha-olefin.

In at least one embodiment, the LLDPE can have an ethylene content of about 65 wt % or greater, such as from about 80 wt % to about 99.9 wt %, such as from about 85 wt % to about 99.5 wt %, such as from about 90 wt % to about 99 wt %, such as from about 91 wt % to about 98 wt %, such as from about 92 wt % to about 97 wt %, such as from about 93 wt % to about 96 wt %, such as from about 94 wt % to about 95 wt %, such as from about 92 wt % to about 98 wt %, when measured according to GPC-IR5-LS-VIS. In some embodiments, the ethylene content can be from about 65 wt % or more, such as from about 90 wt % to about 96 wt %.

In at least one embodiment, the LLDPE can have a comonomer content of about 35 wt % or less, such as from about 0.1 wt % to about 20 wt %, such as from about 0.5 wt % to about 15 wt %, such as from about 1 wt % to about 10 wt %, such as from about 2 wt % to about 9 wt %, such as from about 3 wt % to about 8 wt %, such as from about 4 wt % to about 7 wt %, such as from about 5 wt % to about 6 wt %, when measured according to GPC-IR5-LS-VIS. In some embodiments, the comonomer content can be about 35 wt % or less, such as from about 4 wt % to about 10 wt %.

In some embodiments, the LLDPE can have a number average molecular weight (Mn) of from about 5,000 g/mol to about 15,000 g/mol, such as from about 6,000 g/mol to about 13,000 g/mol, such as from about 7,500 g/mol to about 12,000 g/mol, when measured according to GPC-IR5-LS-VIS.

In at least one embodiment, the LLDPE can have a weight average molecular weight (Mw) of from about 75,000 g/mol to about 200,000 g/mol, such as from about 80,000 g/mol to about 180,000 g/mol, such as from about 85,000 g/mol to about 160,000 g/mol, when measured according to GPC-IR5-LS-VIS.

In at least one embodiment, the LLDPE can have a z-average molecular weight (Mz) of from about 500,000 g/mol to about 1,800,000 g/mol, such as from about 650,000 g/mol to about 1,600,000 g/mol, such as from about 750,000 g/mol to about 1,500,000 g/mol, when measured according to GPC-IR5-LS-VIS.

In some embodiments, the LLDPE can have a molecular weight distribution (MWD), defined as Mw/Mn, of from about 2 to about 10, such as from about 2.5 to about 9, such as from about 3 to about 8, such as from about 3.3 to about 7, such as from about 3.5 to about 6.5, when measured according to GPC-IR5-LS-VIS. In at least one embodiment, the Mw/Mn can be from about 2 to about 8, such as from about 3 to about 7, such as from about 4 to about 6, such as about 5 or 5.5.

In some embodiments, the LLDPE can have a g'vis of about 0.9 or more and 0.97 or less when measured according to GPC-IR5-LS-VIS. In at least one embodiment, the $g'_v$ is can be from about 0.9 to about 0.97, such as from about 0.91 to about 0.96, such as from about 0.92 to about 0.95, such as from about 0.93 to about 0.94.

In at least one embodiment, the LLDPE can have a melt index (MI, $I_2$) of from about 0.3 g/10 min to about 20 g/10 min, such as from about 0.5 g/10 min to about 3 g/10 min, such as from about 1.3 g/10 min to about 1.4 g/10 min or from about 0.8 g/10 min to about 1.8 g/10 min, as measured according to ASTM D1238 (190° C., 2.16 kg load).

In at least one embodiment, the LLDPE can have a high load melt index (HLMI) of from about 7 g/10 min to about 100 g/10 min, such as from about 10 g/10 min to about|70 g/10 min, such as from about 30 g/10 min to about 35 g/10 min or from about 25 g/10 min to about 35 g/10 min, as determined by ASTM D1238 (190° C., 2.16 kg load).

In at least one embodiment, the LLDPE can have a HLMI/MI ratio of from about 15 to about 50, such as from about 18 to about 35, such as from about 20 to about 25, as determined by ASTM D1238 (190° C., 2.16 kg load).

In at least one embodiment, the LLDPE can have a gradient density from about of from about 0.91 g/cm³ to about 0.94 g/cm³, such as from about 0.915 g/cm³ to about 0.935 g/cm³, such as from about 0.92 g/cm³ to about 0.93 g/cm³, as described in the Test Methods Section. In some embodiments, the gradient density can be from about 0.917 g/cm$^3$ to about 0.94 g/cm$^3$, such as from about 0.918 g/cm$^3$ to about 0.935 g/cm$^3$.

Blends

In at least one embodiment, the LLDPE produced herein can be combined with one or more additional polymers prior to being formed into a film, molded part or other article. The one or more additional polymers include polyethylene, isotactic polypropylene, highly isotactic polypropylene, syndiotactic polypropylene, random copolymer of propylene and ethylene, and/or butene, and/or hexene, polybutene, ethylene vinyl acetate, low density polyethylene (LDPE), linear low density polyethylene (LLDPE), high density polyethylene (HDPE), ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In at least one embodiment, the LLDPE can be present in the above blends at from about 10 wt % to about 99 wt %, based upon the weight of the polymers in the blend, such as about 20 wt % to about 95 wt %, such as at least about 30 wt % to about 90 wt %, such as at least about 40 wt % to about 90 wt %, such as at least about 50 wt % to about 90 wt %, such as at least about 60 wt % to about 90 wt %, such as at least about 70 wt % to about 90 wt %.

The blends described above may be produced by mixing a polyethylene composition of the present disclosure with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX™ 1010 or IRGANOX™ 1076 available from BASF Schweiz AG); phosphites (e.g., IRGAFOS™ 168 available from BASF Schweiz AG); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; and talc.

Films

The LLDPE (and/or blends thereof) of the present disclosure can be used in monolayer films or multilayer films. These films may be formed by any suitable extrusion or coextrusion technique. Films may be unoriented, uniaxially oriented, or biaxially oriented. Physical properties of the film may vary depending on the film forming techniques used.

One or more of the foregoing polymers, such as the foregoing blends thereof, may be used in a variety of end-use applications, such as mono- or multi-layer blown, extruded, and/or shrink films. These films may be formed by any number of well-known extrusion or coextrusion techniques, such as a blown bubble film processing technique, wherein the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents. One or more of the layers of the film may be oriented in the transverse and/or longitudinal directions to the same or different extents. The uniaxial orientation can be accomplished using typical cold drawing or hot drawing methods. Biaxial orientation can be accomplished using tenter frame equipment or a double bubble process and may occur before or after the individual layers are brought together. For example, a composition layer can be extrusion coated or laminated onto an oriented composition layer or both composition layers can be coextruded together into a film and then oriented. Likewise, oriented composition could be laminated to oriented composition or oriented composition could be coated onto polypropylene or polyethylene (or vice versa) then optionally the combination could be oriented even further.

In at least one embodiment, one or more layers may be modified by corona treatment, electron beam irradiation, gamma irradiation, flame treatment, or microwave. In at least one embodiment, one or both of the surface layers is modified by corona treatment.

Films of the present disclosure include any suitable film structure and film application. Specific end use films include, for example, blown films, cast films, stretch films, stretch/cast films, stretch cling films, stretch handwrap films, machine stretch wrap, shrink films, shrink wrap films, green house films, laminates, and laminate films. Exemplary films are prepared by any suitable technique, such as for example, techniques utilized to prepare blown, extruded, and/or cast stretch and/or shrink films (including shrink-on-shrink applications).

In at least one embodiment, multilayer films (or multiple-layer films) may be formed by any suitable method. The total thickness of multilayer films may vary based upon the application desired. A total film thickness of about 5-100 μm, more typically about 10 μm-50 μm, is suitable for most applications. Those skilled in the art will appreciate that the thickness of individual layers for multilayer films may be adjusted based on desired end-use performance, resin or copolymer employed, equipment capability, and other factors. The materials forming each layer may be coextruded through a coextrusion feedblock and die assembly to yield a film with two or more layers adhered together but differing in composition. Coextrusion can be adapted for use in both cast film or blown film processes. Exemplary multilayer films have at least two, at least three, or at least four layers. In at least one embodiment the multilayer films are composed of five to 11 layers.

To facilitate discussion of different film structures, the following notation is used herein. Each layer of a film is denoted "A" or "B". Where a film includes more than one A layer or more than one B layer, one or more prime symbols (', '', ''', etc.) are appended to the A or B symbol to indicate layers of the same type that can be the same or can differ in one or more properties, such as chemical composition, density, melt index, thickness, etc. Finally, the symbols for adjacent layers are separated by a slash (/). Using this notation, a three-layer film having an inner layer disposed between two outer layers would be denoted A/B/A'. Similarly, a five-layer film of alternating layers would be denoted A/B/A'/B'/A''. Unless otherwise indicated, the left-to-right or right-to-left order of layers does not matter, nor does the order of prime symbols; e.g., an A/B film is equivalent to a B/A film, and an A/A'/B/A'' film is equivalent to an A/B/A'/A'' film, for purposes described herein. The relative thickness of each film layer is similarly denoted, with the thickness of each layer relative to a total film thickness of about 100 (dimensionless) indicated numerically and separated by slashes; e.g., the relative thickness of an A/B/A' film having A and A' layers of about 10 μm each and a B layer of about 30 μm is denoted as 20/60/20.

In some embodiments, and using the nomenclature described above, the present disclosure provides for multilayer films with any of the following exemplary structures: (a) two-layer films, such as A/B and B/B'; (b) three-layer films, such as A/B/A', A/A'/B, B/A/B' and B/B'/B''; (c) four-layer films, such as A/A'/A''/B, A/A'/B/A'', A/A'/B/B', A/B/A'/B', A/B/B'/A', B/A/A'/B', A/B/B'/B'', B/A/B'/B'' and B/B'/B''/B'''; (d) five-layer films, such as A/A'/A''/A'''/B, A/A'/A''/B/A''', A/A'/B/A''/A''', A/A'/A''/B/B', A/A'/B/A''/B', A/A'/B/B'/A'', A/B/A'/B'/A'', A/B/A'/A''/B, B/A/A'/A''/B', A/A'/B/B'/B'', A/B/A'/B'/B'', A/B/B'/B''/A', B/A/A'/B'/B'', B/A/B'/A''/B'', B/A/B'/B''/A', A/B/B'/B''/B''', B/A/B'/B''/B''', B/B'/A/B''/B''', and B/B'/B''/B'''/B''''; and similar structures for films having six, seven, eight, nine, twenty-four, forty-eight, sixty-four, one hundred, or any other number of layers. It should be appreciated that films can have still more layers.

In any of the embodiments above, one or more A layers can be replaced with a substrate layer, such as glass, plastic, paper, metal, etc., or the entire film can be coated or laminated onto a substrate. Thus, although the discussion herein has focused on multilayer films, the films may also be used as coatings for substrates such as paper, metal, glass, plastic, and any other suitable material.

The films can further be embossed, or produced or processed according to other known film processes. The films can be tailored to specific applications by adjusting the thickness, materials and order of the various layers, as well as the additives in or modifiers applied to each layer.

Film Properties

In some embodiments, the films are oriented in the Machine Direction (MD) at a draw down ratio of up to about 25 in the Transverse Direction (TD) at a blow up ratio of up to about 2.5.

The films may vary in thickness depending on the intended application; however, films of a thickness from about 1 μm to about 150 μm are usually suitable, such as from about 10 μm to about 150 μm. Films intended for packaging are usually from about 10 μm to about 120 μm thick and often consisted of co-extruded multilayers.

In at least one embodiment, a film of the present disclosure can have a 1% Secant Modulus in the Machine Direction (MD), according to ASTM D882 (25.4 mm width strip) of from about 38,000 psi to about 58,000 psi, such as from about 40,000 psi to about 56,000 psi, such as from about 42,000 psi to about 54,000 psi, such as from about 44,000 psi to about 52,000 psi, such as from about 46,000 psi to about 54,000 psi, such as from about 48,000 psi to about 52,000 psi, such as from about 49,000 psi to about 51,000 psi.

In at least one embodiment, a film of the present disclosure can have a 1% Secant Modulus in the Transverse Direction (TD), according to ASTM D882 (25.4 mm width strip) of from about 50,000 psi to about 80,000 psi, such as from about 55,000 psi to about 75,000 psi, such as from about 58,000 psi to about 72,000 psi, such as from about 60,000 psi to about 70,000 psi, such as from about 62,000 psi to about 68,000 psi, such as from about 64,000 psi to about 66,000 psi.

In at least one embodiment, a film of the present disclosure can have an average of MD and TD 1% secant modulus of about 43,000 psi or more, such as from about 43,000 psi to about 68,000 psi, such as from about 45,000 psi to about 65,000 psi, such as from about 47,000 psi to about 63,000 psi, such as from about 49,000 psi to about 61,000 psi, such as from about 51,000 psi to about 59,000 psi, such as from about 52,000 psi to about 57,000 psi, such as from about 54,000 psi to about 55,000 psi, as measured according to ASTM D882 (25.4 mm width strip).

In at least one embodiment, a film of the present disclosure can have a Dart Drop Impact Strength (or Impact Failure or Dart F50 or Dart Drop Impact), grams per mil (g/mil), in accordance with ASTM D1709. A film of the present disclosure can have a Dart Drop Impact Strength of about 400 g/mil or more, such as about 500 g/mil or more, such as about 525 g/mil to about 1000 g/mil, such as from about 550 g/mil to about 900 g/mil, such as from about 600 g/mil to about 800 g/mil, such as from about 650 g/mil to about 750 g/mil.

In at least one embodiment, a film of the present disclosure can have an Elmendorf Tear value (MD), in accordance with ASTM D-1922 (with conditioning for 40 hours at 23° C.±2° C. and 50%±10% relative humidity), of from about 100 g/mil to about 360 g/mil, such as from about 125 g/mil to about 350 g/mil, such as from about 150 g/mil to about 225 g/mil, such as from about 175 g/mil to about 200 g/mil. In some embodiments the Elmendorf Tear value (MD) can be from about 150 g/mil to about 300 g/mil.

In at least one embodiment, a film of the present disclosure can have an Elmendorf Tear value (TD), in accordance with ASTM D-1922 (with conditioning for 40 hours at 23° C.±2° C. and 50%±10% relative humidity), of from about 320 g/mil to about 720 g/mil, such as from about 350 g/mil to about 690 g/mil, such as from about 380 g/mil to about 660 g/mil, such as from about 400 g/mil to about 620 g/mil.

In at least one embodiment, a film of the present disclosure can have a puncture break energy in units of in-lbs/mil, a film of the present disclosure can have a puncture break energy of from about 12 in-lbs/mil to about 36 in-lbs/mil, such as from about 15 in-lbs/mil to about 33 in-lbs/mil, such as from about 18 in-lbs/mil to about 30 in-lbs/mil. Puncture peak force is determined by a modified ASTM D5748 (ASTM probe was used with two 0.25 mil HDPE slip sheets; machine model" United SFM-1; testing speed: 10 in/min).

Stretch Films

Compositions of the present disclosure may be utilized to prepare stretch films. Stretch films can be used in a variety of bundling and packaging applications. The term "stretch film" indicates films capable of stretching and applying a bundling force, and includes films stretched at the time of application as well as "pre-stretched" films, i.e., films which are provided in a pre-stretched form for use without additional stretching. Stretch films can be monolayer films or multilayer films, and can include conventional additives, such as cling-enhancing additives such as tackifiers, and non-cling or slip additives, to tailor the slip/cling properties of the film.

Shrink Films

Compositions of the present disclosure may be utilized to prepare shrink films. Shrink films, also referred to as heat-shrinkable films, are widely used in both industrial and retail bundling and packaging applications. Such films are capable of shrinking upon application of heat to release stress imparted to the film during or subsequent to extrusion. The shrinkage can occur in one direction or in both longitudinal and transverse directions. Conventional shrink films are described, for example, in WO 2004/022646.

Industrial shrink films can be used for bundling articles on pallets. Typical industrial shrink films are formed in a single bubble blown extrusion process to a thickness of about 80 to 200 μm, and provide shrinkage in two directions, typically at a machine direction (MD) to transverse direction (TD) ratio of about 60:40.

Retail films can be used for packaging and/or bundling articles for consumer use, such as, for example, in supermarket goods. Such films are typically formed in a single bubble blown extrusion process to a thickness of about 35 μm to 80 μm, with a typical MD:TD shrink ratio of about 80:20.

Films may be used in "shrink-on-shrink" applications. "Shrink-on-shrink," as used herein, refers to the process of applying an outer shrink wrap layer around one or more items that have already been individually shrink wrapped (herein, the "inner layer" of wrapping). In these processes, it is desired that the films used for wrapping the individual items have a higher melting (or shrinking) point than the film used for the outside layer. When such a configuration is used, it is possible to achieve the desired level of shrinking in the outer layer, while preventing the inner layer from melting, further shrinking, or otherwise distorting during shrinking of the outer layer. Some films described herein may have a sharp shrinking point when subjected to heat from a heat gun at a high heat setting, which indicates that they may be especially suited for use as the inner layer in a variety of shrink-on-shrink applications.

Greenhouse Films

Compositions of the present disclosure may be utilized to prepare greenhouse films. Greenhouse films are generally heat retention films that, depending on climate requirements, retain different amounts of heat. Less demanding heat retention films are used in warmer regions or for spring time applications. More demanding heat retention films are used in the winter months and in colder regions.

Other Example Applications

Packaging

Compositions of the present disclosure may be utilized to prepare packaging. Packaging includes those packaging structures and packaging applications known to those skilled in the art. Exemplary packaging includes flexible packaging, food packaging, e.g., fresh cut produce packaging, frozen food packaging, bundling, packaging and unitizing a variety of products. Applications for such packaging include various foodstuffs, rolls of carpet, liquid containers, and various like goods normally containerized and/or palletized for shipping, storage, and/or display.

Blow Molded Articles

Compositions of the present disclosure may be used in suitable blow molding processes and applications. Such processes involve a process of inflating a hot, hollow thermoplastic preform (or parison) inside a closed mold. In this manner, the shape of the parison conforms to that of the mold cavity, enabling the production of a wide variety of hollow parts and containers.

In a typical blow molding process, a parison is formed between mold halves and the mold is closed around the parison, sealing one end of the parison and closing the parison around a mandrel at the other end. Air is then blown through the mandrel (or through a needle) to inflate the parison inside the mold. The mold is then cooled and the part formed inside the mold is solidified. Finally, the mold is opened and the molded part is ejected. The process can be performed to provide any suitable design having a hollow shape, including bottles, tanks, toys, household goods, automobile parts, and other hollow containers and/or parts.

Blow molding processes may include extrusion and/or injection blow molding. Extrusion blow molding is typically suited for the formation of items having a comparatively heavy weight, such as greater than about 12 ounces, including but not limited to food, laundry, or waste containers. Injection blow molding is typically used to achieve accurate and uniform wall thickness, high quality neck finish, and to process polymers that cannot be extruded. Typical injection blow molding applications include, but are not limited to, pharmaceutical, cosmetic, and single serving containers, typically weighing less than 12 ounces.

Bags

Compositions of the present disclosure may be utilized to prepare bags. Bags include those bag structures and bag applications known to those skilled in the art. Exemplary bags include shipping sacks, trash bags and liners, industrial liners, produce bags, and heavy duty bags.

Injection Molded Articles

Compositions of the present disclosure may also be used in injection molded applications. Injection molding is a process commonly known in the art, and is a process that usually occurs in a cyclical fashion. Cycle times generally range from 10 to 100 seconds and are controlled by the cooling time of the polymer or polymer blend used.

In a typical injection molding cycle, polymer pellets or powder are fed from a hopper and melted in a reciprocating screw type injection molding machine. The screw in the machine rotates forward, filling a mold with melt and holding the melt under high pressure. As the melt cools in the mold and contracts, the machine adds more melt to the mold to compensate. Once the mold is filled, it is isolated from the injection unit and the melt cools and solidifies. The solidified part is ejected from the mold and the mold is then closed to prepare for the next injection of melt from the injection unit.

Injection molding processes offer high production rates, good repeatability, minimum scrap losses, and little to no need for finishing of parts. Injection molding is suitable for a wide variety of applications, including containers, household goods, automobile components, electronic parts, and many other solid articles.

Extrusion Coating

Compositions of the present disclosure may be used in extrusion coating processes and applications. Extrusion coating is a plastic fabrication process in which molten polymer is extruded and applied onto a non-plastic support or substrate, such as paper or aluminum in order to obtain a multi-material complex structure. This complex structure typically combines toughness, sealing and resistance properties of the polymer formulation with barrier, stiffness or aesthetic attributes of the non-polymer substrate. In this process, the substrate is typically fed from a roll into a molten polymer as the polymer is extruded from a slot die, which is similar to a cast film process. The resultant structure is cooled, typically with a chill roll or rolls, and formed into finished rolls.

Extrusion coating materials can be used in, for example, food and non-food packaging, pharmaceutical packaging, and manufacturing of goods for the construction (insulation elements) and photographic industries (paper).

Foamed Articles

Compositions of the present disclosure may be used in foamed applications. In an extrusion foaming process, a blowing agent, such as, for example, carbon dioxide, nitrogen, or a compound that decomposes to form carbon dioxide or nitrogen, is injected into a polymer melt by means of a metering unit. The blowing agent is then dissolved in the polymer in an extruder, and pressure is maintained throughout the extruder. A rapid pressure drop rate upon exiting the extruder creates a foamed polymer having a homogenous cell structure. The resulting foamed product is typically light, strong, and suitable for use in a wide range of applications in industries such as packaging, automotive, aerospace, transportation, electric and electronics, and manufacturing.

Wire and Cable Applications

Also provided are electrical articles and devices including one or more layers formed of or comprising composition(s) of the present disclosure. Such devices include, for example, electronic cables, computer and computer-related equipment, marine cables, power cables, telecommunications cables or data transmission cables, and combined power/telecommunications cables.

Electrical devices can be formed by methods well known in the art, such as by one or more extrusion coating steps in a reactor/extruder equipped with a cable die. Such cable extrusion apparatus and processes are well known. In a typical extrusion method, an optionally heated conducting core is pulled through a heated extrusion die, typically a cross-head die, in which a layer of melted polymer composition is applied. Multiple layers can be applied by consecutive extrusion steps in which additional layers are added, or, with the proper type of die, multiple layers can be added simultaneously. The cable can be placed in a moisture curing environment, or allowed to cure under ambient conditions.

Rotomolded Products

Also provided are rotomolded products including one or more layers formed of or comprising composition(s) of the present disclosure. Rotomolding or rotational molding involves adding an amount of material to a mold, heating and slowly rotating the mold so that the softened material coats the walls of the mold. The mold continues to rotate at all times during the heating phase, thus maintaining even thickness throughout the part and preventing any deformation during the cooling phase. Examples of rotomolded products include but are not limited to furniture, toys, tanks, road signs tornado shelters, containers including United Nations-approved containers for the transportation of nuclear fissile materials.

EMBODIMENTS LISTING

The present disclosure provides, among others, the following embodiments, each of which may be considered as optionally including any alternate embodiments.

Clause 1. A film, comprising:
a polyethylene composition, comprising:
ethylene and a $C_3$-$C_{40}$ olefin comonomer, the polyethylene composition having at least 65 wt % ethylene content and from 0 wt % to 35 wt % of a $C_3$-$C_{40}$ olefin comonomer content based upon the total weight of the composition as determined by GPC-IR5-LS-VIS, the film having:
an average of MD and TD 1% secant modulus of 43,000 psi or greater as determined by ASTM D882, and
a Dart Drop Impact Strength of greater than 500 g/mil, as determined by ASTM D1709.

Clause 2. The film of Clause 1, wherein the $C_3$-$C_{40}$ olefin comonomer content is from 4 wt % to 10 wt % based upon the total weight of the polyethylene composition, as determined by GPC-IR5-LS-VIS.

Clause 3. The film of Clause 1 or Clause 2, wherein the $C_3$-$C_{40}$ olefin comonomer is propylene, 1-butene, 4-methyl-1-pentene, 3-methyl-1-pentene, 1-hexene, 1-octene, or a combination thereof.

Clause 4. The film of any one of Clauses 1-3, wherein the $C_3$-$C_{40}$ olefin comonomer is 1-hexene.

Clause 5. The film of any one of Clauses 1-4, wherein the average of MD and TD 1% secant modulus is from 43,000 psi to 68,000 psi.

Clause 6. The film of any one of Clauses 1-5, wherein the polyethylene composition has a melt index ratio ($I_{21}/I_2$) of 18 to 35, and wherein $I_{21}$ and $I_2$ are determined by ASTM 1238.

Clause 7. The film of any one of Clauses 1-6, wherein the polyethylene composition has a density of from 0.917 g/cm$^3$ to 0.94 g/cm$^3$ as determined by ASTM 1505.

Clause 8. The film of any one of Clauses 1-7, wherein the polyethylene composition has a $g'_{vis}$ of from 0.9 to 0.97, as determined by GPC-IR5-LS-VIS.

Clause 9. The film of any one of Clauses 1-8, wherein the polyethylene composition has a weight average molecular weight (Mw) of from 75,000 g/mol to 200,000 g/mol, as determined by GPC-IR5-LS-VIS.

Clause 10. The film of any one of Clauses 1-9, wherein the polyethylene composition has a number average molecular weight (Mn) of from 5,000 g/mol to 15,000 g/mol, as determined by GPC-IR5-LS-VIS.

Clause 11. The composition of Clause 10, wherein the polyethylene composition has a z-average molecular weight (Mz) of from 500,000 g/mol to 1,800,000 g/mol, as determined by GPC-IR5-LS-VIS.

Clause 12. The film of any one of Clauses 1-11, wherein the polyethylene composition has a molecular weight distribution (Mw/Mn) of from 2 to 8, as determined by GPC-IR5-LS-VIS.

Clause 13. The film of Clause 12, wherein the Mw/Mn is from 3 to 7.

Clause 14. The film of any one of Clauses 1-13, wherein the film has one or more of the following properties:
a 1% Secant Modulus (MD) of from 38,000 psi to 58,000 psi, as determined by ASTM D882 (25.4 mm width strip); or
a 1% Secant Modulus (TD) of from 50,000 psi to 80,000 psi, as determined by ASTM D882 (25.4 mm width strip).

Clause 15. A film, comprising:
a polyethylene composition, comprising:
ethylene and a $C_3$-$C_{40}$ olefin comonomer, the polyethylene composition having at least 65 wt % ethylene content and from 0 wt % to 35 wt % of a $C_3$-$C_{40}$ olefin comonomer content based upon the total weight of the composition as determined by GPC-IR5-LS-VIS, the film having:
an average of MD and TD 1% secant modulus of 43,000 psi to 68,000 psi as determined by ASTM D882, a Dart Drop Impact Strength of greater than 500 g/mil, as determined by ASTM D1709, a 1% Secant Modulus in the Machine Direction (MD) of from 38,000 psi to 58,000 psi, as determined by ASTM D882 (25.4 mm width strip), and a 1% Secant Modulus in the Transverse Direction (TD) of from 50,000 psi to 80,000 psi, as determined by ASTM D882 (25.4 mm width strip).

Clause 16. The film of Clause 15, wherein the polyethylene composition has one or more of the following properties:

density of from 0.917 g/cm³ to 0.94 g/cm³ as determined by ASTM 1505;

a g'$_{vis}$ of from 0.9 to 0.97, as determined by GPC-IR5-LS-VIS;

a weight average molecular weight (Mw) of from 75,000 g/mol to 200,000 g/mol, as determined by GPC-IR5-LS-VIS;

a number average molecular weight (Mn) of from 5,000 g/mol to 15,000 g/mol, as determined by GPC-IR5-LS-VIS;

a z-average molecular weight (Mz) of from 500,000 g/mol to 1,800,000 g/mol, as determined by GPC-IR5-LS-VIS; or a molecular weight distribution (Mw/Mn) of from 2 to 8, as determined by GPC-IR5-LS-VIS.

Clause 17. A process for producing a polyethylene composition, comprising:

introducing ethylene and a $C_3$-$C_{40}$ alpha-olefin to a catalyst system, the catalyst system comprising a first catalyst compound, a second catalyst compound, and an activator; and forming a polyethylene composition, the first catalyst compound being represented by Formula (I)

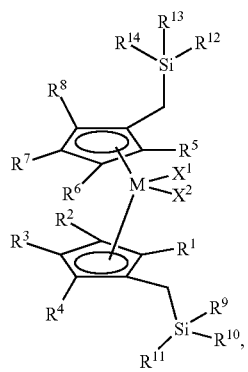

(I)

wherein:

M is Ti, Hf, or Zr;

each of $X^1$ and $X^2$ is independently $C_1$ to $C_{20}$ hydrocarbyl radical, a functional group comprising elements from Groups 13 to 17 of the periodic table of the elements, or $X^1$ and $X^2$ join together to form a $C_4$ to $C_{62}$ cyclic or polycyclic ring structure;

each of $R^1$, $R^2$, $R^3$, $R^4$, $R^5$, $R^6$, $R^7$, and $R^8$ is independently selected from hydrogen, halogen, $C_1$-$C_{40}$ hydrocarbyl, substituted $C_1$-$C_{40}$ hydrocarbyl, a functional group comprising elements from Groups 13 to 17 of the periodic table of the elements or one or more of $R^1$ and $R^2$, $R^2$ and $R^3$, $R^3$ and $R^4$, $R^5$ and $R^6$, $R^6$ and $R^7$, $R^7$ and $R^8$ are joined to form a saturated ring, unsaturated ring, substituted saturated ring, or substituted unsaturated ring, such as a substituted or unsubstituted $C_4$ to $C_{62}$ cyclic or polycyclic ring; and each of $R^9$, $R^{10}$, $R^{10}$, $R^{11}$, $R^{12}$, and $R^{13}$ is independently selected from hydrogen, $C_1$-$C_{40}$ hydrocarbyl, or substituted $C_1$-$C_{40}$ hydrocarbyl; and the second catalyst compound being represented by Formula (IIa) or Formula (IIb):

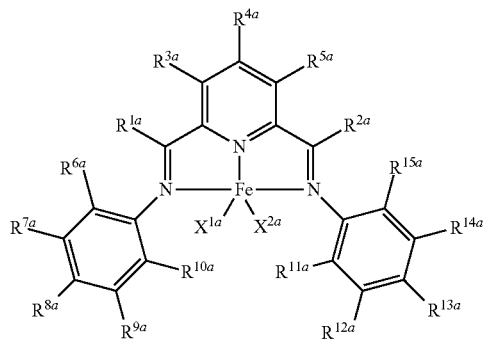

(IIa)

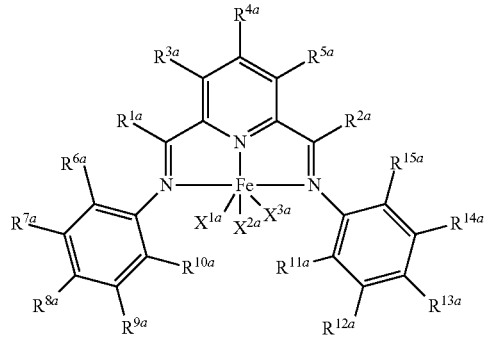

(IIb)

wherein:

each of $R^{6a}$, $R^{10a}$, $R^{11a}$, and $R^{12a}$ are independently halogen, —$CF_3$, or $C_1$-$C_{22}$-alkyl, or —OR';

each of $R^{1a}$ and $R^{2a}$ is independently hydrogen, $C_1$-$C_{22}$-alkyl, $C_2$-$C_{22}$-alkenyl, $C_6$-$C_{22}$-aryl, arylalkyl wherein alkyl has from 1 to 10 carbon atoms and aryl has from 6 to 20 carbon atoms, or five-, six- or seven-membered heterocyclyl comprising at least one atom selected from N, P, O and S, wherein each of $R^{1a}$ and $R^{2a}$ is optionally substituted by halogen, —NR'2, —OR' or —SiR"3, wherein $R^{1a}$ optionally bonds with $R^{1a}$, and $R^{2a}$ optionally bonds with $R^{5a}$, in each case to independently form a five-, six- or seven-membered ring;

each of $R^{3a}$, $R^{4a}$, $R^{5a}$, $R^{7a}$, $R^{8a}$, $R^{9a}$, $R^{12a}$, $R^{13a}$, and $R^{14a}$ is independently hydrogen, $C_1$-$C_{22}$-alkyl, $C_2$-$C_{22}$-alkenyl, $C_6$-$C_{22}$-aryl, arylalkyl wherein alkyl has from 1 to 10 carbon atoms and aryl has from 6 to 20 carbon atoms, halogen, —NR'$_2$, —OR', —SiR"$_3$ or five-, six- or seven-membered heterocyclyl comprising at least one atom selected from N, P, O and S; and each of $X^{1a}$, $X^{2a}$, and $X^{aa}$ is independently hydrogen, halogen, $C_1$-$C_{20}$-alkyl, $C_2$-$C_{10}$-alkenyl, $C_6$-$C_{20}$-aryl, arylalkyl wherein alkyl has from 1 to 10 carbon atoms and aryl has from 6 to 20 carbon atoms, —NR'2, —OR', —SR', —SO$_3$R', —OC(O)R', —CN, —SCN, β-diketonate, —CO, —BF$_4^-$, —PF$_6^-$ or bulky non-coordinating anion, or $X^{1a}$ and $X^{2a}$ optionally bond to form a five- or six-membered ring.

Clause 18. The process of Clause 17, wherein each of $X^1$ and $X^2$ is independently halogen or $C_1$-$C_{20}$-alkyl.

Clause 19. The process of Clause 17 or Clause 18, wherein each of $R^9$, $R^{11}$, $R^{12}$, and $R^{13}$ is independently $C_1$-$C_{12}$ hydrocarbyl, or substituted $C_1$-$C_{12}$ hydrocarbyl.

Clause 20. The process of any one of Clauses 17-19, wherein M is hafnium.

Clause 21. The process of any one of Clauses 17-20, wherein the first catalyst compound is one or more of:

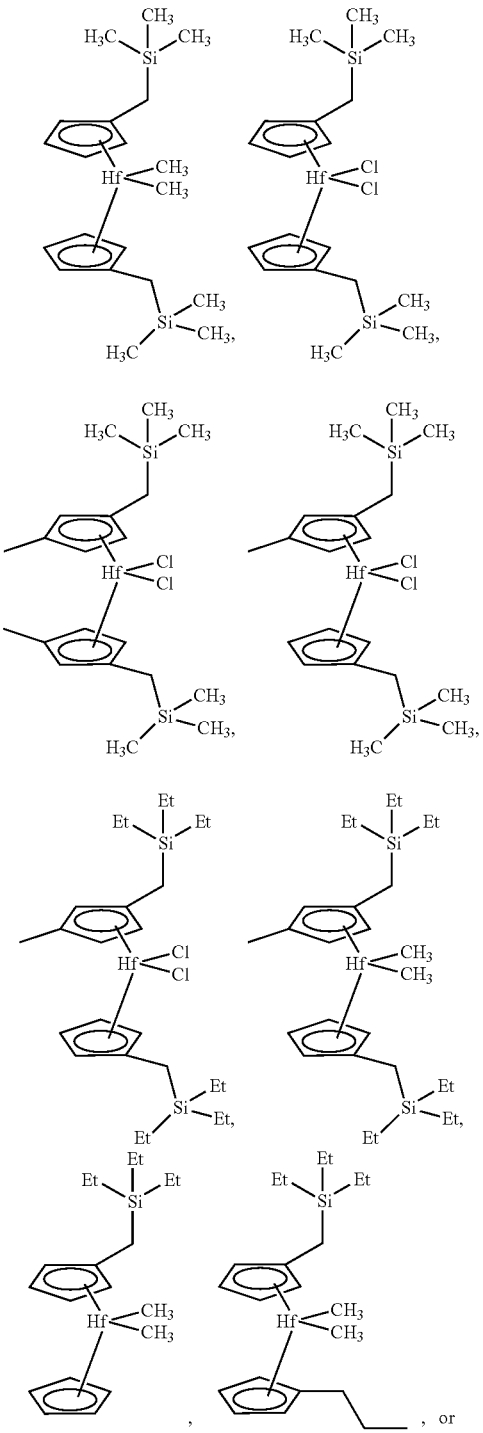

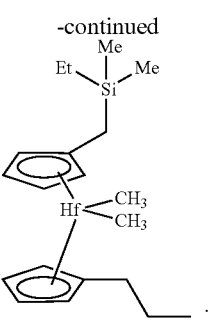

Clause 22. The process of any one of Clauses 17-21, wherein the first catalyst compound is

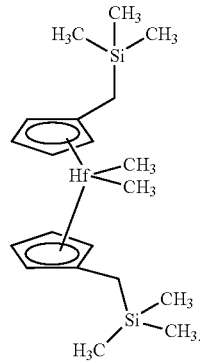

Clause 23. The process of any one of Clauses 17-22, wherein:

each of $X^{1a}$ and $X^{2a}$ is independently halogen; and each of $R^{6a}$ and $R^{15a}$ is independently halogen.

Clause 24. The process of any one of Clauses 17-23, wherein:

each of $R^{1a}$ and $R^{2a}$ is independently $C_1$-$C_{20}$ hydrocarbyl;

each of $R^{1a}$, $R^{4a}$, and $R^{5a}$ is independently hydrogen;

each of $R^{8a}$, $R^{10a}$, $R^{11a}$ and $R^{13a}$ is hydrocarbyl;

each of $R^{7a}$, $R^{9a}$, $R^{12a}$ and $R^{14a}$ is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, halogen, —NR'2, —OR', —SiR"$_3$ or five-, six- or seven-membered heterocyclyl comprising at least one atom selected from the group consisting of N, P, O and S;

R' is optionally substituted by halogen, or two R' radicals bond to form a five- or six-membered ring; and each R" is independently hydrogen, $C_1$-$C_{22}$-alkyl, $C_2$-$C_{22}$-alkenyl, $C_6$-$C_{22}$-aryl or arylalkyl where alkyl has from 1 to 10 carbon atoms and aryl has from 6 to 20 carbon atoms, or two R" radicals optionally bond to form a five- or six-membered ring.

Clause 25. The process of any one of Clauses 17-24, wherein the second catalyst compound is one or more of:
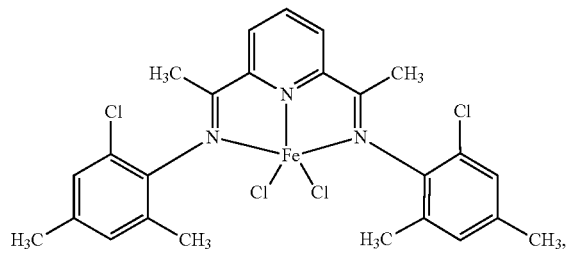
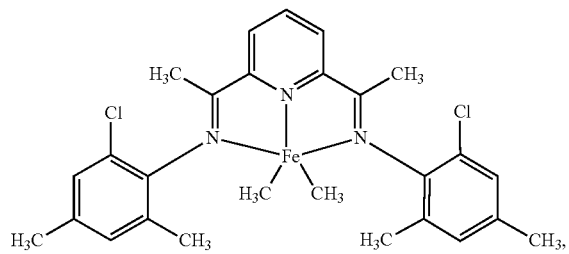
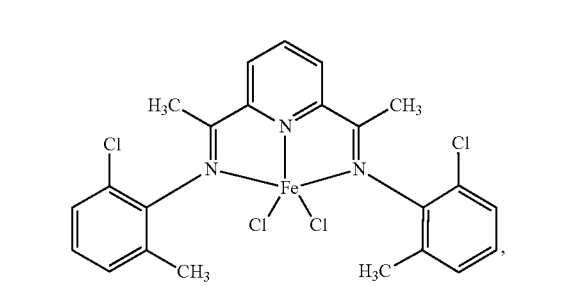
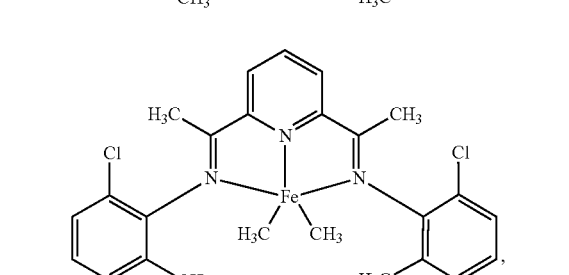
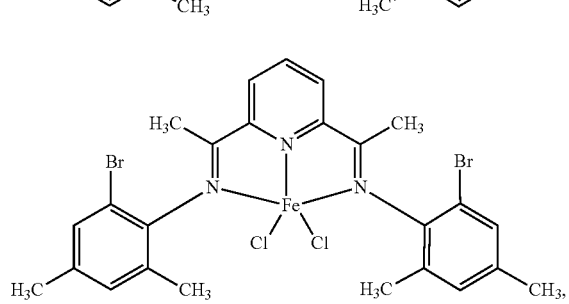
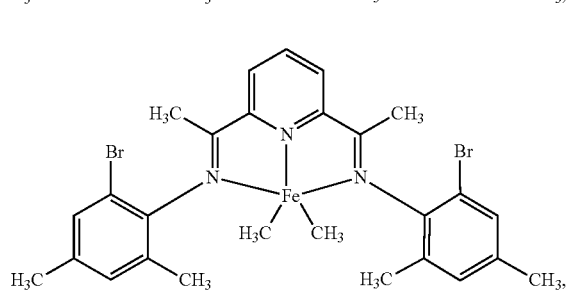
-continued
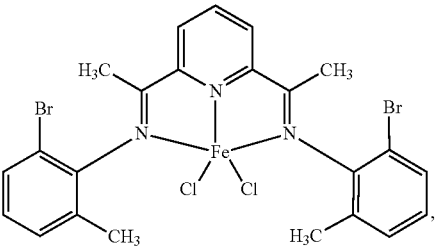
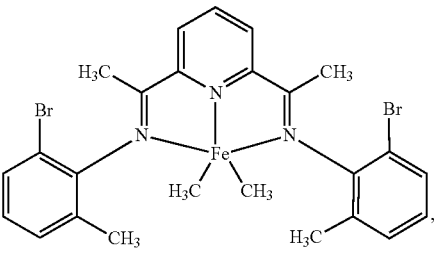
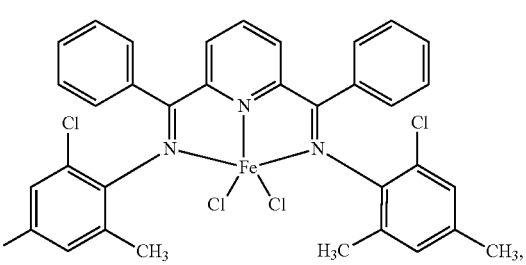
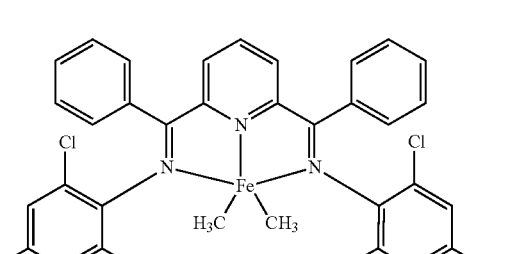
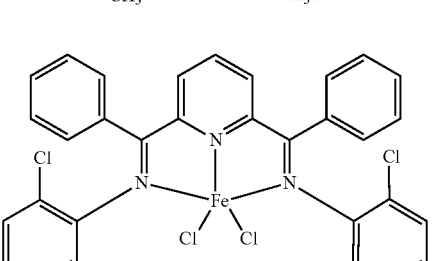
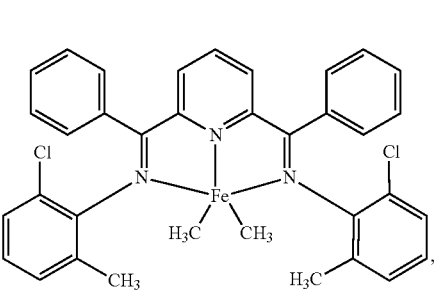

-continued

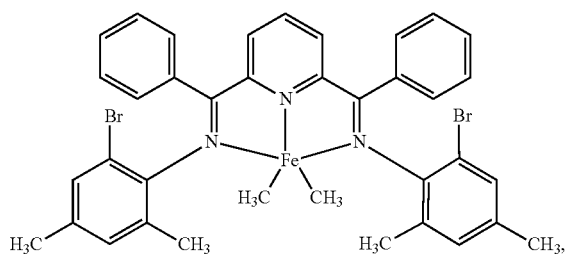

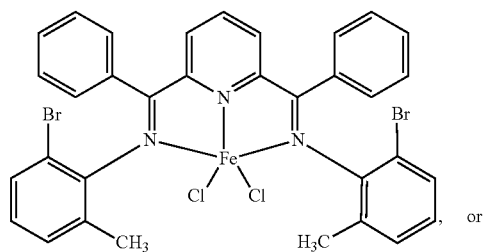

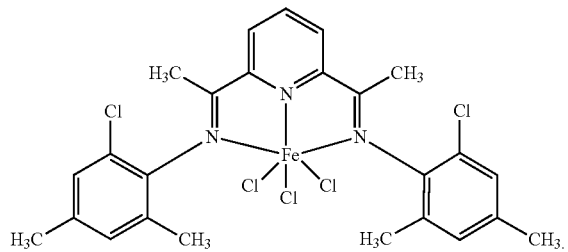

Clause 26. The process of any one of Clauses 17-25, wherein the second catalyst compound is one or more of:

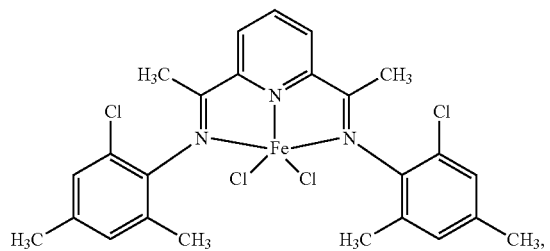

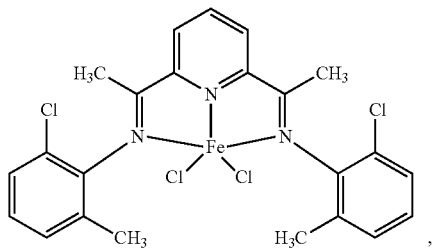

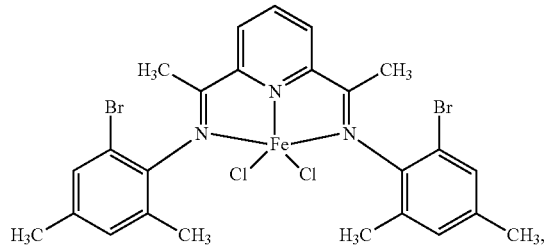

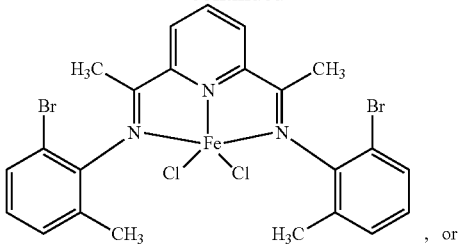, or

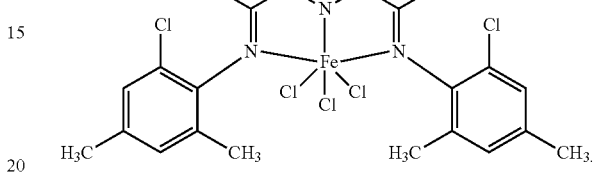

Clause 27. The process of any one of Clauses 17-26, wherein the second catalyst compound is

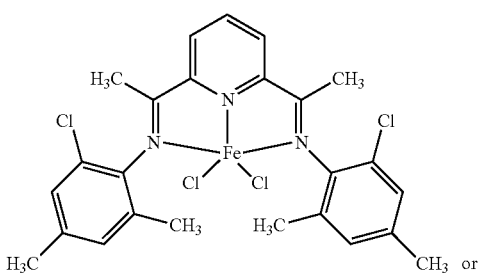 or

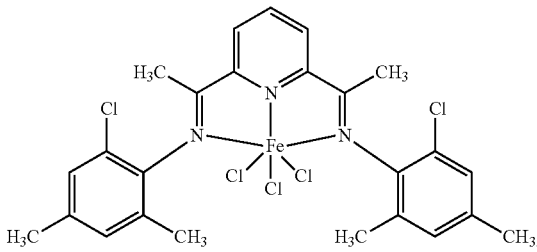

Clause 28. The process of any one of Clauses 17-27, wherein a molar ratio of first catalyst compound to second catalyst compound is from 1:1 to 5:1.

Clause 29. The process of any one of Clauses 17-28, wherein a molar ratio of first catalyst compound to second catalyst compound is from 0.6:0.4 to 0.9:0.2.

Clause 30. The process of any one of Clauses 17-29, wherein the activator is methylalumoxane (MAO).

Test Methods

A. Resin Analysis

Melt Index (MI, also referred to as I2) is measured according to ASTM D1238 at 190° C., under a load of 2.16 kg unless otherwise noted. The units for MI are g/10 min or dg/min.

High Load Melt Index (HLMI, also referred to as I21) is the melt flow rate measured according to ASTM D-1238 at 190° C., under a load of 21.6 kg. The units for HLMI are g/10 min or dg/min.

Melt Index Ratio (MIR) is the ratio of the high load melt index to the melt index, or I21/I2.

Density is measured by density-gradient column, as described in ASTM D1505, on a compression-molded specimen that has been cooled to room temperature following ASTM D4703-10a, Procedure C, then conditioned under ASTM D618-08 (23°±2° C. and 50±10% Relative Humidity) for 40 Hours before testing.

Gel Permeation Chromatography (GPC)

While the GPC in the CFC analysis also generated the distributions and the moments of molecular weight, for the purposes of the claims, the distributions and the moments of molecular weight (Mw, Mn, Mw/Mn, etc.), the comonomer content ($C_2$, $C_3$, $C_6$, etc.) and the branching index (g'vis) from GPC-IR5-LS-VIS was used.

GPC-IR5-LS-VIS is a high temperature Gel Permeation Chromatography (Polymer Char GPC-IR) equipped with a multiple-channel band-filter based Infrared detector IR5, an 18-angle Wyatt Dwan Heleos light scattering detector and a 4-capillary viscometer with Wheatstone bridge configuration. Three Agilent PLgel 10-μm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1-μm Teflon filter and degassed with an online degasser before entering the GPC instrument. The nominal flow rate is 1.0 ml/min and the nominal injection volume is 200 μL. The whole system including transfer lines, columns, and viscometer detector are contained in ovens maintained at 145° C. The polymer sample is weighed and sealed in a standard vial with 80-4 flow marker (Heptane) added to it. After loading the vial in the autosampler, polymer is automatically dissolved in the instrument with 8 ml added TCB solvent. The polymer is dissolved at 160° C. with continuous shaking for about 2 hour. The concentration (c), at each point in the chromatogram is calculated from the baseline-subtracted IR5 broadband signal intensity (I), using the following equation: c=βI, where β is the mass constant. The mass recovery is calculated from the ratio of the integrated area of the concentration chromatography over elution volume and the injection mass which is equal to the pre-determined concentration multiplied by injection loop volume. The conventional molecular weight (IR MW) is determined by combining universal calibration relationship with the column calibration which is performed with a series of monodispersed polystyrene (PS) standards ranging from 700 to 10M gm/mole. The MW at each elution volume is calculated with following equation:

$$\log M = \frac{\log(K_{PS}/K)}{a+1} + \frac{a_{PS}+1}{a+1}\log M_{PS}$$

where the variables with subscript "PS" stand for polystyrene while those without a subscript are for the test samples. In this method, $\alpha_{PS}$=0.67 and $K_{PS}$=0.000175 while a and K are for other materials as calculated and published in literature (Sun, T. et al. Macromolecules 2001, v.34, pg. 6812), specifically, α=0.695 and K=0.000579 for linear ethylene polymers, α=0.705 and K=0.0002288 for linear propylene polymers. Concentrations are expressed in g/cm3, molecular weight is expressed in g/mole, and intrinsic viscosity (hence K in the Mark-Houwink equation) is expressed in dL/g unless otherwise noted. Here the concentrations are expressed in g/cm³, molecular weight is expressed in g/mole, and intrinsic viscosity (hence K in the Mark-Houwink equation) is expressed in dL/g unless otherwise noted.

The comonomer composition is determined by the ratio of the IR5 detector intensity corresponding to $CH_2$ and $CH_3$ channel calibrated with a series of PE and PP homo/copolymer standards whose nominal value are predetermined by NMR or FTIR. In particular, this provides the methyl number per 1,000 total carbons ($CH_3$/1000TC) as a function of molecular weight. The short-chain branch (SCB) content per 1000TC (SCB/1000TC) is then computed as a function of molecular weight by applying a chain-end correction to the $CH_3$/1000TC function, assuming each chain to be linear and terminated by a methyl group at each end.

The LS molecular weight (M) at each point in the chromatogram is determined by analyzing the LS output using the Zimm model for static light scattering $$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle θ, c is the polymer concentration determined from the IR5 analysis, $A_2$ is the second virial coefficient, $P(\theta)$ is the form factor for a monodisperse random coil, and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and λ=665 nm. For analyzing PE polymers, dn/dc=0.1048 ml/mg and $A_2$=0.0015.

A high temperature Polymer Char viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_S$, for the solution flowing through the viscometer is calculated from their outputs. The intrinsic viscosity, [η], at each point in the chromatogram is calculated from the equation [η]=$\eta_S$/c, where c is concentration and is determined from the IR5 broadband channel output.

The branching index ($g'_{vis}$) is calculated using the output of the GPC-IR5-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits.

The branching index $g'_{vis}$ is defined as $$g'_{vis} = \frac{[\eta]_{avg}}{K M_v^\alpha},$$

where $M_V$ is the viscosity-average molecular weight based on molecular weights determined by LS analysis and the K and a are for the reference linear polymer, which are, for purposes of the present disclosure, a and K are the same as described above for linear polyethylene polymers.

TREF-IR5

Figure 3:
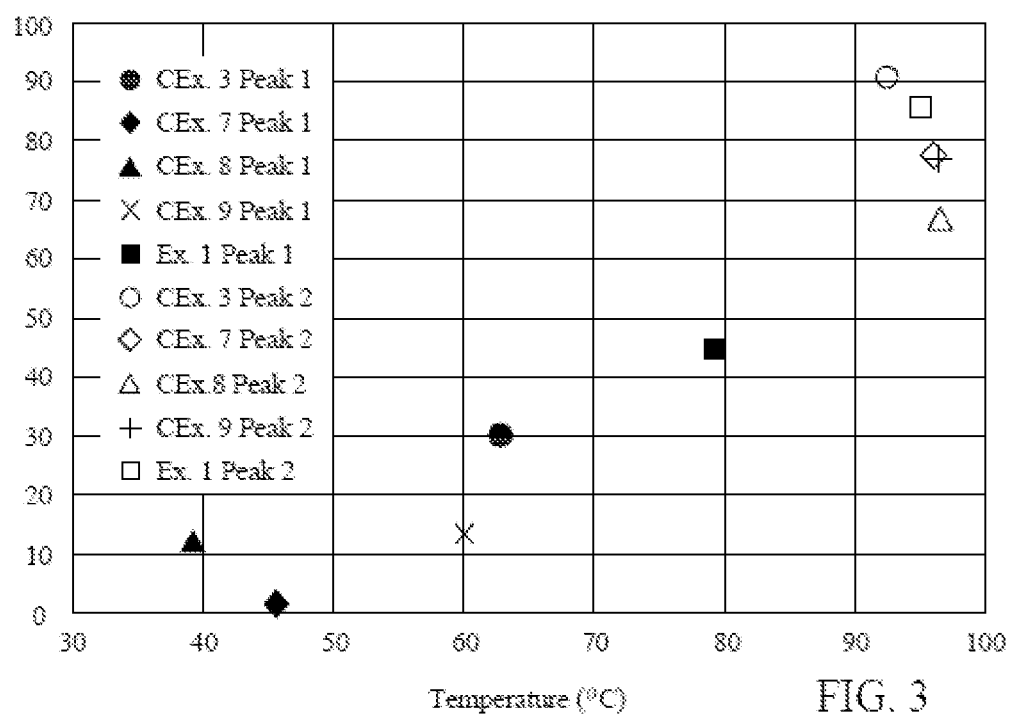
FIG. 3 is a graph of peak wt % versus peak temperature obtained by TREF-IR5 analysis for comparative copolymers and an example ethylene hexene copolymer according to at least one embodiment of the present disclosure.

Temperature Rising Elution Fractionation (TREF) analysis was done using a Crystallization Elution Fractionation (CEF) instrument from Polymer Char, S. A., Valencia, Spain. The principles of CEF analysis and a general description of the particular apparatus used are given in the article Monrabal, B.; del Hierro, P. *Anal. Bioanal. Chem.* 2011, v.399, pg. 1557. FIG. 3 of the article is an appropriate schematic of the particular apparatus to be used; however, the connections to the 6-port valve shown in FIG. 3 differ from the apparatus to be used in that the tubing connected to the 11-o'clock port is connected to the 9-o'clock port and the tubing connected to the 9-o'clock port is connected to the 11-o'clock port. Pertinent details of the analysis method and features of the apparatus to be used are as follows.

The solvent used for preparing the sample solution and for elution was 1,2-Dichlorobenzene (ODCB) which was stabilized by dissolving 1.6 g of 2,6-bis(1,1-dimethylethyl)-4-methylphenol (butylated hydroxytoluene) in a 4-L bottle of fresh solvent at ambient temperature. The stabilized solvent was then filtered using a 0.1-μm Teflon filter (Millipore). The sample (6-10 mg) to be analyzed was dissolved in 8 ml of ODCB metered at ambient temperature by stirring (Medium setting) at 150° C. for 90 minutes. A small volume of the polymer solution was first filtered by an inline filter (stainless steel, 10 μm), which is back-flushed after every filtration. The filtrate was then used to completely fill a 200-μl injection-valve loop. The volume in the loop was then introduced near the center of the CEF column (15-cm long SS tubing, ⅜" o.d., 7.8 mm i.d.) packed with an inert support (SS balls) at 140° C., and the column temperature was stabilized at 125° C. for 20 minutes. The sample volume was then allowed to crystallize in the column by reducing the temperature to 0° C. at a cooling rate of 1° C./min. The column was kept at 0° C. for 10 minutes before injecting the ODCB flow (1 ml/min) into the column for 10 minutes to elute and measure the polymer that did not crystallize (soluble fraction). The wide-band channel of the infrared detector used (Polymer Char IR5) generates an absorbance signal that is proportional to the concentration of polymer in the eluting flow. A complete TREF curve was then generated by increasing the temperature of the column from 0° C. to 140° C. at a rate of 2° C./min while maintaining the ODCB flow at 1 ml/min to elute and measure the concentration of the dissolving polymer.

Differential Scanning Calorimetry

The thermal properties of the resins were determined using a Texas Instuments' TA Q2500 instrument as follows: About 5 mg of resin sample was equilibrated at 25° C. and then heated from 25° C. to 200° C. at 10° C./min; held at 200° C. for 3 minutes, cooled from 200° C. to −70° C. at 10° C./min; held at −70° C. for 3 minutes, heated from −70° C. to 200° C. at 10° C./min.

Normalized second-melt thermograms were interrogated from 35-138° C. using a linear base line adjustment to determine the heat of heat of fusion, $\Delta H_f$ of the PE samples. The heat of fusion of a pure polyethylene crystal)(H° was assumed to be 293 J/gram. The percent crystallinity (X %) is calculated using the formula: [$\Delta H_f$ (in J/g)/H° (in J/g)] *100.

Cross-Fraction Chromatography

Cross-fractionation chromatography (CFC), also known as TREF/GPC, which combines TREF and traditional GPC as disclosed in WO 2015/123164 A1, was performed on a CFC-2 instrument from Polymer Char, Valencia, Spain on polyethylene samples. The instrument was operated and subsequent data processing, for example, smoothing parameters, setting baselines, and defining integration limits, was performed according to the manner described in the CFC User Manual provided with the instrument or in a manner commonly used in the art. The instrument was equipped with a TREF column (stainless steel; o.d., ⅜"; length, 15 cm; packing, non-porous stainless steel micro-balls) in the first dimension and a GPC column set (3× PLgel 10 μm Mixed B column from Polymer Labs, UK) in the second dimension. Downstream from the GPC column was an infrared detector (IR4 from Polymer Char) capable of generating an absorbance signal that is proportional to the concentration of polymer in solution.

The sample to be analyzed was dissolved in ortho-dichlorobenzene, at a concentration of about 5 mg/ml, by stirring at 150° C. for 75 minutes. Then a 0.5 ml volume of the solution containing 2.5 mg of polymer was loaded in the center of the TREF column and the column temperature was reduced and stabilized at about 120° C. for 30 minutes. The column was then cooled slowly (0.2° C./min) to −15° C. (for cryogenic runs) to crystallize the polymer on the inert support. The low temperature was held for 10 minutes before injecting the soluble fraction into the GPC column. All GPC analyses were done using solvent ortho-dichlorobenzene at 1 ml/min, a column temperature of 140° C., and in the "Overlap GPC Injections" mode. Then the subsequent higher-temperature fractions were analyzed by increasing the TREF column temperature to the fraction set-points in a stepwise manner, letting the polymer dissolve for 16 minutes ("Analysis Time"), and injecting the dissolved polymer into the GPC column for 3 minutes ("Elution Time"). The soluble portion or "purge" of the polymers was not analyzed, only the "insoluble" portion of the polymer samples were analyzed, that is, insoluble at −15° C. or lower.

The universal calibration method was used for determining the molecular mass of eluting polymers. Thirteen narrow molecular-weight distribution polystyrene standards (obtained from Polymer Labs, UK) within a range of 1.5 kg/mol to 8,200 kg/mol were used to generate a universal calibration curve. Mark-Houwink parameters were obtained from Appendix I of *Size Exclusion Chromatography* by S. Mori and H. G. Barth (Springer, 1999). For polystyrene K=1.38× $10^{-4}$ dl/g and α=0.7; and for polyethylene K=5.05× $10^{-4}$ dl/g and α=0.693 were used. Fractions having a weight % recovery (as reported by the instrument software) of less than 0.5% were not processed for calculations of molecular-weight averages (Mn, Mw, etc.) of the individual fractions or of aggregates of fractions.

Composition Analysis from Cross-Fractionation Chromatography Results

The cryogenic cross-fractionation chromatography (CFC) results obtained above were analyzed using Moebus Bivariate Deconvolution with Rotation (MBDR) method to determine the inter-correlation between molecular weight and comonomer content.

Figure 4A:
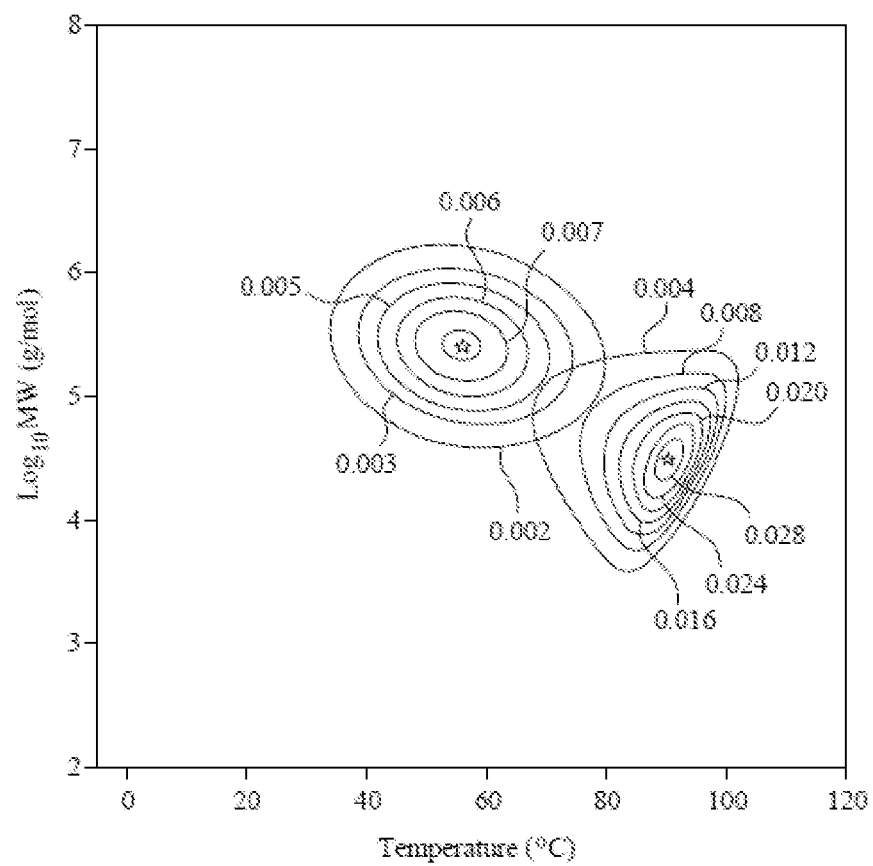
FIG. 4A is a cross-fraction chromatography plot for a comparative polyethylene.
Figure 4B:
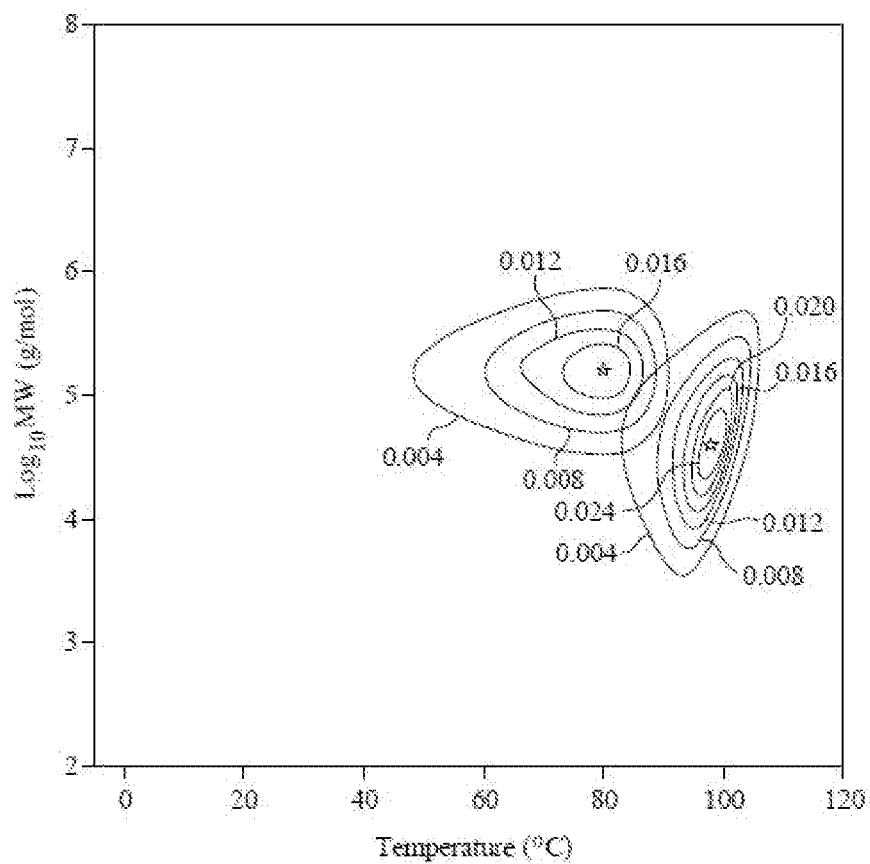
FIG. 4B is a cross-fraction plot chromatography for an example ethylene hexene copolymer according to at least one embodiment of the present disclosure.

As shown in FIG. 4A and FIG. 4B, two peaks are observed for both samples on the $\log_{10}$ MW vs. temperature contour plots. The peak located at lower temperature and higher molecular weight portion (corresponding to a low density population), is defined as Peak 1, with corresponding temperature and molecular weight coordinate of ($M_{p1}$, $T_{p1}$). And the peak located at higher temperature and lower molecular weight portion (corresponding to a high density population), is defined as Peak 2, with corresponding temperature and molecular weight coordinate of ($M_{p2}$, $T_{p2}$).

Quantitatively, the Moebus Bivariate Deconvolution with Rotation (MBDR) method was used to calculate the location of the two peaks and the relevant compositional information. The MBDR uses Equation 1 (Pearson IV × Pearson IV) and Equation 2 (Standard Minimization) to deconvolute peaks in x and y (or in this case temperature and molecular weight). One of the most important features of this method is the rotational term. Most samples vary in both dimensions simultaneously but standard deconvolution only truly allows variability in dimensions parallel to the axes (i.e., x or y not x and y). With this being the case, using standard deconvolution would require more peaks to be fitted to sufficiently characterize the data. The rotational term allows the strictly orthogonal dimensions to rotate therefore allowing the data to be more accurately characterized. By simultaneously fitting the parameters for two peaks with constraints, as shown in FIG. 4A and FIG. 4B, we can find the peak locations (e.g., molecular weight peak ($M_p$), temperature peak ($T_p$)), peak mass fractions (i.e., area under the plot for each of the two peaks), and shape parameters (e.g., theta, $\theta$).

$$f(x, y) = \sum_{i=1}^{N} Amp_i \left\{ 1 + \left(\frac{x_{\theta i}}{\alpha_{xi}}\right)^2 \right\}^{-m_{xi}} \exp \quad \text{Equation 1}$$

$$\left\{-v_{xi}\arctan\left(\frac{x_{\theta i}}{\alpha_{xi}}\right)\right\} \left\{1 + \left(\frac{y_{\theta i}}{\alpha_{xi}}\right)^2\right\}^{-m_{yi}} \exp\left\{-v_{yi}\arctan\left(\frac{y_{\theta i}}{\alpha_{xi}}\right)\right\}$$

where:

$$x_{\theta i} = (x - \lambda_{xi})\cos\theta_i - (y - \lambda_{yi})\sin\theta_i, \text{ and}$$

$$y_{\theta i} = (x - \lambda_{xi})\sin\theta_i - (y - \lambda_{yi})\cos\theta_i$$

$$\min\left[(M(x, y) - f(x, y))^2\right] \quad \text{Equation 2}$$

where M is the measured data or "ground truth"; Amp: the height (i.e. z value) of each peak; λ is the location parameter, which indicates where on the axis the peak exists; α is the scale parameter, which describes the width of the peak (as defined by Pearson IV); m is the shape parameter describing the kurtosis or "tailedness" of the peak; v is another shape parameter that describes skewness; and θ is the rotation parameter, which describes rotation from orthogonal axis.

B. Film Analysis

For all film analysis, film specimens are conditioned at 23° C.+/−2° C. and 50+/−10% relative humidity in accordance with Procedure A of ASTM D618 (40 hour minimum) unless otherwise specified. Where applicable, the properties and descriptions below are intended to encompass measurements in both the machine and transverse directions. Such measurements are reported separately, with the designation "MD" indicating a measurement in the machine direction, and "TD" indicating a measurement in the transverse direction.

Gauge, reported in mils, was measured using a HEIDENHAN Gauge Micrometer following ASTM D6988-13, apparatus C, method C. For average gauge of a film roll, twenty (20) readings were taken, with the location for each reading evenly distributed on the sample. For each film sample, ten film thickness data points were measured per inch of film as the film was passed through the gauge in a transverse direction. From these measurements, an average gauge measurement was determined and reported.

1% Secant Modulus, reported in pounds per square inch ($lb/in^2$ or psi), was measured as specified by ASTM D-882 using 1 inch wide film strip.

Tensile Strength at Yield, Tensile Strength at Break or Ultimate Tensile Strength were measured as specified by ASTM D-882 using 1 inch wide film strip.

Elongation at Yield and Elongation at Break, reported as a percentage (%), were measured as specified by ASTM D-882 using 1 inch wide film strip.

Dart Drop Impact or Dart Drop Impact Strength (DIS), reported in grams per mil (g/mil), was measured as specified by ASTM D-1709, method A, using a Phenolic probe. Calculation uses last 10 passes and 10 fails.

Elmendorf Tear, reported in grams (g) or grams per mil (g/mil), was determined according to ASTM D-1922.

Puncture test was performed on Model SFM-1 testing machine by United Testing Systems following a modified ASTM D5748 procedure, in which a non-standard probe of ¾" diameter with hemispherical tip of equal size was used with two 0.25 mil HDPE slip sheets. Testing speed was 10 in/min.

Haze, reported as a percentage (%), was measured on a HazeGard PLUS hazemeter by BYK-Gardner as specified by ASTM D-1003.

Gloss was measured on a Model 4535 Micro-Gloss 45° Reflectometer by BYK Gardner at a reflectance angle of 45° following ASTM D2457-13.

EXAMPLES

Example Synthesis of Catalysts

All reactions were performed in an inert $N_2$ purged glove box unless otherwise stated. All anhydrous solvents were purchased from Fisher Chemical and were degassed and dried over molecular sieves prior to use. Deuterated solvents were purchased from Cambridge Isotope Laboratories and dried over molecular sieves prior to use. n-Butyl lithium (2.5 M solution in hexane), dicyclopentadiene, dimethyl sulfide ($Me_2S$) and purchased from Sigma-Aldrich. Hafnium tetrachloride ($HfCl_4$) 99+%, and trimethylsilylmethyl trifluoromethanesulfonate were purchased from Strem Chemicals and TCI America respectively, and used as received. MAO is methyl alumoxane (30 wt % in toluene) obtained from Albemarle.

Example Synthesis of Metallocene Catalyst 1

Metallocene Catalyst 1 is:

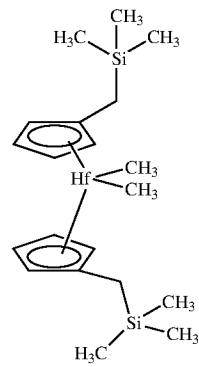

Synthesis of trimethylsilylmethyl cyclopentadiene, $Me_3SiCH_2CpH$. A neat trimethylsilylmethyl trifluoromethanesulfonate (25.0 g, 105.8 mmol) was dissolved in 300 mL of diethyl ether and cooled to −25° C.; to this a solid potassium cyclopentadienide (11.14 g, 106.9 mmol) was slowly added over a period of 10-15 minutes. The resulting mixture was stirred overnight at room temperature. Insoluble materials were filtered out. Volatiles from the reaction mixture were carefully removed under dynamic vacuum to avoid evaporating the volatile trimethylsilylmethyl cyclopentadiene, Me$_3$SiCH$_2$CpH. The reaction flask (250 mL round bottom flask) and frit with celite were weighted to calculate yield of the product after extraction. The crude materials were then extracted into pentane (3×50 mL) and used without any further purification. Based on above mathematical method, the yield is calculated as 15.47 g (95.2%). The $^1$H NMR spectrum was recorded for the crude material to ensure the product formation. $^1$H NMR (400 MHz, C$_6$D$_6$): δ −0.05 (9H, s, Si—CH$_3$), 1.77 (2H, d, $J_{HH}$=1.2 Hz, Me$_3$Si—CH$_2$), 2.83 (1H, sex, $J_{HH}$=1.5 Hz, Cp-CH), 5.80-6.49 (4H, m, Cp-CH) ppm.

Synthesis of lithium trimethylsilylmethyl cyclopentadienide, Me$_3$SiCH$_2$CpLi. A hexane solution of n-butyl lithium (41.5 mL, 103.8 mmol, 2.5 M solution) was added drop wise to a precooled solution (1:1 mixture of pentane and diethyl ether, 200 mL) of Me$_3$SiCH$_2$CpH (15.47 g, 101.7 mmol) over a period of 40-50 minutes at −25° C. The resulting mixture was gradually brought to room temperature and then continuously stirred overnight. Volatiles were removed in vacuo and remaining crude materials were thoroughly washed with pentane. The final materials were dried under vacuum to obtain a colorless crystalline solid of Me$_3$SiCH$_2$CpLi in 13.6 g (84.6%) yield. $^1$H NMR (400 MHz, THF-d$_8$): δ −0.09 (9H, s, Si—CH$_3$), 1.84 (2H, s, Me$_3$Si—CH$_2$), 5.36 (2H, t, $J_{HH}$=2.6 Hz, Cp-CH), 5.47 (2H, t, $J_{HH}$=2.6 Hz, Cp-CH) ppm.

Synthesis of bis-(trimethylsilylmethyl cyclopentadienide) hafnium dichloride, (Me$_3$SiCH$_2$Cp)$_2$HfCl$_2$. A solid HfCl$_4$ (1.011 g, 3.16 mmol) was slurried in precooled diethyl ether (30 mL) at −25° C., and to this a solid Me$_3$SiCH$_2$CpLi (1.0 g, 6.3 mmol) was added over a period of 3-5 minutes. The resulting mixture was stirred overnight at room temperature. All volatiles were removed in vacuo and the crude materials were subsequently extracted into dichloromethane. Solvents were removed under reduced pressure resulted spectroscopically pure (Me$_3$SiCH$_2$Cp)$_2$HfCl$_2$ as a colorless solid in 1.13 g (70%) yield. $^1$H NMR (400 MHz C$_6$D$_6$): δ −0.11 (18H, s, SiMe$_3$-CH$_3$), 2.18 (4H, s, Me$_3$Si—CH$_2$), 5.68 (8H, s, Cp-CH) ppm.

Synthesis of bis-(trimethylsilylmethyl cyclopentadienyl) hafnium dimethyl, (Me$_3$SiCH$_2$Cp)$_2$HfMe$_2$ (Metallocene Catalyst 1). An ethereal solution of MeLi (2.56 mL, 4.1 mmol) was added drop wise to a precooled diethyl ether solution of (Me$_3$SiCH$_2$Cp)$_2$HfCl$_2$ (1.12 g, 2.03 mmol) over a period of 3-5 minutes at −25° C. The resulting mixture was stirred overnight at room temperature to ensure completion of the reaction. Insoluble materials were filtered through a pad of celite. Volatiles from the filtrate were removed under vaccum. The crude materials were triturated with pentane and then extracted into pentane, followed by solvent removal afforded a colorless crystalline material of (Me$_3$SiCH$_2$Cp)$_2$HfMe$_2$ in 875 mg (84.2%) yield. $^1$H NMR (400 MHz, C$_6$D$_6$): δ −0.23 (6H, s, Hf—CH$_3$), 0.02 (18H, s, SiMe$_3$-CH$_3$), 1.89 (4H, s, Me$_3$Si—CH$_2$), 5.54-5.48 (8H, m, Cp-CH) ppm.

Example Synthesis of Iron Catalyst 1

Iron Catalyst 1 is:

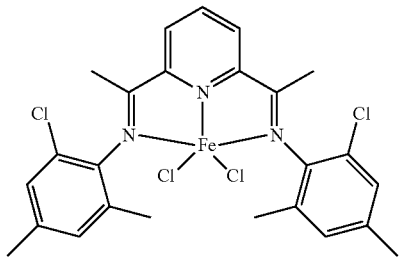

2-chloro-4, 6-dimethyl aniline, 2,6-diacetylpyridine, iron chloride and formic acid (95-97%) were purchased from Sigma-Aldrich and used as received. The $^1$H NMR measurements were recorded on a 400 MHz Bruker spectrometer.

Synthesis of 2,6-bis-[1-(2-chloro-4,6-dimethylphenylimino)ethyl]pyridine. Solid 2,6-diacetylpyridine (5.0 g, 31 mmol) was dissolved in methanol (100 mL). Then, a solid 2-chloro-4, 6-dimethyl aniline (9.537 g, 62 mmol) and formic acid (0.5 mL) were added. The resulting mixture was stirred at room temperature for 48 hours, and a colorless solid precipitated out during the course of reaction. Colorless crystalline solids were filtered out and washed with cold methanol. Crude materials $^1$H NMR spectrum showed that three are 1:1 ratio of title precursor compound and starting material 2-chloro-4,6-dimethyl aniline. The desired compound was purified by column chromatography with a mixture of hexane/ethyl acetate (8:2 ratio) as eluent and solvent removal resulted in colorless crystalline solid (2,6-bis-[1-(2-chloro-4,6-dimethylphenylimino)ethyl]pyridine) in 2.5 g (18.6%) yield. $^1$H NMR (400 MHz, CD$_2$Cl$_2$): δ 2.06 (6H, s, CH$_3$ side arms), 2.29 (6H, s, CH$_3$), 2.31 (6H, s, CH$_3$), 6.99 (2H, s, Ar—CH), 7.11 (2H, s, Ar—CH), 7.95 (1H, t, Ar—CH), 8.47 (2H, d, Ar—CH) ppm.

Synthesis of 2,6-bis-[1-(2-chloro-4,6-dimethylphenylimino)ethyl]pyridine iron dichloride (Iron Catalyst 1). A solid pro-ligand, 2,6-Bis-[1-(2-chloro-4,6-dimethylphenylimino)ethyl]pyridine, was dissolved in THF (40 mL) and cooled to −25° C., to this a solid pre-dried iron chloride was added. The resulting mixture was stirred overnight at room temperature. The resulting mixture color turned from brown to blue during the course of the reaction and the desired iron complex was precipitated out as blue solids. The blue iron compound was filtered out and washed with hexane. The crude materials were further re-dissolved in dichloromethane to remove any insoluble iron containing impurities and ionic compounds formed during the course of the reaction, which could not be identified by $^1$H NMR measurements because of their faster relaxation rate (paramagnetic nature) on NMR timescale. Solvent removal under reduced pressure resulted in blue crystalline solid of the 2,6-bis-[1-(2-chloro-4,6-dimethylphenylimino)ethyl]pyridine iron dichloride in 1.89 g (81.9%) yield. $^1$H NMR (400 MHz, CD$_2$Cl$_2$): δ −23.2, −21.0, 3.7, 9.1, 12.2, 15.3, 18.4, 19.3, 22.0, 22.2, 32.9, 33.9, 81.9, 84.2 (bs) ppm.

Example Synthesis of SMAO-ES70-875

In a 4 L stirred vessel in a drybox methylalumoxane (MAO, 30 wt % in toluene, approx. 1,000 grams) is added along with approx. 2,000 g of toluene. This solution is then stirred at 60 RPM for 5 minutes. Next, approx. 800 grams of ES-70-875 silica is added to the vessel. This slurry is then heated at 100° C. and stirred at 120 RPM for 3 hours. The temperature is then reduced to 25° C. and cooled to temperature over 2 hours. Once cooled, the vessel is set to 8 RPM and placed under vacuum for 72 hours. After emptying the vessel and sieving the supported MAO, approximately 1,100 g of supported MAO will be collected.

ES70-875 silica is ES70™ silica (PQ Corporation, Conshohocken, Pennsylvania) that has been calcined at approx. 875° C. Specifically, the ES70™ silica is calcined at 880° C. for four hours after being ramped to 880° C. according to the following ramp rates:

| ° C. | ° C./h | ° C. |
|---|---|---|
| ambient | 100 | 200 |
| 200 | 50 | 300 |
| 300 | 133 | 400 |
| 400 | 200 | 800 |
| 800 | 50 | 880 |

Example Synthesis of the Supported Catalyst
(Metallocene Catalyst 1: Iron Catalyst 1, 80:20)

To a stirred vessel 1,668 g of toluene (Sigma Aldrich) was added along with 925 g of methylalumoxane (30 wt % in toluene, Albemarle). To this solution 734 g of ES70-875 calcined silica was added. The mixture was stirred for three hours at 80° C. after which the temperature was reduced and the reaction was allowed to cool to ambient temperature. Bis(trimethylsilylmethyl-cyclopentadienide)hafnium dimethyl (12.27 g, 24.00 mmol) (metallocene catalyst 1) and 2,6-Bis[1-(2-chloro-4,6-dimethylphenylimino)ethyl]pyridine iron(II) dichloride (3.39 g, 6.00 mmol) (iron catalyst 1) were then dissolved in toluene (250 g) and added to the vessel, which was stirred for one hour. The mixing speed was then reduced and stirred slowly while drying under vacuum for 65 hours, after which 1,036 g silica supported catalyst was obtained.

Polymerizations:

Example 1 (Ex. 1) is made with a combination of metallocene catalyst 1 and iron catalyst 1, molar ratio of 80:20, cosupported on SMAO-ES70-875 silica.

Polymerization was performed in an 18.5 foot tall gas-phase fluidized bed reactor with a 16.5" diameter straight section. Cycle and feed gases were fed into the reactor body through a perforated distributor plate, and the reactor was controlled at 290 psi and 67 mol % ethylene. The reactor temperature was maintained at 85° C. throughout the polymerization by controlling the temperature of the cycle gas loop. The supported catalyst (20 wt % in mineral oil slurry) was delivered to the reactor. The process parameters for the preparation of polymer for Ex. 1 is given in Table 1. Production rate refers to the production rate of the polymerization in the gas phase reactor. Residence time refers to the residence time of reactants in the gas phase reactor. Average velocity refers to the average velocity of cycle gas.

TABLE 1

| Sample | CEx. 3 | Ex. 1 |
|---|---|---|
| $H^2$ conc. (molppm) | 387 | 184 |
| $C_6/C_2$ Ratio (mol %/mol %) | 0.021 | 0.013 |
| Comonomer conc. (mol %) | 4.8 | 0.89 |

TABLE 1-continued

| Sample | CEx. 3 | Ex. 1 |
|---|---|---|
| $C_2$ conc. (mol %) | 70.0 | 67.1 |
| Comonomer/$C_2$ Flow Ratio | 0.110 | 0.072 |
| $H^2/C_2$ Ratio (ppm/mol %) | 5.53 | 2.8 |
| $iC_5$ conc. (mol %) | 4.8 | 6.8 |
| Reactor Pressure Set Point (psig) | 300 | 290 |
| Reactor Temp SP (° F.) | 175 | 185 |
| Residence Time (hr) | 5.22 | 5.3 |
| Catalyst Feed (g/hr) | 8.06 | 1.799 |
| Cat Activity (g poly/g cat) | 7825 | 17062 |

The comparative examples 1 through 6 (CEx. 1-6) are examples 1-6 from PCT Publication Application No. WO 2019/094131 or U.S. Patent Pub. No. 2019/0144575 (see page 49, paragraph [00211] and table 1 et seq.). The process parameters for the preparation parameters of Comparative Example 3 (CEx. 3), which was made in an 18.5 foot tall gas-phase fluidized reactor with a 22.5" diameter straight section, were also given in Table 1.

Comparative example 7 (CEx. 7) is EXCEED™ 1327CA, a commercial grade of metallocene LLDPE by ExxonMobil Chemical Company.

Comparative examples 8 (CEx. 8) and 9 (CEx. 9) are Polymer of Run 1 and Run 2, Film 2 and Film 6 from PCT Publication No. WO 2019/108327 (see page 74, paragraph and table 3 et seq.).

Figure 1B:
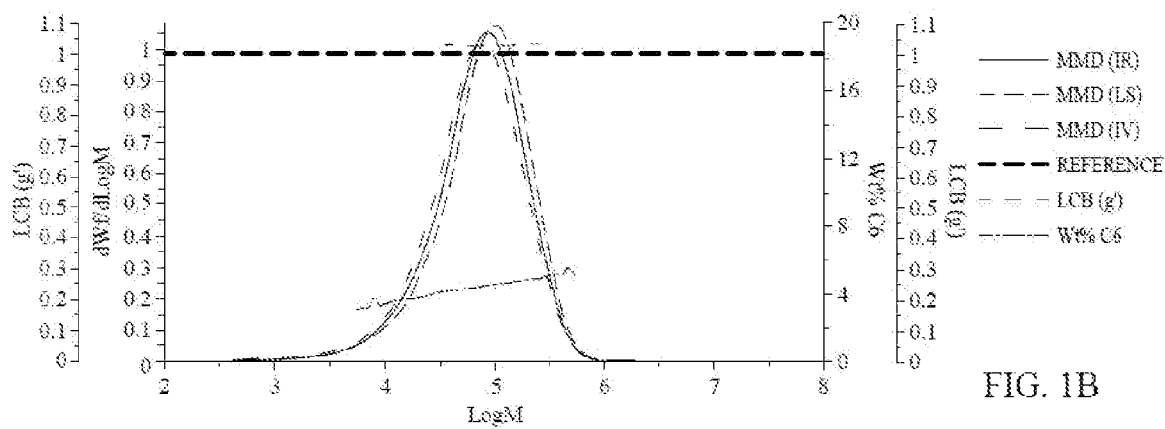
Figure 1C:
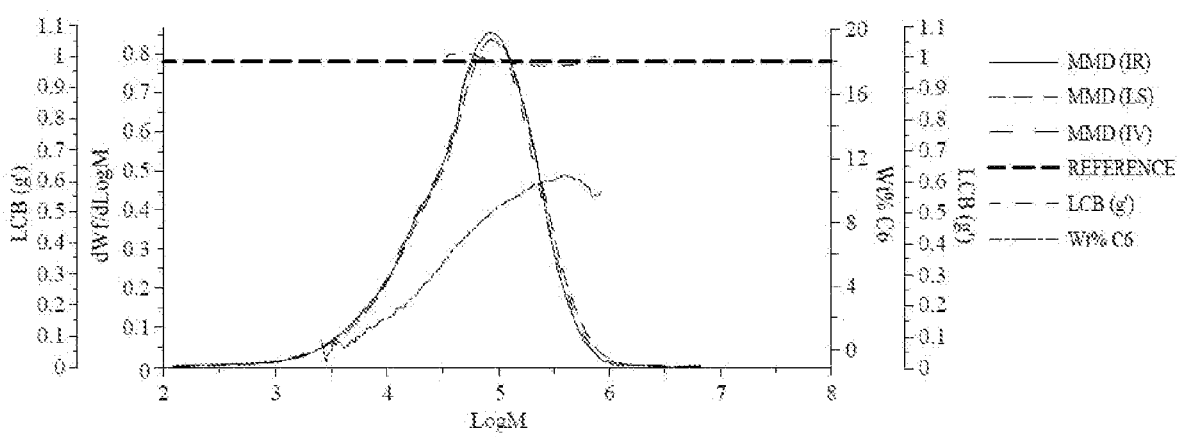
Figure 2A:
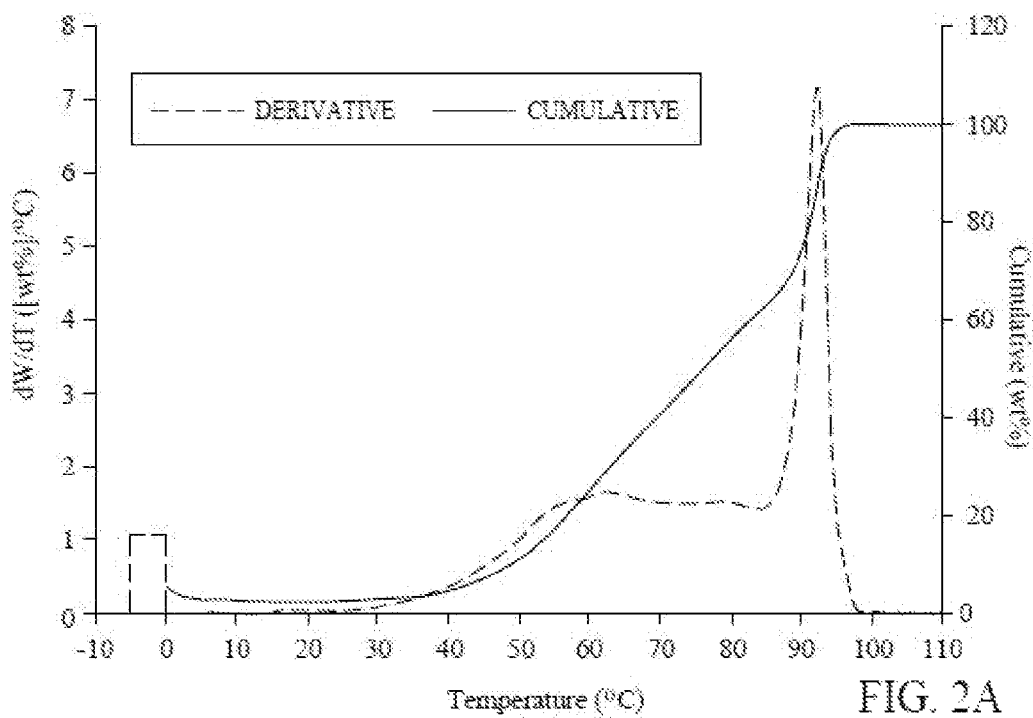
FIGS. 2A-2E are temperature rising elution fraction-infrared (TREF-IR) curves of comparative polymers and an example ethylene hexene copolymer according to at least one embodiment of the present disclosure.
Figure 2B:
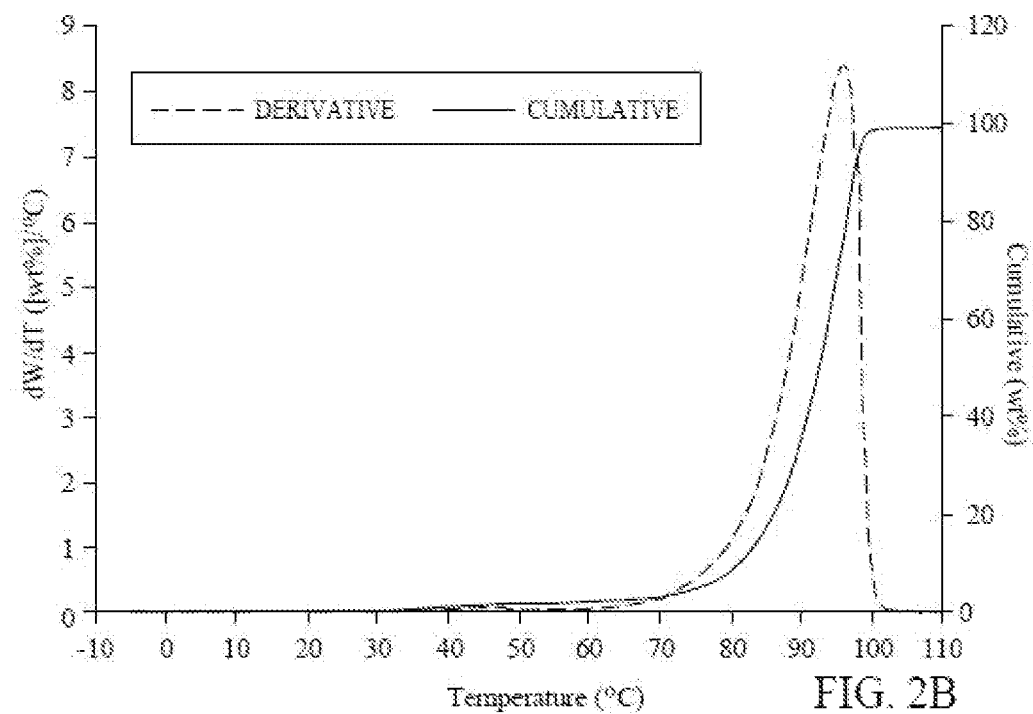
Figure 2C:
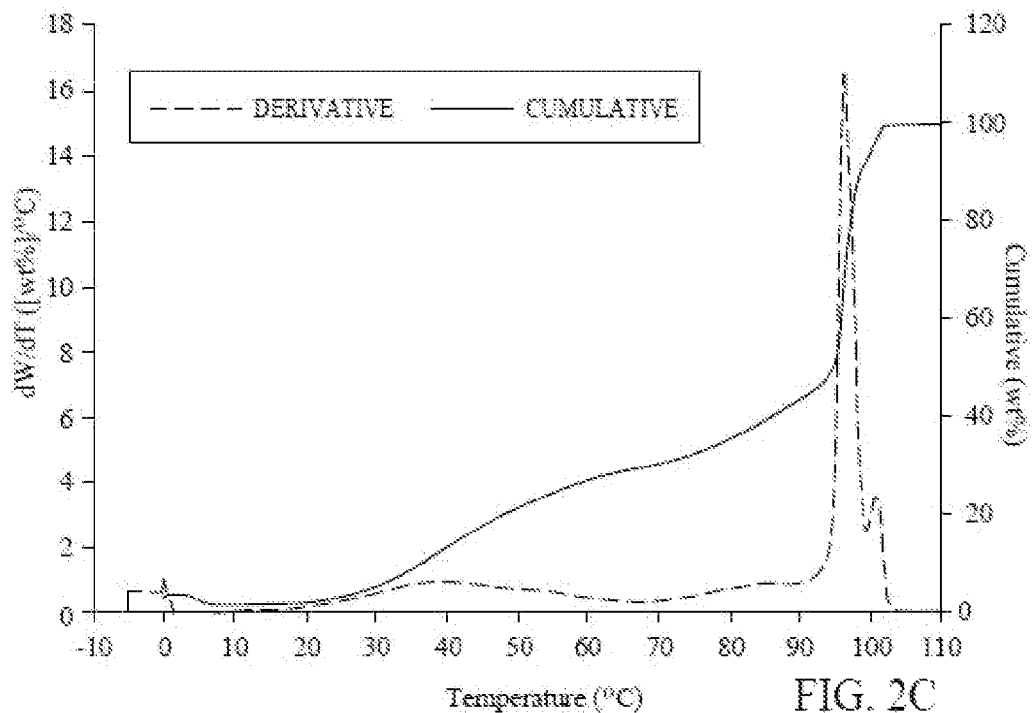
Figure 2D:
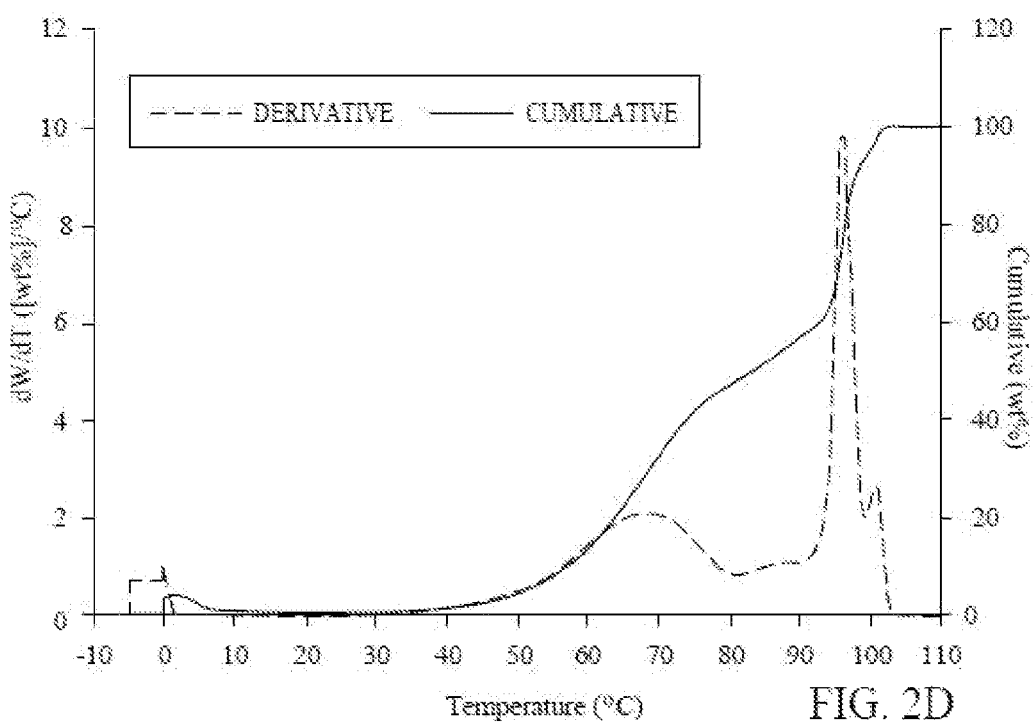
Figure 2E:
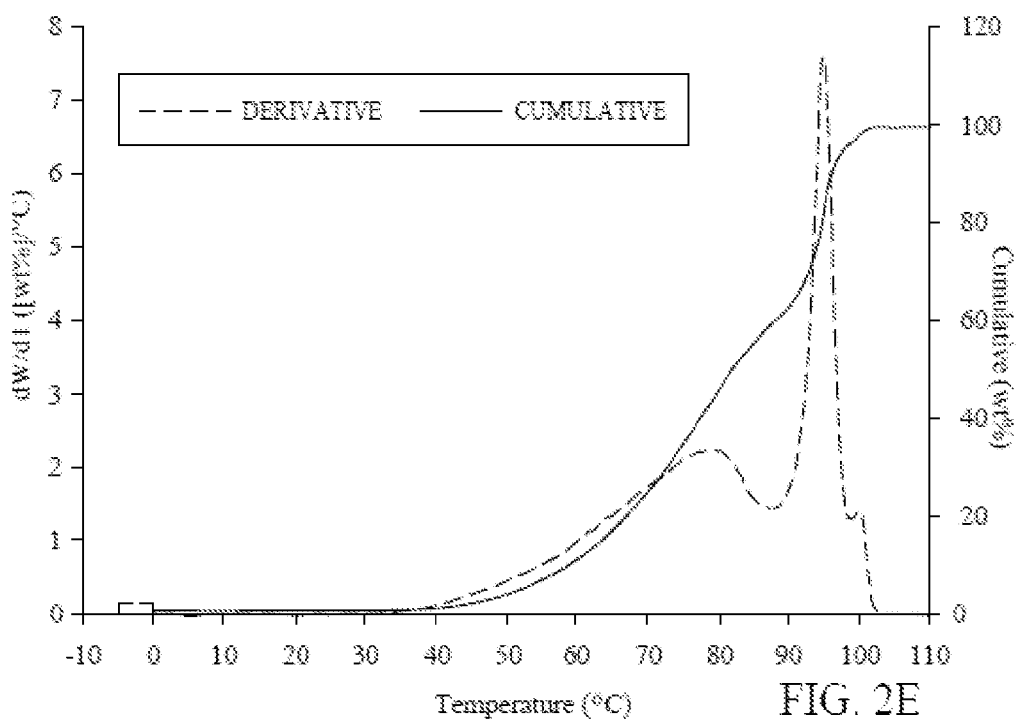

Table 2 summarizes certain properties of the example polyethylene as determined by GPC-IR5-LS-VIS. The GPC traces of comparative examples 3 and 7, and Example 1 are shown in FIGS. 1A, 1B, and 1C, respectively.

TABLE 2

| Sample | CEx. 3 | CEx. 7 | CEx. 8 | CEx. 9 | Ex. 1 |
|---|---|---|---|---|---|
| Mn (g/mol) | 14,790 | 3,4760 | 9,150 | 12,790 | 19,520 |
| Mw (g/mol) | 128,953 | 103,700 | 108,460 | 112,620 | 107,400 |
| Mz (g/mol) | 457,760 | 187,000 | 910,230 | 322,710 | 274,830 |
| MWD | 8.7 | 3.0 | 11.9 | 8.8 | 5.5 |
| $C_6$, wt % by GPC | 9.5 | 4.5 | 7.6 | 7.5 | 7.5 |
| LCB-g' (vis avg) | 0.943 | 1.03 | 0.87 | 0.99 | 0.957 |

Table 3 summarizes the TREF-IR5 analysis results of the example polyethylene. These analysis results are also shown in FIG. 3, and TREF traces are shown in FIGS. 2A-2E. FIGS. 2A-2E are TREF traces for CEx. 3, CEx. 7, CEx. 8, CEx. 9, and Ex. 1, respectively. While the TREF traces provided full details of the comonomer distribution of the comparative and example polyethylene, the analyzed results, especially $T_{peak2}-T_{peak1}$, highlighted key differences between the example and comparative samples. The $T_{peak2}-T_{peak1}$ values of comparative examples are at least 30° C., while that of Ex. 1 is 15.7° C. The EX. 7 has a very low peak 1, consisting only 1.4% of the area of the curve. It can also be treated as having only the high temperature peak 2, or extremely narrow. Therefore, Ex. 1 is seen as with intermediate level of comonomer distribution, while the comparative examples are either very broad or extremely narrow.

TABLE 3

| Sample | CEx. 3 | CEx. 7 | CEx. 8 | CEx. 9 | Ex. 1 |
|---|---|---|---|---|---|
| Peak 1 Temperature, ° C. | 62.0 | 45.6 | 39.2 | 60.1 | 79.3 |
| Peak 1 Wt % | 28.1 | 1.4 | 12.3 | 13.3 | 44.1 |

TABLE 3-continued

| Sample | CEx. 3 | CEx. 7 | CEx. 8 | CEx. 9 | Ex. 1 |
|---|---|---|---|---|---|
| Transition Temperature, ° C. | 84.4 | — | 66.2 | 81.0 | 87.2 |
| Transition Wt % | 62.1 | — | 29.1 | 47.9 | 58.7 |
| Peak 2 Temperature, ° C. | 92.4 | 96.0 | 96.5 | 96.4 | 95.0 |
| Peak 2 Wt % | 87.6 | 77.5 | 67.0 | 77.1 | 82.2 |
| Tpeak2 − Tpeak1, ° C. | 30.4 | 50.4 | 57.3 | 36.3 | 15.7 |

FIGS. 4A and 4B are contour plots of CFC results of the examples obtained through deconvolution following the MBDR method. Table 4 summarizes composition parameters determined using the MBDR method. In Table 4, cumulative wt %$_{transition}$ is defined as the averaged cumulative wt %, i.e. the location of saddle line, which separates the two population contours. Orientation$_{p1}$ denotes the orientation of the low density peak, and Orientation$_{p2}$ denotes the orientation of the high density peak. And positive Orientation values indicate the composition distribution of the peak is BOCD, and negative Orientation values indicate the composition distribution of the peak is BCD. Orientation values close to 0 or 180 indicate narrow composition distribution and broad MW distribution, while orientations of around 90 indicate narrow MW distribution and broad composition distribution. Similar with $T_{peak2}-T_{peak1}$ by TREF-IR5, the difference between $T_{p1}$ and $T_{p2}$ shows that Ex. 1 is not very narrow in comonomer distribution, but it is significantly narrower than CEx. 3.

TABLE 4

| Sample | CEx. 3 | Ex. 1 |
|---|---|---|
| Cumulative wt %$_{transition}$ (%) | 31.2 | 51.8 |
| M$_{p1}$ (g/mol) | 251190 | 158490 |
| M$_{p2}$ (g/mol) | 31623 | 39811 |
| T$_{p1}$ (° C.) | 56 | 80 |
| T$_{p2}$ (° C.) | 91 | 98 |
| T$_{p1}$ − T$_{p2}$ (° C.) | −35 | −18 |
| M$_{p1}$/M$_{p2}$ | 7.9 | 4.0 |
| Orientation $_{p1}$ | 76.4 | 92.0 |
| Orientation $_{p2}$ | 149.6 | −0.79 |

Table 5 summarizes thermal properties of the example polyethylene as determined by DSC. The data show that the melting behavior and crystallinity of the example and comparative samples are similar, though the Example shows higher values for each characteristic tested.

TABLE 5

| Sample | CEx. 3 | Ex. 1 |
|---|---|---|
| Peak melting point, ° C. | 121.4 | 124.3 |
| ΔH$_f$, J/g | 130.0 | 132.0 |
| Crystallinity, % | 44.4 | 45.1 |
| Gradient Density, g/cm$^3$ | 0.9220 | 0.9235 |

Figure 5:
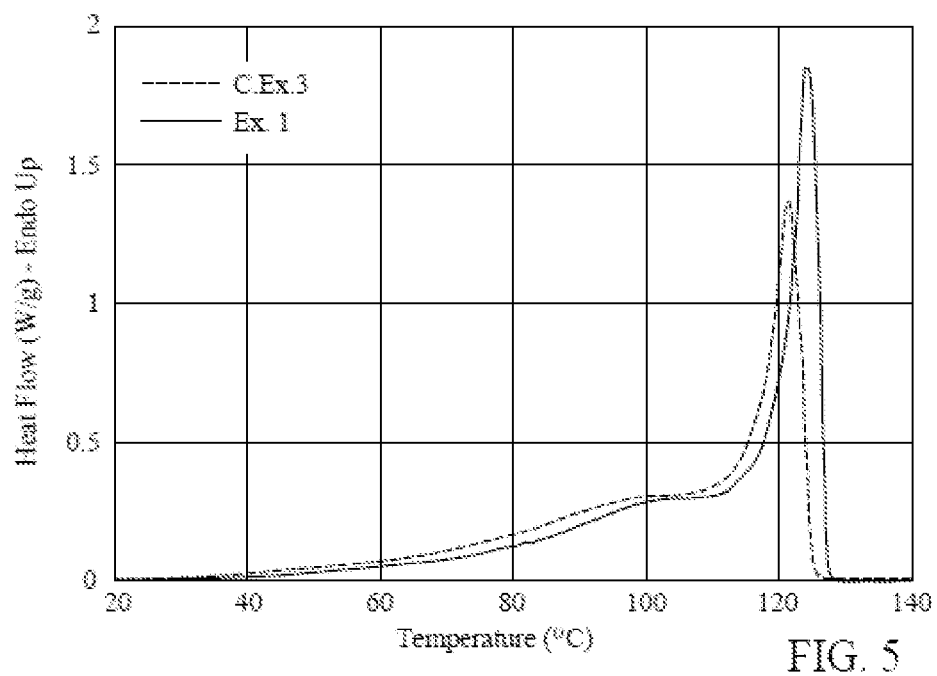
FIG. 5 is a differential scanning calorimetry curve for an example ethylene hexene copolymer according to at least one embodiment of the present disclosure.

FIG. 5 shows the second melt heat flow traces of comparative example 3 and Example 1 obtained by DSC. Their thermal behavior are similar, though Ex. 1 has more high density components than CEx. 3.

Example Film Formulation

Reactor resin of Example 1 was compounded with stabilizers into pellet form through simple melt blending on lab scale twin screw extruders such as Coperion W&P 57 under typical PE compounding conditions. Prior to melt mixing, the polyethylene resin in granular form was dry blended in a tumble mixer with the following additives: 500 ppm of Irganox™-1076, 1,000 ppm of Irgafos™ 168, and 600 ppm of Dynamar™ FX5920A.

Resin samples of comparative examples 1 through 6 were converted into monolayer films on an Alpine with 65 mm screw, a 160 mm die, a die gap 60 mil and a blow-up ratio (BUR) of 2.5. Details on the film conversion of comparative examples 1 through 6 can be found in PCT Publication Application No. WO 2019/094131 or U.S. Patent Pub. No. 2019/0144575 (see page 53, paragraph [00213] et seq.).

Resin samples of comparative examples 8 and 9 were converted into monolayer films on a 2" extruder equipped with a 2" spiral mandrel die operated at a die throughput rate of 8 lbs/hr/die inch with a melt temperature of 188° C.-193° C. and 3.0 blow-up ratio (BUR). Details on the film conversion and properties of comparative examples 8 through 9 can be found in PCT Publication No. WO 2019/108327 (see page 77 and Film 2 and Film 6 in table 5 et seq.).

Example 1 was converted into monolayer films on a 2.5" Battenfeld Gloucester line with 30:1 L:D equipped with a 6" oscillating die and a Future Design air ring, also at 60 mil die gap and 2.5 BUR. The blown film fabrication parameters of comparative example 3 and Example 1 are summarized in Table 7.

TABLE 7

| Sample | CEx. 3 | Ex. 1 |
|---|---|---|
| Gauge (mil) | 1.0 | 1.03 |
| Die Gap (mil) | 60 | 60 |
| Blow up ratio (BUR) | 2.5 | 2.5 |
| Air % | 41.5 | 61.1 |
| Frost Line Height (in) | 23 | 24 |
| Output (lb/hr) | 198 | 188 |
| Screw Speed (rpm) | 75.4 | 60.8 |
| Melt Pressure 1 (psi) | 4227 | 3210 |
| Melt Pressure 2 (psi) | 3279 | 2470 |
| % Motor Load | 45.7 | 54.5 |
| Power (horsepower) | — | 18 |
| Melt Temp (° F.) | 396.3 | 397 |
| Die Factor (lb/hr/in) | 10.0 | 9.96 |
| Draw Speed (ft/min) | 162.7 | 166.6 |
| Die Diameter (in) | 6.3 | 6 |
| Specific Output (lb/hr/rpm) | 2.63 | 3.08 |

Blown film (1-mil) properties for the example polyethylene films are shown in Table 8.

TABLE 8

| Sample ID | CEx. 1 | CEx. 2 | CEx. 3 | CEx. 4 | CEx. 5 |
|---|---|---|---|---|---|
| Density | 0.922 | 0.922 | 0.922 | 0.922 | 0.922 |
| I2 | 1.0 | 1.0 | 1.0 | 0.7 | 0.7 |
| I21 | — | — | — | — | — |

TABLE 8-continued

| | | | | | |
|---|---|---|---|---|---|
| MIR | 35 | 40 | 54 | 44 | 53 |
| Gauge (mils), Average | 1.03 | 1.02 | 1.04 | 1.08 | 1.06 |
| 1% Secant Modulus (psi) | | | | | |
| MD | 34,005 | 35,360 | 33,747 | 35,157 | 34,888 |
| TD | 44,028 | 45,918 | 51,575 | 46,934 | 50,437 |
| Average | 39,017 | 40,639 | 42,661 | 41,046 | 42,663 |
| Tensile Yield Strength(psi) | | | | | |
| MD | 1,576 | 1,573 | 1,547 | 1,593 | 1,553 |
| TD | 1,771 | 1,831 | 1,927 | 1,880 | 1,837 |
| Tensile Elongation @ Yield (%) | | | | | |
| MD | — | — | 6.1 | — | — |
| TD | — | — | 7.5 | — | — |
| Tensile Strength (psi) | | | | | |
| MD | 8,919 | 8,672 | 8,627 | 9,361 | 8,758 |
| TD | 7,609 | 7,876 | 6,507 | 7,526 | 6,889 |
| Tensile Elongation @ Break (%) | | | | | |
| MD | — | — | 358 | — | — |
| TD | — | — | 640 | — | — |
| Elmendorf Tear | | | | | |
| MD (g/mil) | 287 | 247 | 107 | 369 | 260 |
| TD (g/mil) | 527 | 499 | 544 | 569 | 590 |
| Dart Drop (g/mil) | 759 | 825 | 585 | 735 | 772 |
| Puncture Peak Force (lbs/mil) | — | — | 8.8 | — | — |
| Puncture Break Energy (in-lbs/mil) | 28.7 | 24.7 | 21.5 | 20.1 | 19.9 |
| Haze (%) | 19.8 | 25.8 | >30 | >30 | >30 |
| Gloss (GU) | | | | | |
| MD | 10.9 | 8.1 | 5.7 | 7.2 | 4.6 |
| TD | 11.1 | 8.2 | 5.9 | 7.2 | 4.6 |

| Sample ID | CEx. 6 | CEx. 7 | CEx. 8 | CEx. 9 | Ex. 1 |
|---|---|---|---|---|---|
| Density | 0.917 | 0.9281 | 0.9343 | 0.9316 | 0.9255 |
| I2 | 0.5 | 1.3 | 1.7 | 1.4 | 1.3 |
| I21 | — | 20.7 | 187.3 | 48.1 | 30.4 |
| MIR | 49 | 15.7 | 108.5 | 33.5 | 23.1 |
| Gauge (mils), Average | 1.08 | 0.99 | 0.93 | 0.99 | 1.03 |
| 1% Secant Modulus (psi) | | | | | |
| MD | 29,859 | 42,412 | 54,251 | 59,018 | 40,855 |
| TD | 43,514 | 48,900 | 83,722 | 92,390 | 50,587 |
| Average | 29,859 | 45,656 | 68,987 | 75,705 | 45,721 |
| Tensile Yield Strength(psi) | | | | | |
| MD | 1,392 | 1,825 | 2,143 | 2,206 | 1,684 |
| TD | 1,587 | 1,984 | 2,684 | 2,913 | 1,899 |
| Tensile Elongation @ Yield (%) | | | | | |
| MD | — | 6.4 | 5.5 | 7.7 | 6.2 |
| TD | — | 7.7 | 6.9 | 6.2 | 5.6 |
| Tensile Strength (psi) | | | | | |
| MD | 9,730 | 7,804 | 7,576 | 8,062 | 8,800 |
| TD | 7,624 | 7,015 | 4,973 | 7,246 | 7,577 |

TABLE 8-continued

| | | | | | |
|---|---|---|---|---|---|
| Tensile Elongation @ Break (%) | | | | | |
| MD | — | 586 | 355 | 401 | 541 |
| TD | — | 693 | 618 | 623 | 661 |
| Elmendorf Tear | | | | | |
| MD (g/mil) | 322 | 174 | 35 | 66 | 222 |
| TD (g/mil) | 576 | 445 | 999 | 634 | 523 |
| Dart Drop (g/mil) | 857 | 154 | 192 | 322 | 659 |
| Puncture Peak Force (lbs/mil) | — | 9.8 | 7.0 | 8.9 | 9.3 |
| Puncture Break Energy (in-lbs/mil) | 26.6 | 25.5 | 11.6 | 18.9 | 24.2 |
| Haze (%) | >30 | >30 | >30 | 20.2 | >30 |
| Gloss (GU) | | | | | |
| MD | 4.0 | 12.6 | 5.9 | 35.5 | 23 |
| TD | 3.9 | 13 | 5.3 | 39.7 | 19 |

Figure 6:
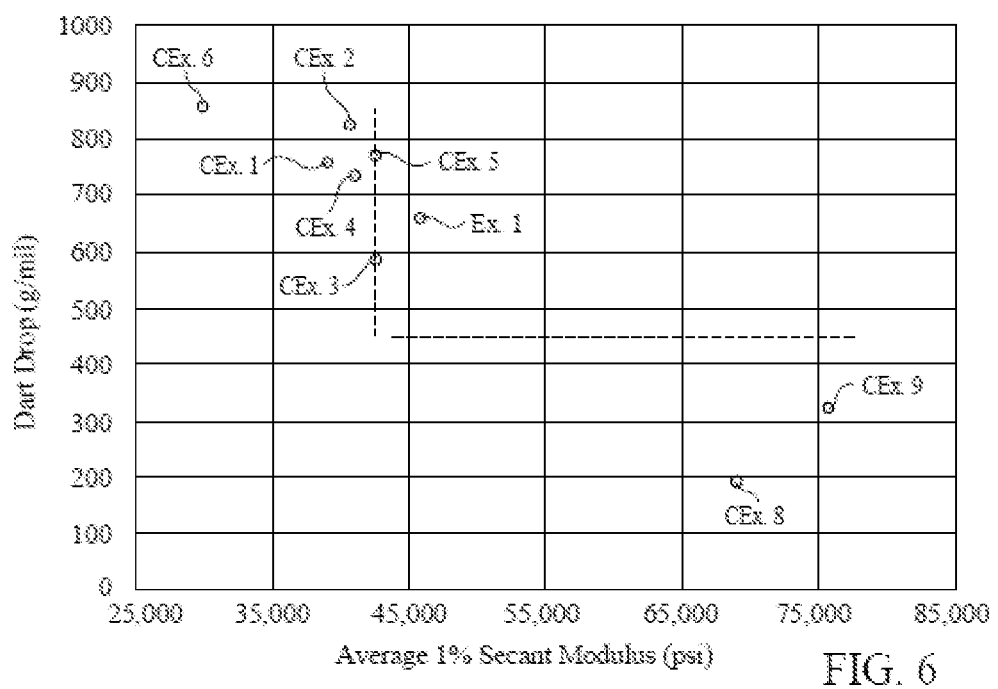
FIG. 6 is a plot of the average of MD and TD 1% secant modulus versus Dart Impact Strength for comparative polyethylenes and an example ethylene hexene copolymer according to at least one embodiment of the present disclosure.

FIG. 6 plots the average of MD and TD 1% secant modulus of comparative and example samples against film dart drop impact strength. Comparative examples 1 through 6, at similar density as Example 1, have very good dart drop impact strength, however, their modulus, specifically average of MD and TD 1% secant modulus, are less than 43,000 psi. Comparative example 7, EXCEED™ 1327, is a representative narrow molecular weight and narrow comonomer distribution metallocene LLDPE resin. At slightly higher density than the Example 1, its film has high stiffness, nearly identical to that of Example 1. However, its film has significant lower dart impact strength, less than 200 g/mil. Comparative examples 8 and 9 are at relatively higher density, though have very good average MD and TD 1% secant modulus, have relatively low dart drop impact strength. Example 1 thus combines high stiffness and toughness, and is advantageous over comparative examples 7, 8 and 9 in dart drop impact strength, yet also advantageous over comparative examples 1 through 6 in stiffness, illustrated by significantly higher average of MD and TD 1% secant modulus.

Overall, films of the present disclosure show a combination of high stiffness (e.g., above 45,000 psi) and excellent Dart (e.g., about 659 g/mil). Films of the present disclosure can be obtained from polyethylene compositions having a density of about 0.92 g/cm$^3$. Polyethylene compositions of the present disclosure can be formed by catalyst systems and processes of the present disclosure to provide ethylene polymers having higher or lower densities than Example 1 by varying comonomer content. The polyethylene compositions of the present disclosure show that for a given density, the polymer can be stiffer than typical metallocene polyethylenes. The polyethylene composition is a stiff polymer (like a high density material) but it is tougher because of the unique combination of comonomer content and distribution. Catalyst systems and processes of the present disclosure can provide ethylene polymers having the unique properties of high stiffness, high toughness and good processability than typical metallocene polyethylenes, exemplified by comparative example 7, which has a very narrow MFR of about 16. Polyethylene compositions can be obtained from catalyst systems comprising a metallocene catalyst and an iron complex, and can have a melt index ($I_2$) of, e.g., about 1.3, and a melt index ratio ($I_{21}/I_2$) of, e.g., about 23.5.

All documents described herein are incorporated by reference herein, including any priority documents and/or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, an element or a group of elements is preceded with the transitional phrase "comprising", it is understood that we also contemplate the same composition or group of elements with transitional phrases "consisting essentially of", "consisting of", "selected from the group of consisting of", or "is" preceding the recitation of the composition, element, or elements and vice versa.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

What is claimed is:

1. A film, comprising:
    a polyethylene composition, comprising:
        ethylene and a $C_3$-$C_{40}$ olefin comonomer, the polyethylene composition having at least 65 wt % ethylene content and from 0 wt % to 35 wt % of a $C_3$-$C_{40}$ olefin comonomer content based upon the total weight of the composition as determined by GPC-IR5-LS-VIS, the film having:
        an average of MD and TD 1% secant modulus of 43,000 psi or greater, as determined by ASTM D882, and a Dart Drop Impact Strength of greater than 500 g/mil, as determined by ASTM D1709;

wherein the polyethylene composition has:
- a melt index ratio ($I_{21}/I_2$) of 18 to 35, wherein $I_{21}$ and $I_2$ are determined by ASTM 1238;
- a density of from 0.917 g/cm³ to 0.94 g/cm³ as determined by ASTM 1505;
- a $g'_{vis}$ of from 0.9 to 0.97, as determined by GPC-IR5-LS-VIS;
- a weight average molecular weight (Mw) of from 75,000 g/mol to 200,000 g/mol, as determined by GPC-IR5-LS-VIS;
- a number average molecular weight (Mn) of from 5,000 g/mol to 15,000 g/mol, as determined by GPC-IR5-LS-VIS;
- a z-average molecular weight (Mz) of from 500,000 g/mol to 1,800,000 g/mol, as determined by GPC-IR5-LS-VIS; and
- a molecular weight distribution (Mw/Mn) of from 2 to 8, as determined by GPC-IR5-LS-VIS.

2. The film of claim 1, wherein the $C_3$-$C_{40}$ olefin comonomer content is from 4 wt % to 10 wt % based upon the total weight of the polyethylene composition, as determined by GPC-IR5-LS-VIS.

3. The film of claim 1, wherein the $C_3$-$C_{40}$ olefin comonomer is propylene, 1-butene, 4-methyl-1-pentene, 3-methyl-1-pentene, 1-hexene, 1-octene, or a combination thereof.

4. The film of claim 1, wherein the $C_3$-$C_{40}$ olefin comonomer is 1-hexene.

5. The film of claim 1, wherein the average of MD and TD 1% secant modulus is from 43,000 psi to 68,000 psi.

6. The film of claim 1, wherein the Mw/Mn is from 3 to 7.

7. The film of claim 1, wherein the film has one or more of the following properties:
- a 1% Secant Modulus (MD) of from 38,000 psi to 58,000 psi, as determined by ASTM D882 (25.4 mm width strip); or
- a 1% Secant Modulus (TD) of from 50,000 psi to 80,000 psi, as determined by ASTM D882 (25.4 mm width strip).

* * * * *